(12) United States Patent
Liu et al.

(10) Patent No.: US 10,098,168 B2
(45) Date of Patent: Oct. 9, 2018

(54) NEIGHBOR AWARENESS NETWORKING DATAPATH

(71) Applicant: Apple Inc., Cupertino, CA (US)

(72) Inventors: Yong Liu, Campbell, CA (US);
Christiaan A. Hartman, San Jose, CA (US); Daniel R. Borges, San Francisco, CA (US); Peter N. Heerboth, San Jose, CA (US); Lawrie Kurian, San Jose, CA (US); Su Khiong Yong, Palo Alto, CA (US); Anand Rajagopalan, Saratoga, CA (US); Saravanan Balasubramaniyan, Los Gatos, CA (US); Tashbeeb Haque, San Francisco, CA (US); Andreas Wolf, San Mateo, CA (US); Guoqing Li, Cupertino, CA (US); Lilach Zukerman, Pardesia (IL); Oren Shani, Kfar Saba (IL)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 14/960,488

(22) Filed: Dec. 7, 2015

(65) Prior Publication Data

US 2016/0165653 A1 Jun. 9, 2016

Related U.S. Application Data

(60) Provisional application No. 62/089,178, filed on Dec. 8, 2014, provisional application No. 62/107,983, filed
(Continued)

(51) Int. Cl.
*H04W 4/00* (2018.01)
*H04W 76/14* (2018.01)
(Continued)

(52) U.S. Cl.
CPC ............ *H04W 76/14* (2018.02); *H04L 67/104* (2013.01); *H04L 67/325* (2013.01); *H04W 8/005* (2013.01); *H04W 72/12* (2013.01)

(58) Field of Classification Search
CPC .... H04L 67/104; H04L 67/325; H04W 72/12; H04W 76/023; H04W 8/005
(Continued)

(56) References Cited

U.S. PATENT DOCUMENTS 9,143,979 B1 * 9/2015 Lambert ........... H04W 28/0289
9,319,862 B2 * 4/2016 Kelleman ............. H04W 8/005
(Continued)

FOREIGN PATENT DOCUMENTS

WO 2014124251 A2 8/2014

OTHER PUBLICATIONS

Camps-Mur, "Enabling Always on Service Discovery: WiFi Neighbor Awareness Networking", Apr. 29, 2015, 8 pages, vol. 22, Issue 2, IEEE Wireless Communications.
(Continued)

*Primary Examiner* — Asad Nawaz
*Assistant Examiner* — Berhanu Belete
(74) *Attorney, Agent, or Firm* — Meyertons Hood Kivlin Kowert & Goetzel, P.C.; Jeffrey C. Hood; Brian E. Moore

(57) ABSTRACT

In one set of embodiments, one or more client stations operate to configure Neighbor Awareness Networking (NAN)—direct communication with neighboring client stations, i.e., direct communication between the client stations without utilizing an intermediate access point. Embodiments of the disclosure relate to NAN datapath scheduling and NAN pre-datapath operation setup and scheduling. The NAN datapath embodiments described herein provide a mechanism through which devices can communicate and provide services. Aspects of the datapath development
(Continued)

include datapath scheduling, including datapath setup and scheduling attributes, as well as pre-datapath operation triggering and scheduling. Scheduling may include determination of a type of datapath, including paging and synchronized datapaths. NAN data cluster base schedules may be scheduled as equal-sets or subsets of datapath schedules. The datapath model may be implemented for unicast and multicast communication between client stations.

20 Claims, 32 Drawing Sheets

Related U.S. Application Data on Jan. 26, 2015, provisional application No. 62/136,276, filed on Mar. 20, 2015.

(51) Int. Cl.
*H04L 29/08* (2006.01)
*H04W 8/00* (2009.01)
*H04W 72/12* (2009.01)

(58) Field of Classification Search
USPC .......................................................... 370/329
See application file for complete search history.

(56) References Cited

U.S. PATENT DOCUMENTS

| | | | |
|---|---|---|---|
| 9,544,754 B1* | 1/2017 | Lambert | H04W 8/005 |
| 9,723,513 B1* | 8/2017 | Lambert | H04W 28/0289 |
| 9,872,234 B2 | 1/2018 | Huang et al. | |
| 2008/0285507 A1 | 11/2008 | Mukherjee et al. | |
| 2010/0165963 A1 | 7/2010 | Chu | |
| 2010/0226342 A1 | 9/2010 | Colling et al. | |
| 2014/0056248 A1 | 2/2014 | Wang et al. | |
| 2014/0269555 A1 | 9/2014 | Sadasivam et al. | |
| 2014/0301190 A1 | 10/2014 | Abraham et al. | |
| 2014/0313966 A1 | 10/2014 | Shukla et al. | |
| 2014/0328168 A1 | 11/2014 | Park et al. | |
| 2015/0006633 A1 | 1/2015 | Vandwalle et al. | |
| 2015/0036540 A1 | 2/2015 | Kasslin et al. | |
| 2015/0081840 A1 | 3/2015 | Patil et al. | |
| 2015/0098388 A1* | 4/2015 | Fang | H04W 48/16 370/328 |
| 2015/0109961 A1* | 4/2015 | Patil | H04W 4/206 370/254 |
| 2015/0109981 A1 | 4/2015 | Patil et al. | |
| 2015/0172757 A1* | 6/2015 | Kafle | H04L 67/1044 725/81 |
| 2015/0208455 A1 | 7/2015 | Yen et al. | |
| 2015/0256992 A1* | 9/2015 | Kelleman | H04W 8/005 370/254 |
| 2015/0282149 A1* | 10/2015 | Abraham | H04W 72/0406 370/329 |
| 2015/0296458 A1 | 10/2015 | Abraham et al. | |
| 2015/0319029 A1 | 11/2015 | Abraham et al. | |
| 2015/0319235 A1 | 11/2015 | Liu et al. | |
| 2015/0319675 A1 | 11/2015 | Park et al. | |
| 2015/0341447 A1 | 11/2015 | Patil et al. | |
| 2015/0341811 A1 | 11/2015 | Deshpande et al. | |
| 2015/0350866 A1 | 12/2015 | Patil et al. | |
| 2015/0351146 A1* | 12/2015 | Lee | H04W 76/023 370/329 |
| 2016/0014669 A1* | 1/2016 | Patil | H04W 40/246 370/329 |
| 2016/0014714 A1* | 1/2016 | Patil | H04L 5/0055 455/458 |
| 2016/0029403 A1 | 1/2016 | Roy et al. | |
| 2016/0073288 A1 | 3/2016 | Patil et al. | |
| 2016/0088611 A1* | 3/2016 | Abraham | H04W 48/16 370/329 |
| 2016/0157089 A1 | 6/2016 | Qi et al. | |
| 2016/0165653 A1 | 6/2016 | Liu et al. | |
| 2016/0249200 A1 | 8/2016 | Liu et al. | |
| 2016/0309496 A1 | 10/2016 | Huang | |
| 2016/0337836 A1 | 11/2016 | Kim | |
| 2017/0034769 A1* | 2/2017 | Kim | H04W 48/08 |

OTHER PUBLICATIONS

Invitation to Pay Additional Fees, International Application No. PCT/US2015/064421, dated Feb. 22, 2016, 7 pages.

\* cited by examiner

| Channel | DW 1808 NW 1810 (2.4 GHz Ch) | DOW 1812 | DW 1808 NW 1810 (5 GHz Ch) | ADW 1814 | IEW 1816 | HSW 1818 |
|---|---|---|---|---|---|---|
| 2.4 GHz | 1) {6, period}<br>2) Flexible | N/A | N/A | 1) 6<br>2) {D$_1$,..., D$_K$}<br>3) Flexible | 1) 6<br>2) {D$_1$,..., D$_K$}<br>3) {V, d, p}$_1$,..., {V, d, p}$_n$<br>4) Flexible | 1) None<br>2) {V, s, d, p}$_1$,...,<br>{V, s, d, p}$_m$ |
| 2.4/5 GHz | 1) {6, period}<br>2) Flexible | 1) 6<br>2) {D$_1$,..., D$_K$}<br>3) Flexible | 1) {6, period}<br>2) Flexible | 1) 149<br>2) {D$_1$,..., D$_K$}<br>3) Flexible | 1) 149<br>2) {D$_1$,..., D$_K$}<br>3) {V, d, p}$_1$,..., {V, d, p}$_n$<br>4) Flexible | 1) None<br>2) {V, s, d, p}$_1$,...,<br>{V, s, d, p}$_m$ |

FIG. 17A

| DW 1808/NW 1810 (2.4 GHz Ch) | | | | |
|---|---|---|---|---|
| | Publisher (STA1) | | | |
| Subscriber (STA2) | {6, 1 DWI} | {6, 1 DWI} | FLEX | |
| | {6, 1 DWI} | {6, 1 DWI} | {6, 8 DWI} | {6, 1 DWI} |
| | {6, 4 DWI} | {6, 1 DWI} | {6, 8 DWI} | {6, 4 DWI} |
| | FLEX | {6, 1 DWI} | {6, 8 DWI} | {6, 1 DWI} |

FIG. 17B

| DW 1808/NW 1810 (5 GHz Ch) | | | | |
|---|---|---|---|---|
| | Publisher (STA1) | | | |
| Subscriber (STA2) | {149, 1 DWI} | {149, 8 DWI} | {149, 8 DWI} | FLEX |
| | {149, 1 DWI} | {149, 8 DWI} | {149, 8 DWI} | {149, 1 DWI} |
| | {149, 4 DWI} | {149, 8 DWI} | {149, 8 DWI} | {149, 4 DWI} |
| | FLEX | {149, 8 DWI} | {149, 8 DWI} | {149, 1 DWI} |

FIG. 17C

| DOW 1812/ADW 1814 | | | | |
|---|---|---|---|---|
| | Publisher (STA1) | | | |
| Subscriber (STA2) | 6/149 | 6/149 | {D1$_1$,..., D1$_k$} | FLEX |
| | 6/149 | 6/149 | 6/149 | 6/149 |
| | {D2$_1$,..., D2$_j$} | 6/149 | D1$_x$=D2$_y$ or 6/149 | D2$_1$ |
| | FLEX | 6/149 | D1$_1$ | 6/149 |

FIG. 17D

| IEW 1816 | | | | |
|---|---|---|---|---|
| | Publisher (STA1) | | | |
| Subscriber (STA2) | 6/149 | 6/149 | {D1$_1$,..., D1$_k$} | FLEX |
| | 6/149 | 6/149 | 6/149 | 6/149 |
| | {V2, s, d, p}$_{1,...,m}$ | 6/149 | D1$_x$=D2$_y$ or 6/149 | D2$_1$ |
| | {V2, d, p}$_{1,...,m}$ | {V2, s, d, p}$_{1,...,m}$ | {V1, d, p}$_{1,...,n}$ | {V1, d, p}$_{1,...,n}$ |
| | | | {V1, d, p}$_{1,...,n}$ {V2, d, p}$_{1,...,m}$ | |
| | FLEX | 6/149 | {V1, d, p}$_{1,...,n}$ | 6/149 |

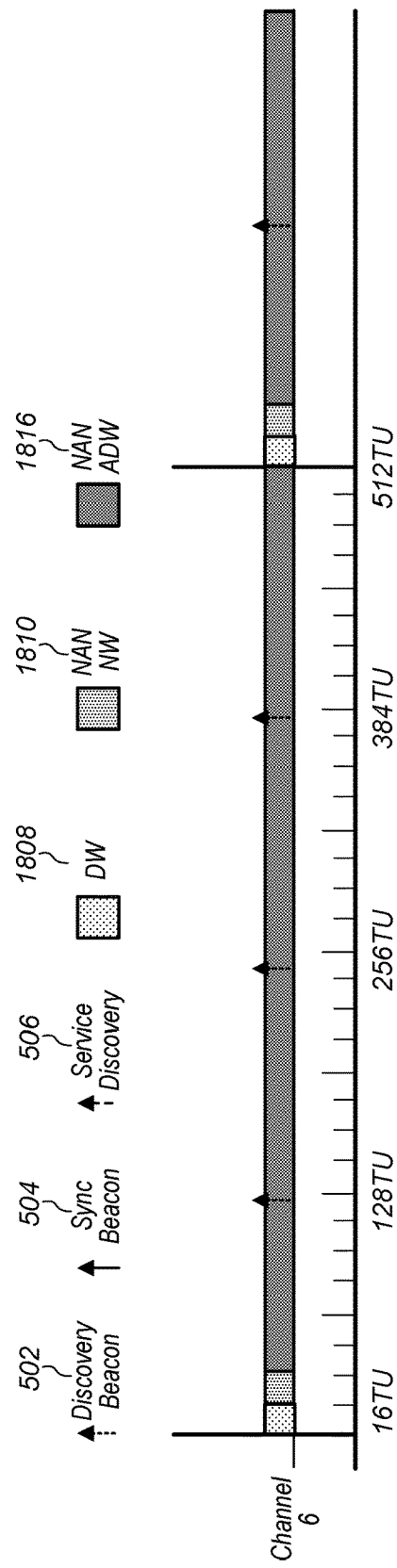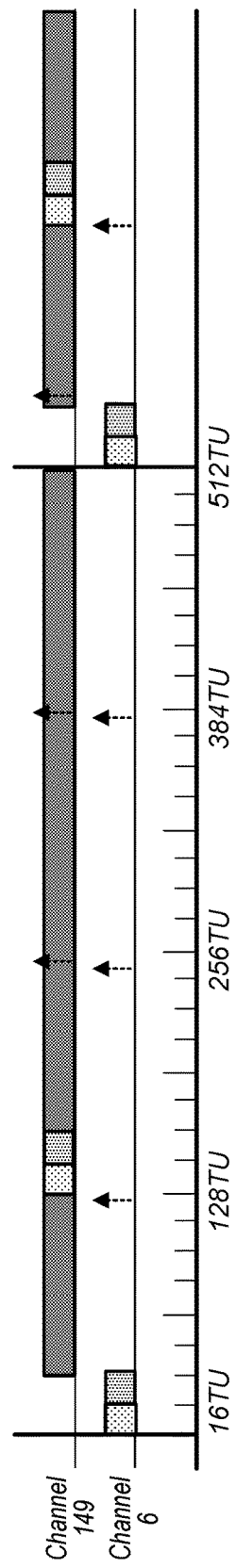

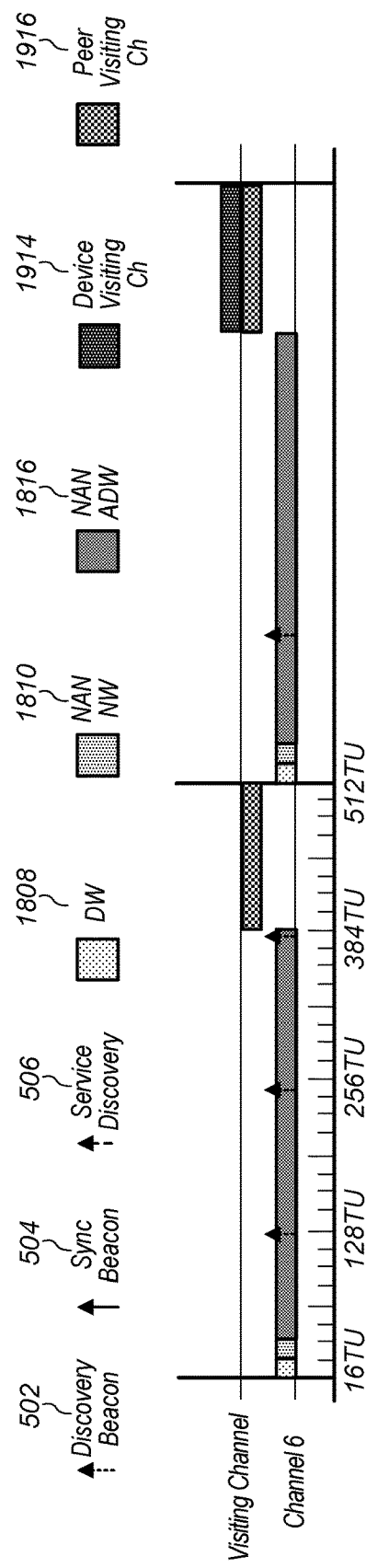
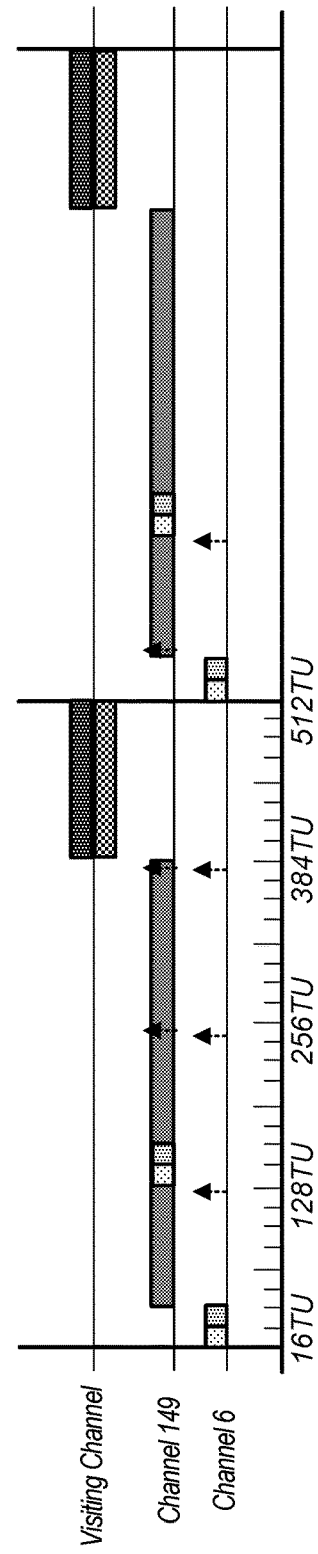
FIG. 19A
FIG. 19B

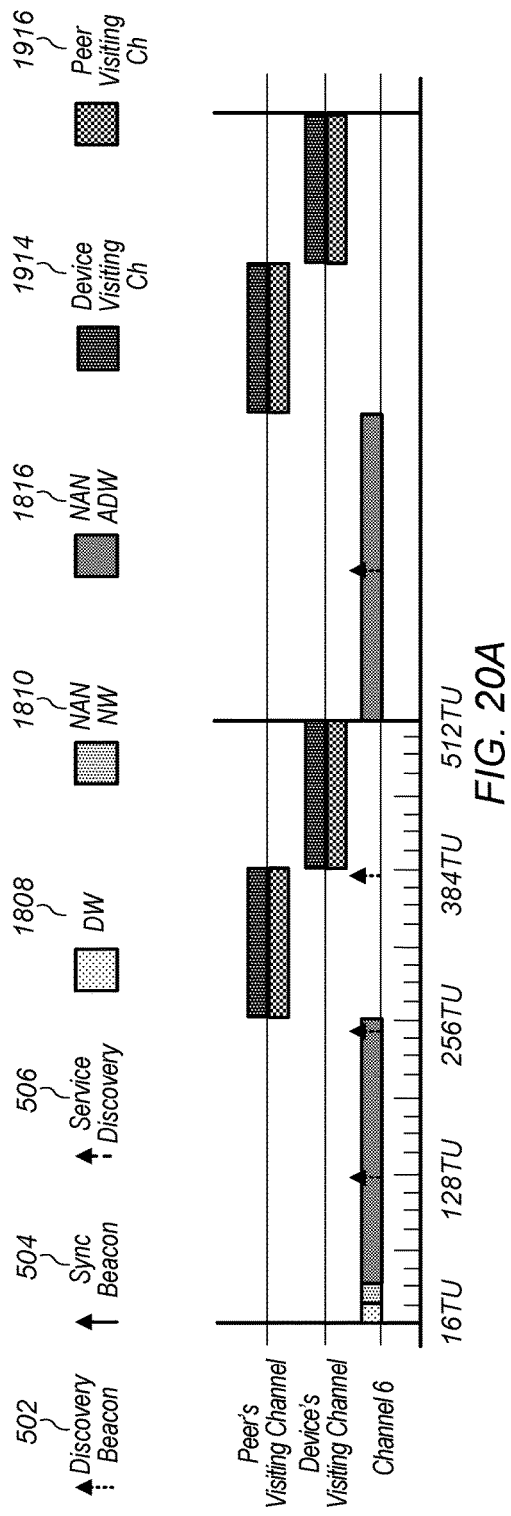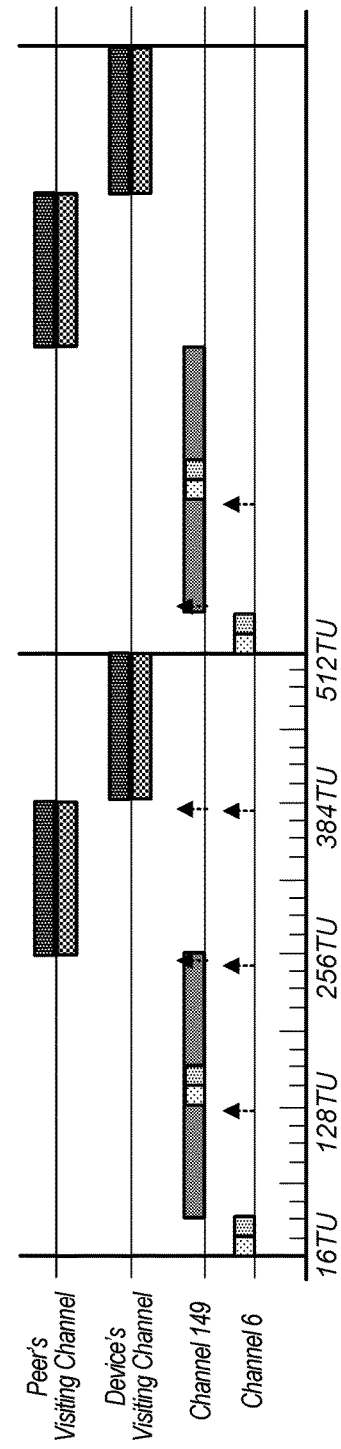
FIG. 20A
FIG. 20B

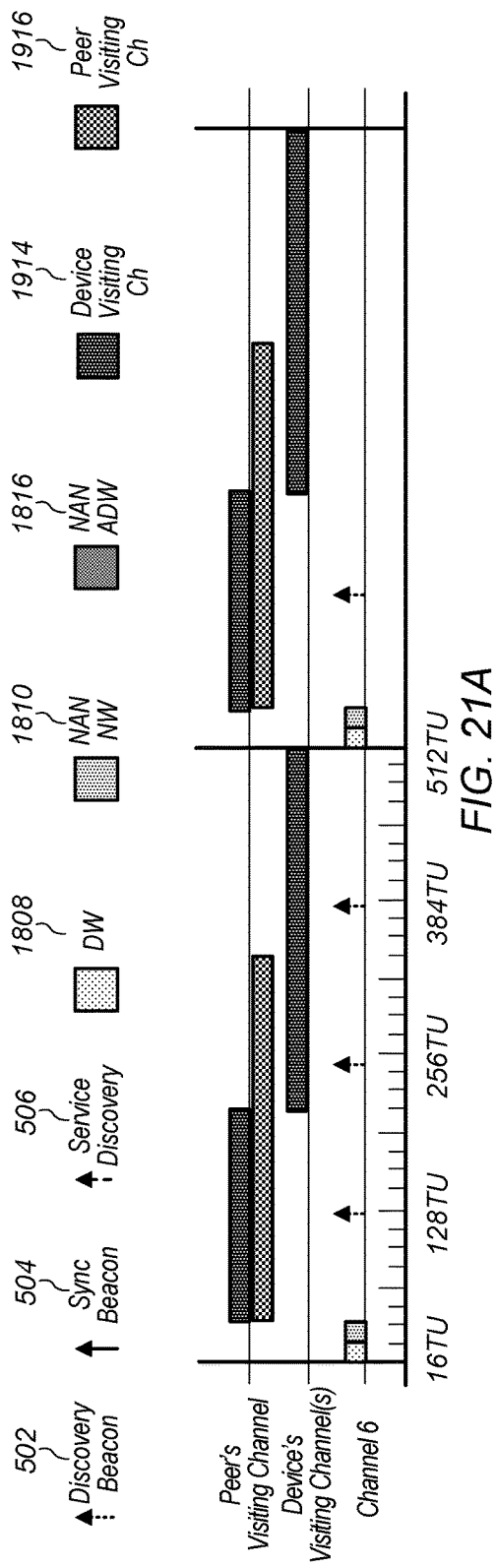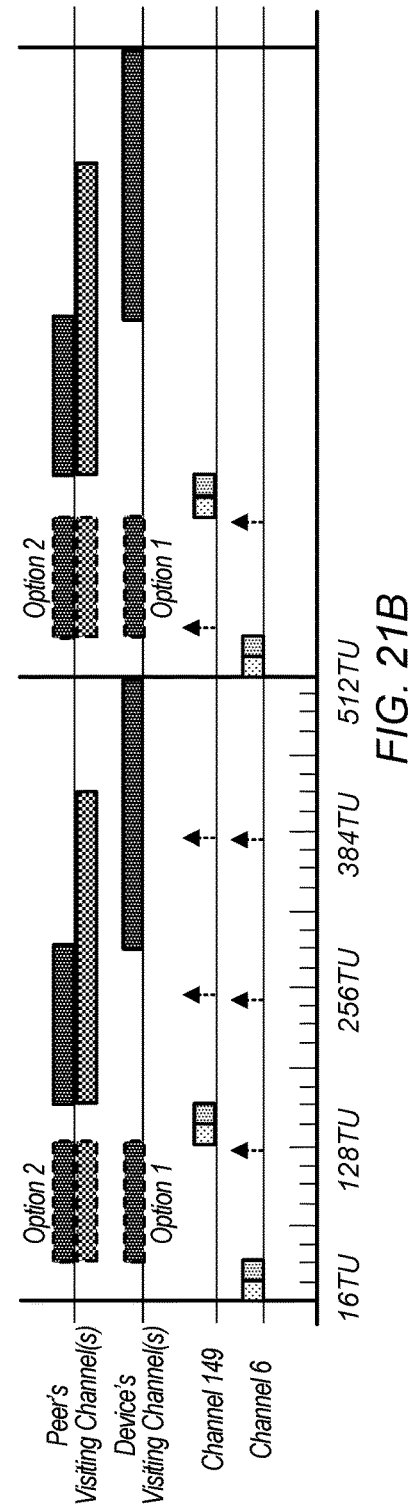
FIG. 21A
FIG. 21B

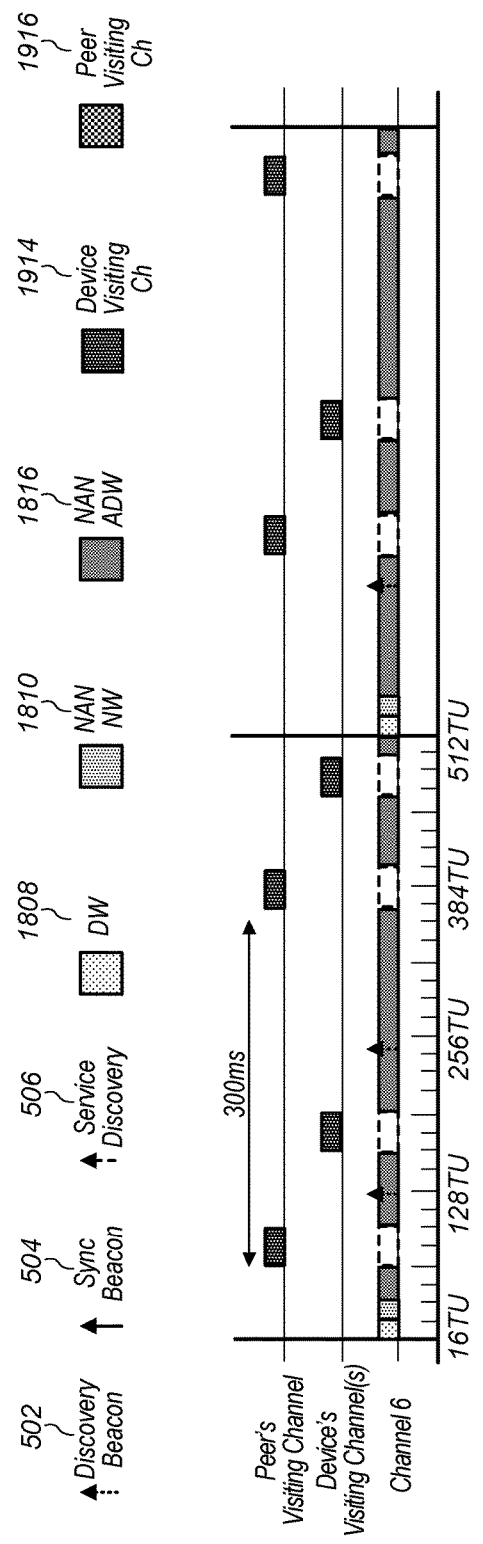
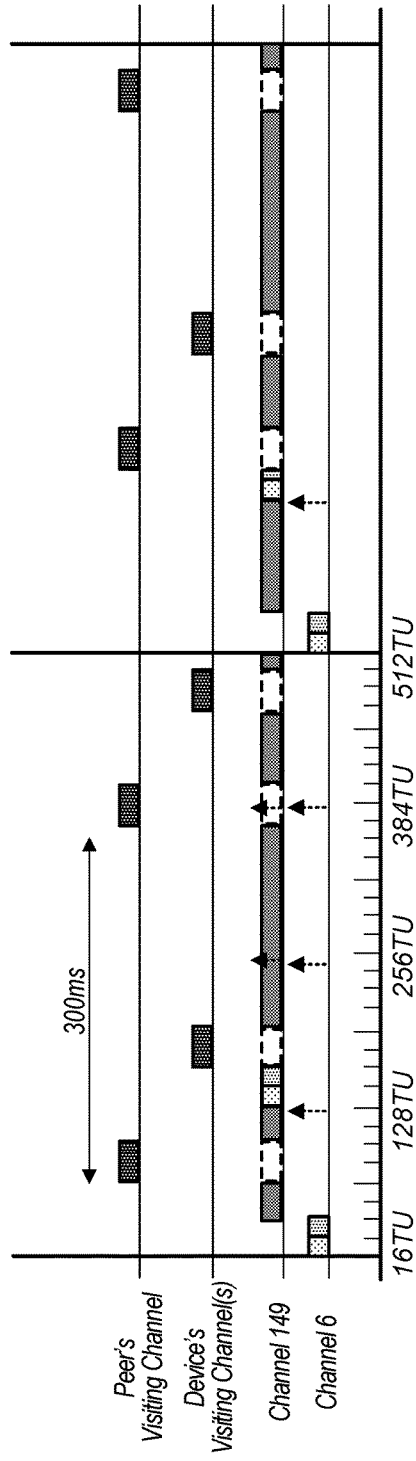
FIG. 22A
FIG. 22B

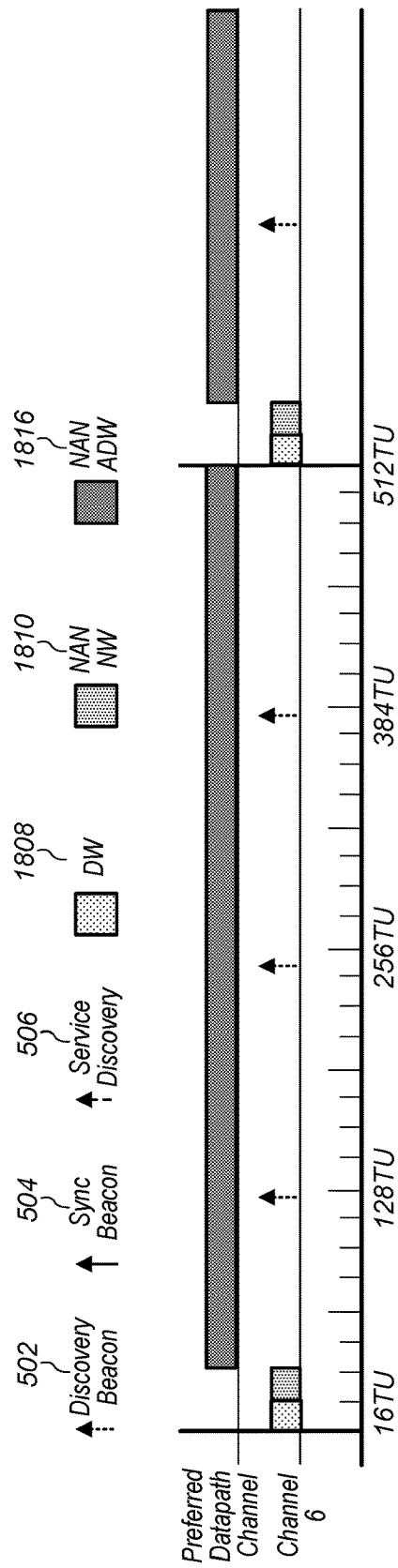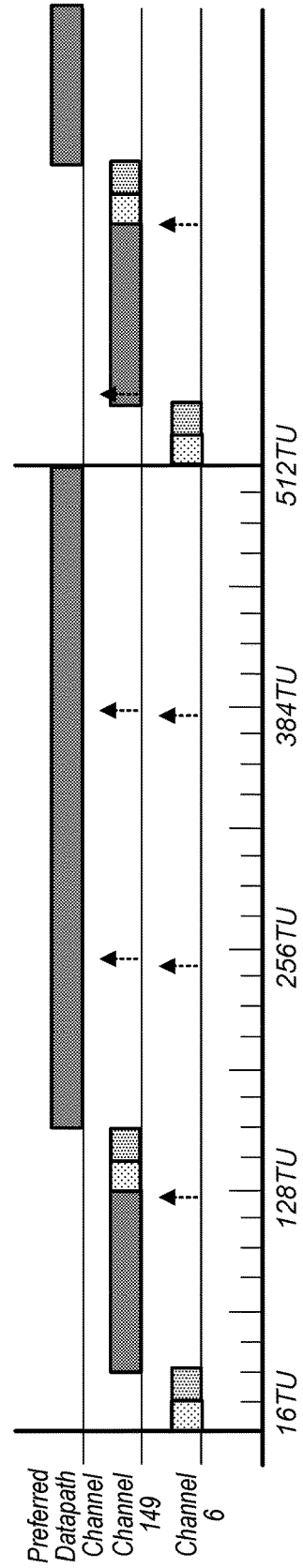
FIG. 23A
FIG. 23B

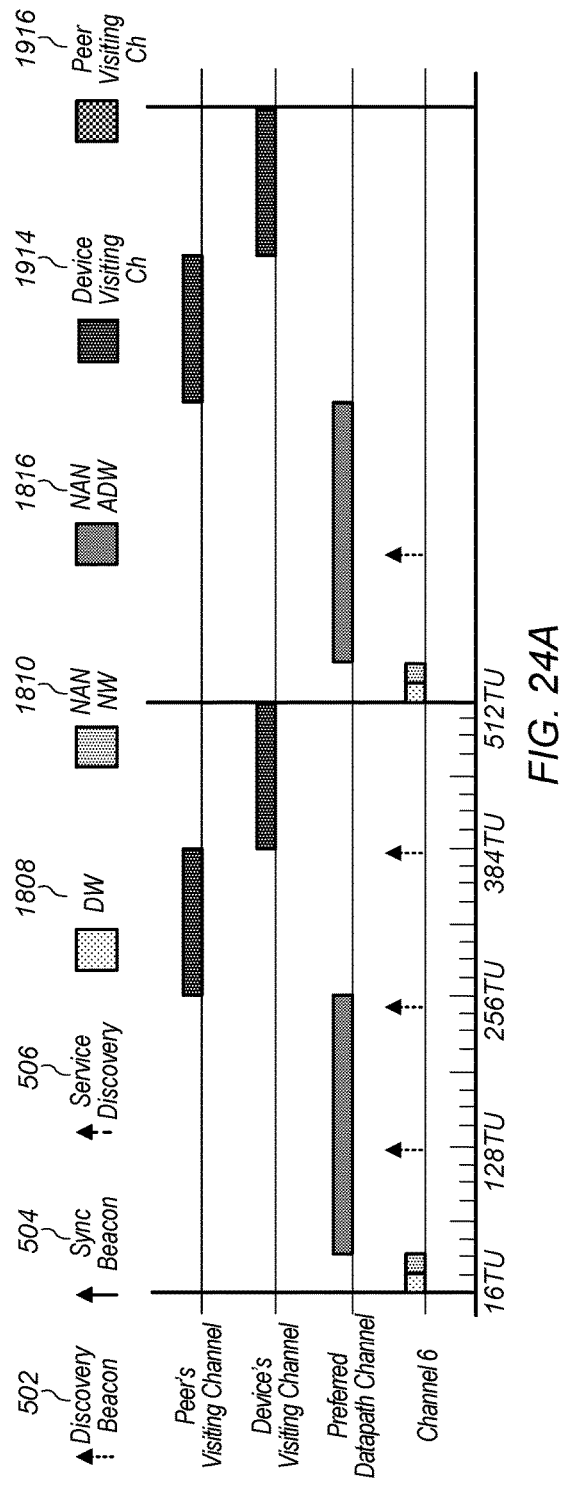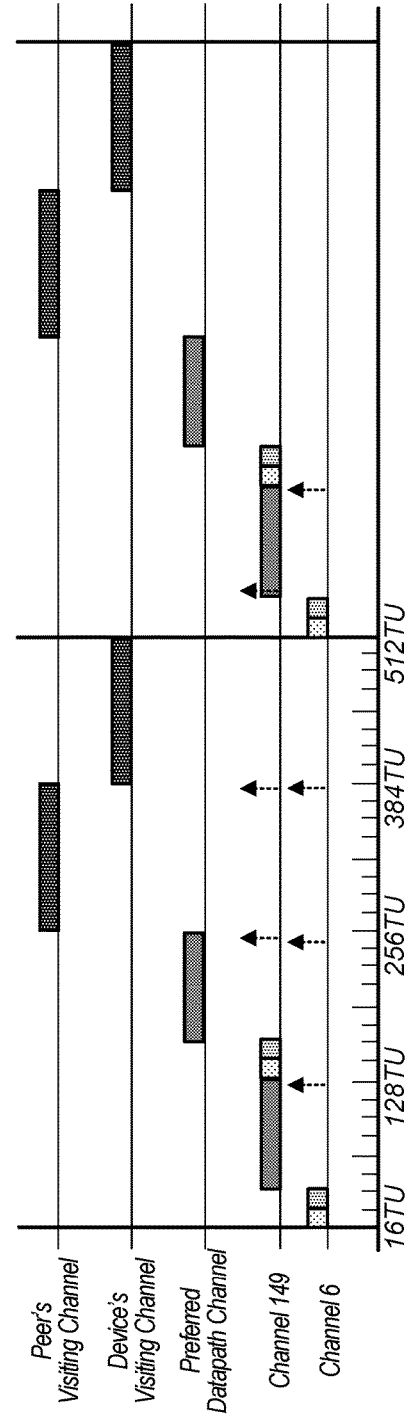
FIG. 24A
FIG. 24B

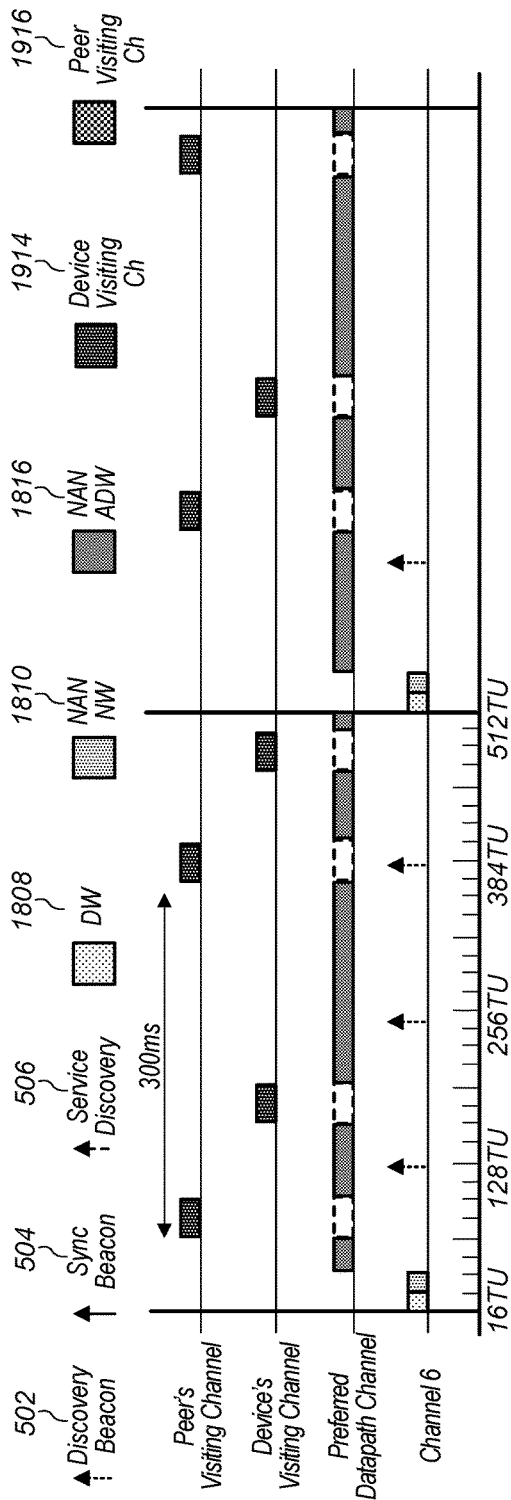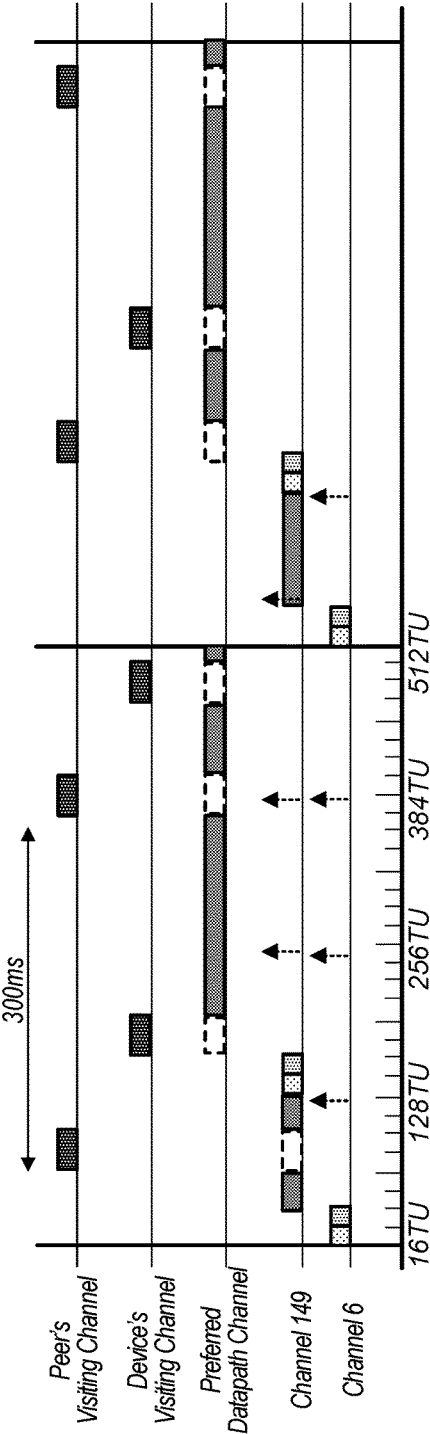

NEIGHBOR AWARENESS NETWORKING DATAPATH

PRIORITY DATA

This application claims benefit of priority to U.S. Provisional Application Ser. No. 62/089,178, titled "Neighbor Awareness Networking Datapath", filed Dec. 8, 2014, by Yong Liu, Christiaan A. Hartman, Daniel R. Borges, Peter Heerboth, Lawrie Kurian, Su Khiong Yong, Anand Rajagopalan, Saravanan Balasubramaniyan, Tashbeeb Hague, and Andreas Wolf, U.S. Provisional Application Ser. No. 62/107,983, titled "Neighbor Awareness Networking Datapath", filed Jan. 26, 2015, by Yong Liu, Christiaan A. Hartman, Daniel R. Borges, Peter Heerboth, Lawrie Kurian, Su Khiong Yong, Anand Rajagopalan, Saravanan Balasubramaniyan, Tashbeeb Hague, and Andreas Wolf, and U.S. Provisional Application Ser. No. 62/136,276, titled "Neighbor Awareness Networking Datapath", filed Mar. 20, 2015, by Yong Liu, Christiaan A. Hartman, Daniel R. Borges, Peter Heerboth, Lawrie Kurian, Su Khiong Yong, Anand Rajagopalan, Saravanan Balasubramaniyan, Tashbeeb Hague, Andreas Wolf, Guoqing Li, Lilach Zukerman, and Oren Shani, which are all hereby incorporated by reference in their entirety as though fully and completely set forth herein.

FIELD

The present application relates to wireless communications, including techniques for wireless communication among client stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "wireless stations", "user devices" or STA or UE for short. Client stations can be either wireless access points or wireless clients (or wireless stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client stations (or devices) are referred to herein as user equipment (or UE for short). Some wireless client stations are also collectively referred to herein as mobile devices or wireless stations (although, as noted above, wireless client devices overall may be stationary devices as well).

In some prior art systems Wi-Fi wireless stations are able to communicate directly with each other without using an intermediate access point. However, improvements in the operation of such devices are desired, such as in setup and coordination of the communication between such devices.

SUMMARY

Embodiments described herein relate to a system and method of datapath scheduling and synchronization between peer devices.

Embodiments relate to a client station that includes one or more antennas, one or more radios, and one or more processors coupled to the radios. At least one radio is configured to perform Wi-Fi communications. The wireless station may perform voice and/or data communications, as well as the methods described herein.

In one set of embodiments, one or more client stations operate to configure Neighbor Awareness Networking (NAN)—direct communication with neighboring client stations, i.e., direct communication between the client stations without utilizing an intermediate access point. Embodiments of the disclosure relate to NAN datapath scheduling and NAN pre-datapath operation setup and scheduling. The NAN datapath embodiments described herein provide a mechanism through which devices can communicate and provide services. Aspects of the datapath development include datapath scheduling, including datapath setup and scheduling attributes, as well as pre-datapath operation triggering and scheduling. Scheduling may include determination of a type of datapath, including paging and synchronized datapaths. NAN data cluster base schedules may be scheduled as equal-sets or subsets of datapath schedules. The datapath model may be implemented for unicast and multicast communication between client stations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 17A-17D illustrate possible availability of a publisher and a subscriber during multiple windows of a discovery window, according to embodiments.

FIG. 18A illustrates a channel sequence resource allocation in which a NAN social channel may be allocated as the datapath channel for single band, according to embodiments.

FIG. 18B illustrates a channel sequence resource allocation in which a NAN social channel may be allocated as the datapath channel for dual band, according to embodiments.

FIG. 19A illustrates a channel sequence resource allocation including a single concurrent channel with soft switch for single band, according to embodiments.

FIG. 19B illustrates a channel sequence resource allocation including a single concurrent channel with soft switch for dual band, according to embodiments.

FIG. 20A illustrates a channel sequence resource allocation including dual concurrent channels with soft switch for single band, according to embodiments.

FIG. 20B illustrates a channel sequence resource allocation including dual concurrent channels with soft switch for dual band, according to embodiments.

FIG. 21A illustrates a channel sequence resource allocation allowing devices to visit multiple different channels without fixed visiting time points for single band, according to embodiments.

FIG. 21B illustrates a channel sequence resource allocation allowing devices to visit multiple different channels without fixed visiting time points for dual band, according to embodiments.

FIG. 22A illustrates another channel sequence resource allocation allowing for devices to visit multiple different channels at fixed time points for single band, according to embodiments.

FIG. 22B illustrates another channel sequence resource allocation allowing for devices to visit multiple different channels at fixed time points for dual band, according to embodiments.

FIG. 23A illustrates a channel sequence allocation allowing for devices to agree on a datapath channel for single band, according to embodiments.

FIG. 23B illustrates a channel sequence allocation allowing for devices to agree on a datapath channel for dual band, according to embodiments.

FIG. 24A illustrates a channel sequence resource allocation allowing devices to visit multiple different channels without fixed visiting time points and agree on a datapath channel for single band, according to embodiments.

FIG. 24B illustrates a channel sequence resource allocation allowing devices to visit multiple different channels without fixed visiting time points and agree on a datapath channel for dual band, according to embodiments.

FIG. 25A illustrates a channel sequence resource allocation allowing devices to visit multiple different channels with fixed visiting time points and agree on a datapath channel for single band, according to embodiments.

FIG. 25B illustrates a channel sequence resource allocation allowing devices to visit multiple different channels with fixed visiting time points and agree on a datapath channel for dual band, according to embodiments.

Figure 1:
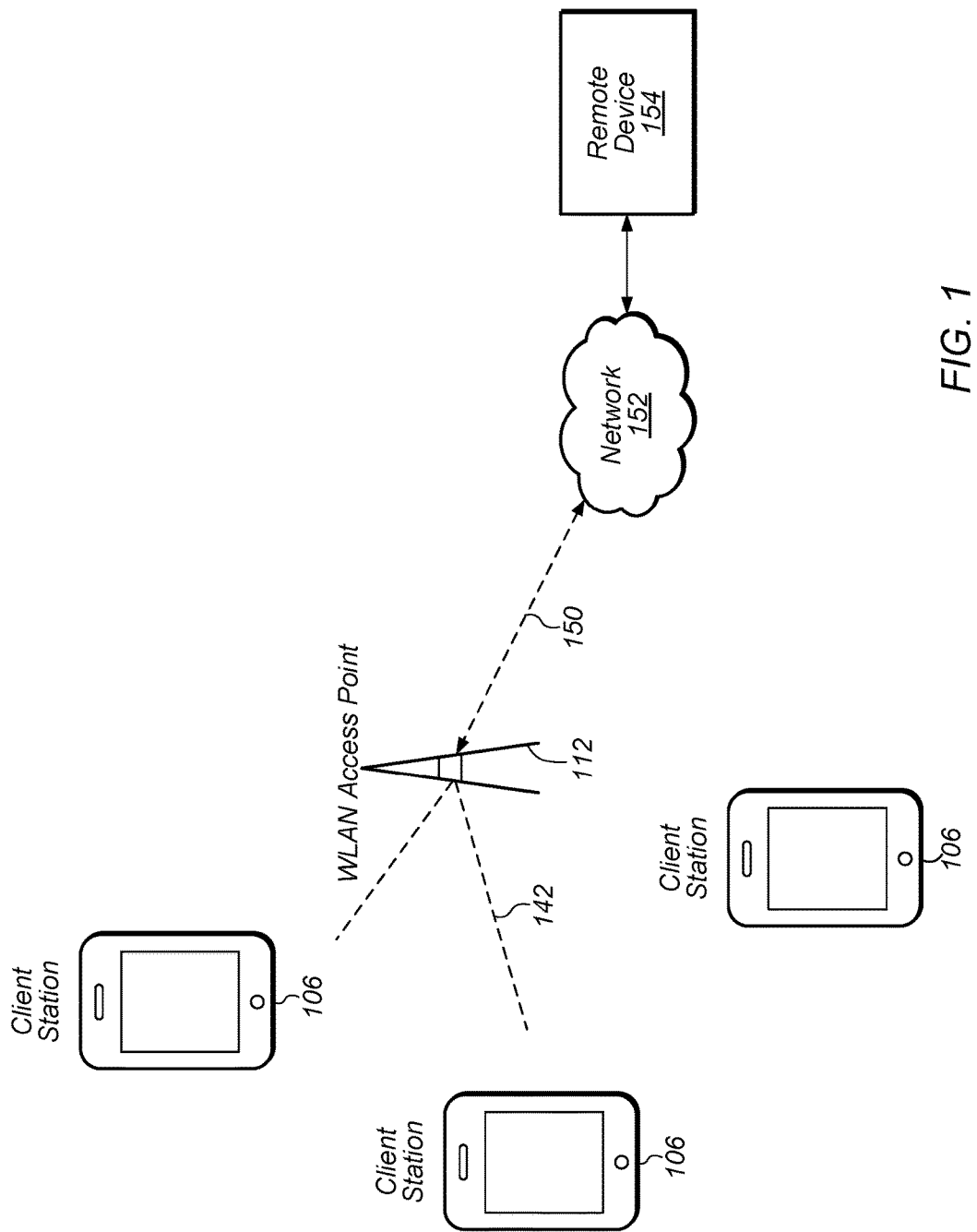
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Wireless station)—any of various types of computer systems devices which are mobile or portable and which perform wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one client station 106 is configured to communicate directly with one or more neighboring client stations (e.g., another client station 106), without use of the access point 112.

Figure 2:
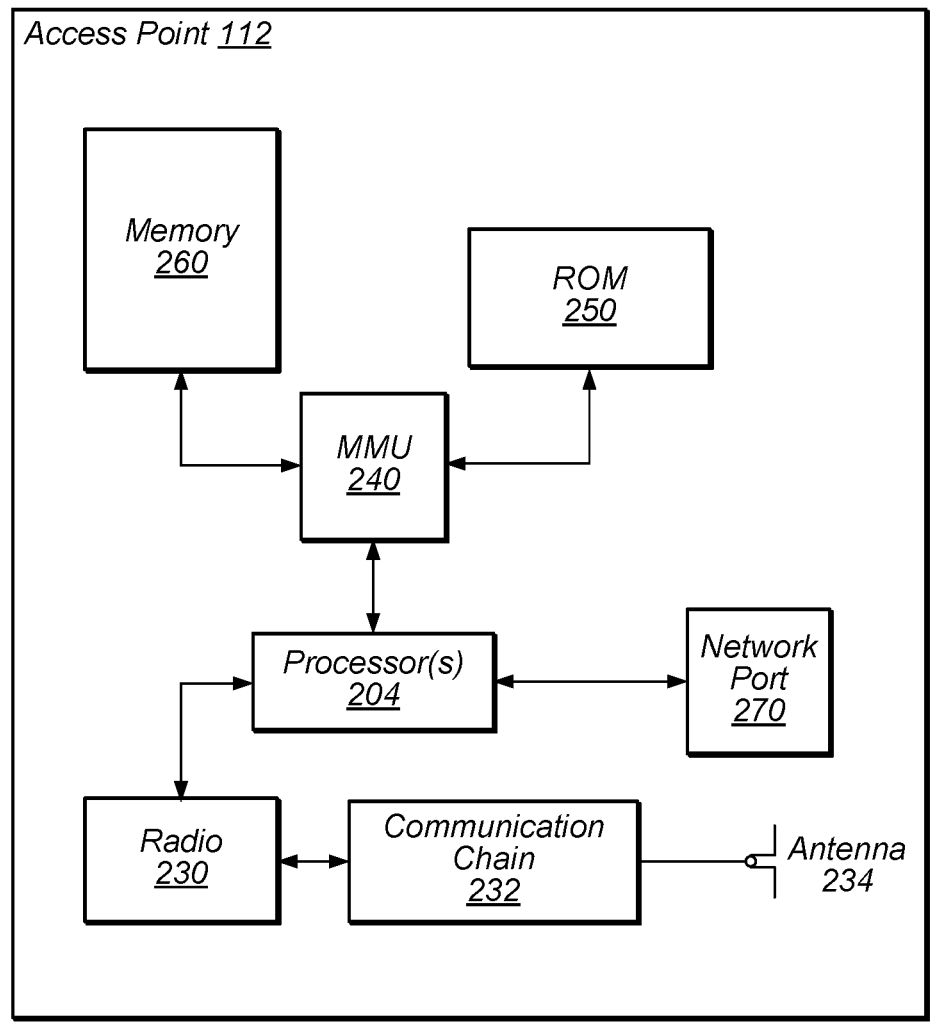
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is merely one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as client stations 106, access to the Internet. For example, the network port 270 (or an additional network port) may be configured to couple to a local network, such as a home network or an enterprise network. For example port 270 may be an Ethernet port. The local network may provide connectivity to additional networks, such as the Internet.

The AP 112 may include at least one antenna 234. The at least one antenna 234 may be configured to operate as a wireless transceiver and may be further configured to communicate with client station 106 via wireless communication circuitry (or radio) 230. The antenna 234 communicates with the wireless communication circuitry 230 via communication chain 232. Communication chain 232 may comprise one or more receive chains, one or more transmit chains or both. The wireless communication circuitry 230 may be configured to communicate via Wi-Fi or WLAN, e.g., 802.11. Any 802.11 protocol may be used, including 802.11a, b, g, n, ac, and ax. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Figure 3:
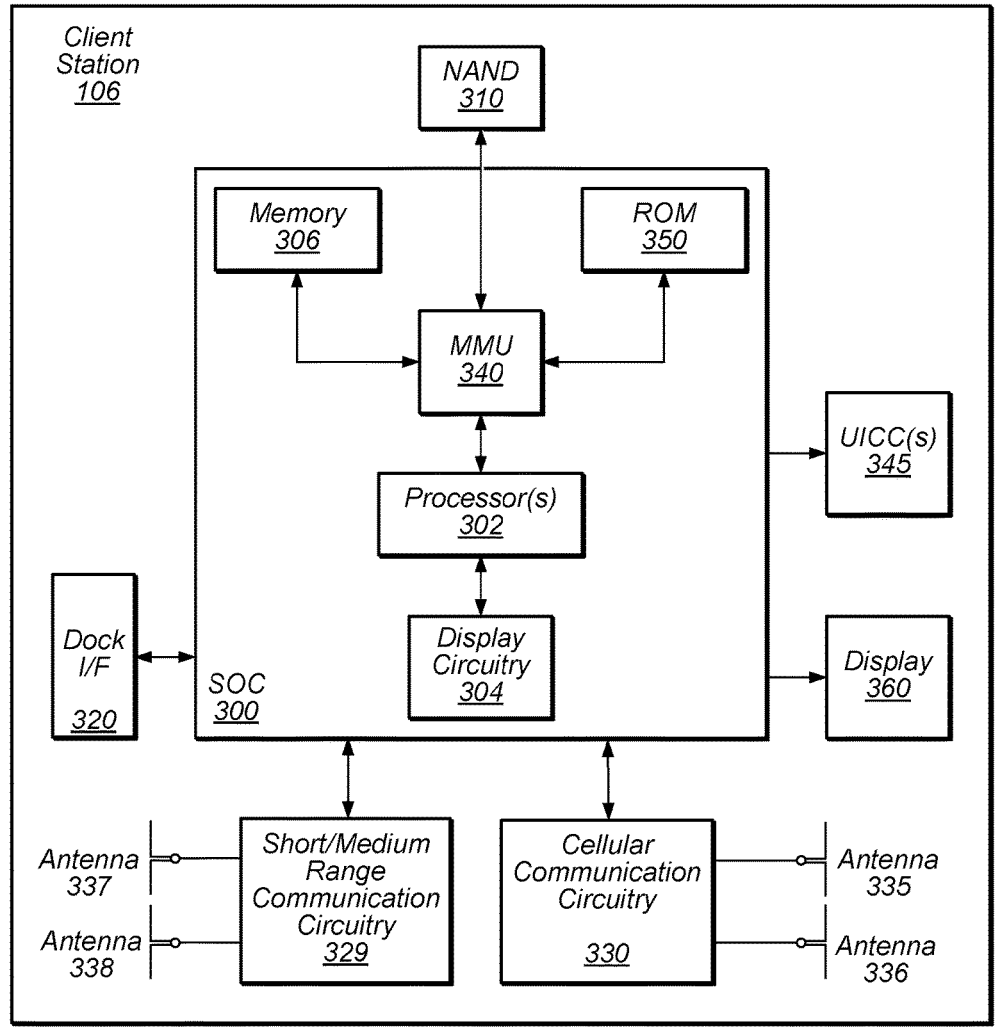
FIG. 3 illustrates an example simplified block diagram of a client station, according to some embodiments.

FIG. 3—Client Station Block Diagram

FIG. 3 illustrates an example simplified block diagram of a client station 106. According to embodiments, client station 106 may be a user equipment device (UE), a mobile device or wireless station, and/or a wireless device, client station, or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further comprise one or more smart cards 310 that comprise SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may comprise multiple receive chains and/or multiple transmit chains for receiving and/or transmitting multiple spatial streams, such as in a multiple-input multiple output (MIMO) configuration.

As shown, the SOC 300 may include processor(s) 302 which may execute program instructions for the client station 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each be comprised of one or more processing elements. In other words, one or more processing elements may be included in cellular communication circuitry 330 and short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer-to-peer manner, i.e., without the communications going through an access point. There are currently two types of Wi-Fi peer to peer networking protocols in the Wi-Fi Alliance. In one type of peer to peer protocol, when two Wi-Fi devices (e.g., client stations) communicate with each other, one of the Wi-Fi devices essentially acts as a pseudo access point and the other acts as a client device. In a second type of Wi-Fi peer to peer protocol, referred to as neighbor awareness networking (NAN), the two Wi-Fi client devices (client stations or wireless stations) act as similar peer devices in communicating with each other, i.e., neither one behaves as an access point.

Figure 4:
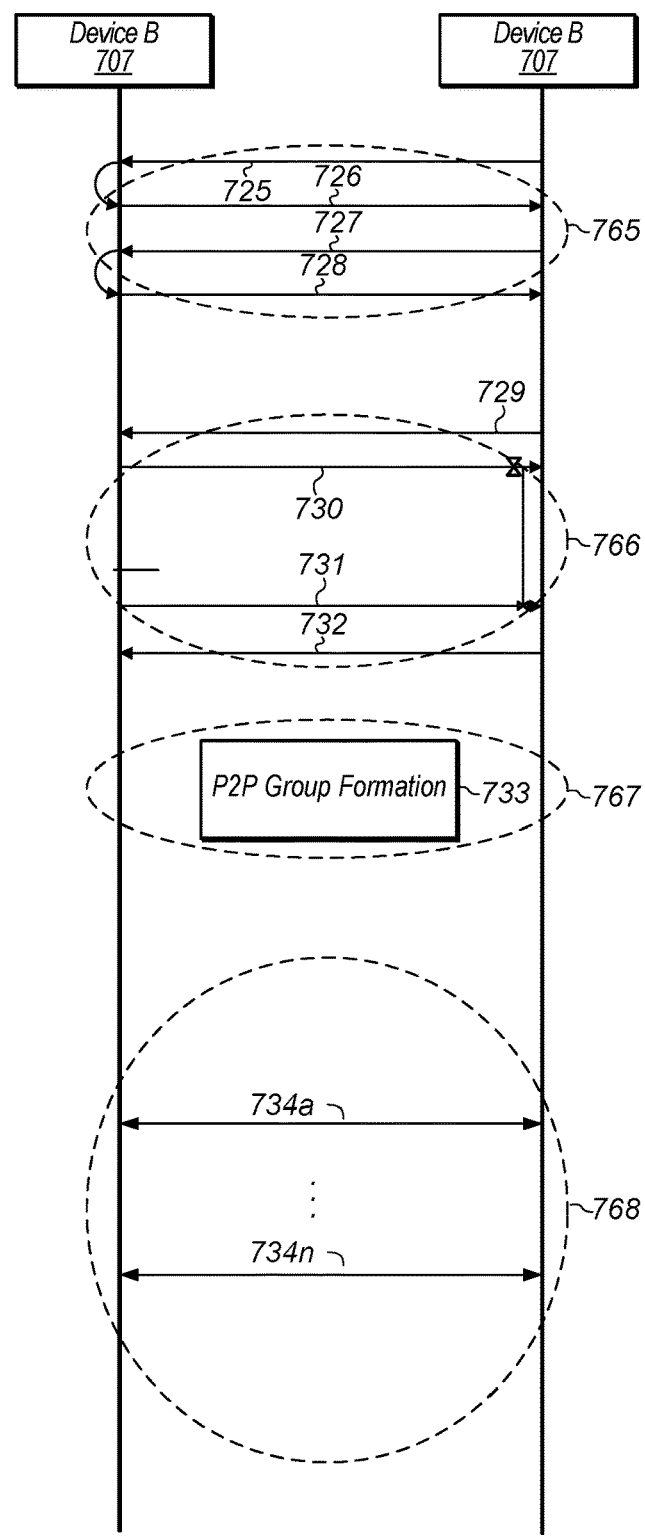
FIG. 4 illustrates a process of service and discovery for a peer to peer communication protocol in which one device is a pseudo access point, according to prior art.

FIG. 4 illustrates a process of service and discovery for a peer to peer communication protocol in which one device is a pseudo access point, according to prior art. The first step (765) is peer-to-peer (P2P) device and service discovery. The second step (766) is initialization of P2P datapath setup. The third step (767) is medium access control (MAC) layer datapath setup, including MAC level security association. The fourth step (768) is TCP/IP level data path setup utilizing application service platform (ASP) coordination protocol. Note that MAC level security is required for each datapath setup which can lead to increased overhead.

At step 765, the service seeking device (device B 707) initiates setup via P2P probe request 725 to service advertising device (device A 702). In response, device A sends P2P probe response 726 which includes setup attributes service name(s) and advertisement ID. Next, device B responds with P2P service discovery request 727 which includes setup attributes services names and service information request. Then, in response, device A sends P2P service discovery response 728, which can include any or all of setup attributes service name, advertisements ID, and service status. At this point P2P device and service discovery is complete.

At step 766, a P2P datapath setup is initialized. Thus, device B sends P2P provision discovery request 729 to device A. In response, device A sends P2P provision discovery response 730 with status (1) to device B and sets a timer to await user input. Once the session is confirmed (prior to the timer expiring) device A sends P2P provision discover response 731 with status (12) (success). In response, device B sends provision discovery response 732 with status 0.

At step 767, the MAC level datapath setup is completed. This includes MAC level security association. In this step, the devices will use P2P group formation protocol 733 to form or join a P2P group (e.g., to form a Wi-Fi direct group). Additionally, the devices determine the relationship between the devices, i.e., which device will be the master (or primary) and which will be the slave (or secondary). Once the relationship has been established, all MAC level setup, including security associations, is completed.

At step 768, the devices perform the TCP/IP level datapath setup via an ASP coordination protocol. In this step, messages 734a-734n are exchanged to verify the version of the ASP and to assign a port to transfer data. Once the port has been assigned, the data transfer between the devices can proceed.

The NAN protocol includes two aspects: 1) synchronization and discovery (NAN 1.0) and 2) datapath transmission (NAN 2.0). NAN 1.0 describes methods for NAN protocol synchronization and discovery. In a NAN system, every client station may implement methods to ensure that synchronization with a neighboring client station to which it is communicating. Further, a client station may negotiate a common discovery window for exchange of synchronization packets to help ensure the devices that are communicating directly with each other are properly synchronized to enable the communication. Once two client stations have the same discovery window they may exchange synchronization packets to stay synchronized with each other. The client stations may also use the discovery window to exchange service discovery frames to convey other information such as further availability beyond discovery windows.

Figure 5A:
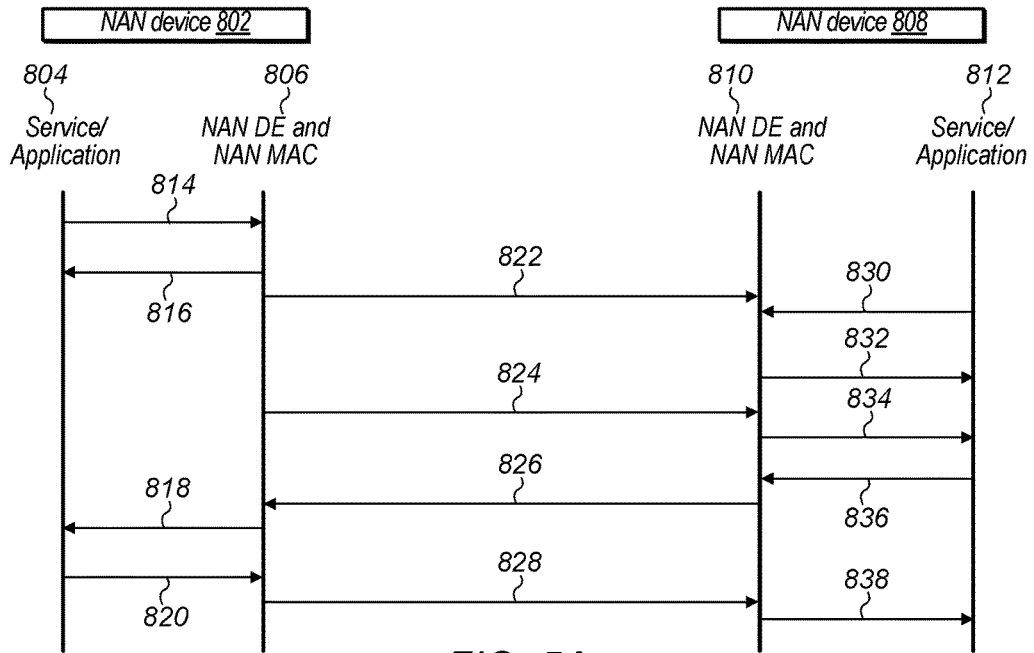
FIGS. 5A-5B illustrate a NAN light service discovery signaling scheme according to prior art.
Figure 5B:
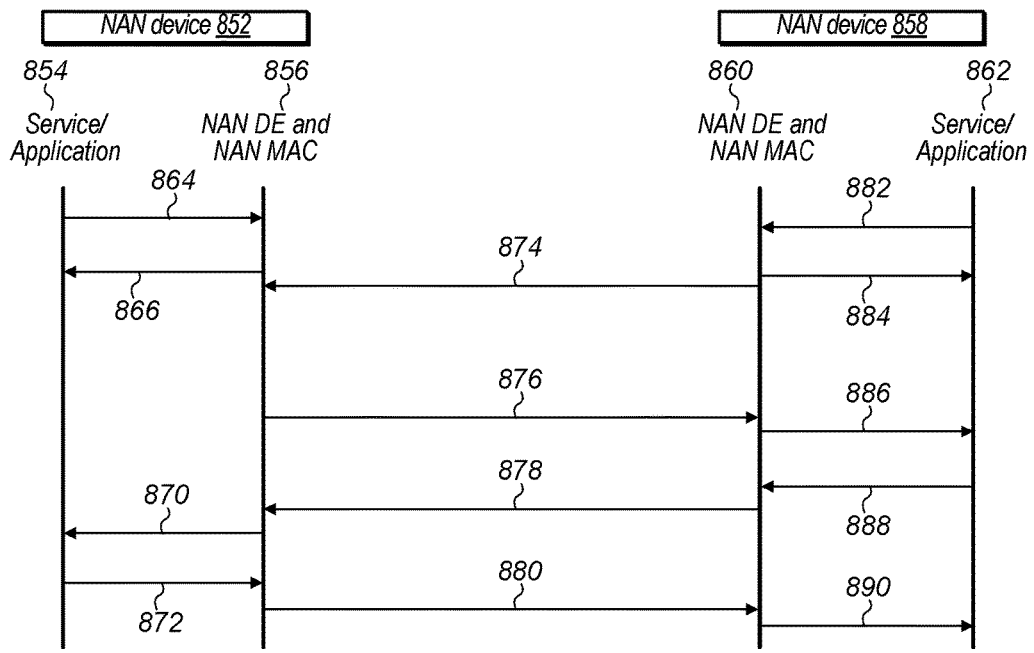

FIGS. 5A-5B illustrate a NAN light service discovery signaling scheme according to prior art. In particular, FIG. 5A illustrates signaling for an unsolicited service publish case and FIG. 5B illustrates signaling for a solicited service publish case.

Turning to FIG. 5A (unsolicited case), a service/application 804 included on (or comprised in) NAN device 802 may publish a service 814 to a NAN Discovery Engine (DE) and NAN MAC layer 806 of NAN device 802. NAN DE and NAN MAC layer 806 may send a publish identification message 816 to service/application 804 and NAN device 802 may then broadcast NAN SDF publish messages 822 and 824. NAN device 808 may receive NAN SDF publish message 822 at its NAN DE and NAN MAC layer 810. In addition, a service/application 812 on (or comprised in) NAN device 808 may send a subscribe message 830 to NAN DE and NAN MAC 810 which may respond with subscribing information 832 and 834. If NAN device 808 is interested in this service, service/application 812 may send a message 836 to NAN DE and NAN MAC 810 which may then send a NAN SDF follow-up message 826 to NAN device 802 to request more service information. NAN DE and NAN MAC layer 806 may exchange messages 818 and 820 with service/application 804 regarding the service information and NAN device 802 may respond with a NAN SDF follow-up message 828 to provide more service information, and the NAN service is discovered. In addition, NAN DE and NAN MAC 810 may notify service/application 812 of the NAN SDF follow-up message 828 via message 838.

Turning to FIG. 5B (solicited case), NAN device 858 may initiate signaling by broadcasting NAN SDF subscribe request 874. Thus, a service/application 862 may exchange messages 882 and 884 NAN DE and NAN MAC 860 of NAN device 858. Additionally, a service/application 854 of NAN device 852 may exchange messages 864 and 866 with NAN DE and NAN MAC 856 to indicate that there is a service to publish. If response criteria is met (e.g., SID, matching filter, and/or SRF), NAN device 852 may respond to NAN device 858 with a NAN SDF publish message 876. NAN DE and NAN MAC 850 may exchange messages 886 and 888 with service/application 862 to notify service/application 862 of the published service. Further, the NAN devices may exchange NAN SDF follow-up messages 878 and 880 for further service discovery. NAN DE and NAN MAC 859 may exchange messages 870 and 872 with service/application 854 and NAN DE and NAN MAC 860 may send message 890 to service/application 862 as part of the further service discovery.

As mentioned above, and unlike Wi-Fi direct, NAN datapath setup is not defined. Further, the requirement of MAC level security for Wi-Fi direct datapaths increases signaling overhead.

Described herein are various systems and methods used for datapath transmission, including datapath setup, creation of a datapath negotiation window, datapath synchronization, and datapath resource allocation. After two client stations have discovered each other (e.g., per NAN 1.0 as described in reference to FIGS. 5A and 5B), the client stations may implement a procedure to setup a NAN datapath. After this, the two client stations arrange for a common datapath negotiation window to negotiate capabilities, synchronization requirements, and exchange further service information. The datapath negotiation window is a time window that enables client stations to communicate with each other so that they can negotiate these capabilities and synchronization requirements and exchange this further service information. Once the datapath negotiation window has been established and NAN datapath setup has been performed, the client stations may perform datapath synchronization to help ensure that the two client stations remain synchronized with one another for proper communication. Once several client stations decide to establish datapaths among themselves, they may use the NAN 1.0 synchronization framework to synchronize themselves for communication. However, in at least some scenarios the NAN 1.0 framework is not adequate to maintain synchronization among the client stations. Thus embodiments described herein may provide further synchronization capabilities, i.e., an enhanced synchronization framework, to help ensure that peer client station datapaths remain synchronized with each other. Finally, datapath resource allocation relates to peer client stations communicating with each other regarding a common time slot and channel for communication. In other words, the peer client stations communicate with each other regarding which channel they should use and at which time slot, to help ensure proper communication between them. Additionally, the peer client stations communicate with each other regarding which channel and time slot each would prefer to use for future communications between the peer client stations. These are described in greater detail below.

Figure 6:
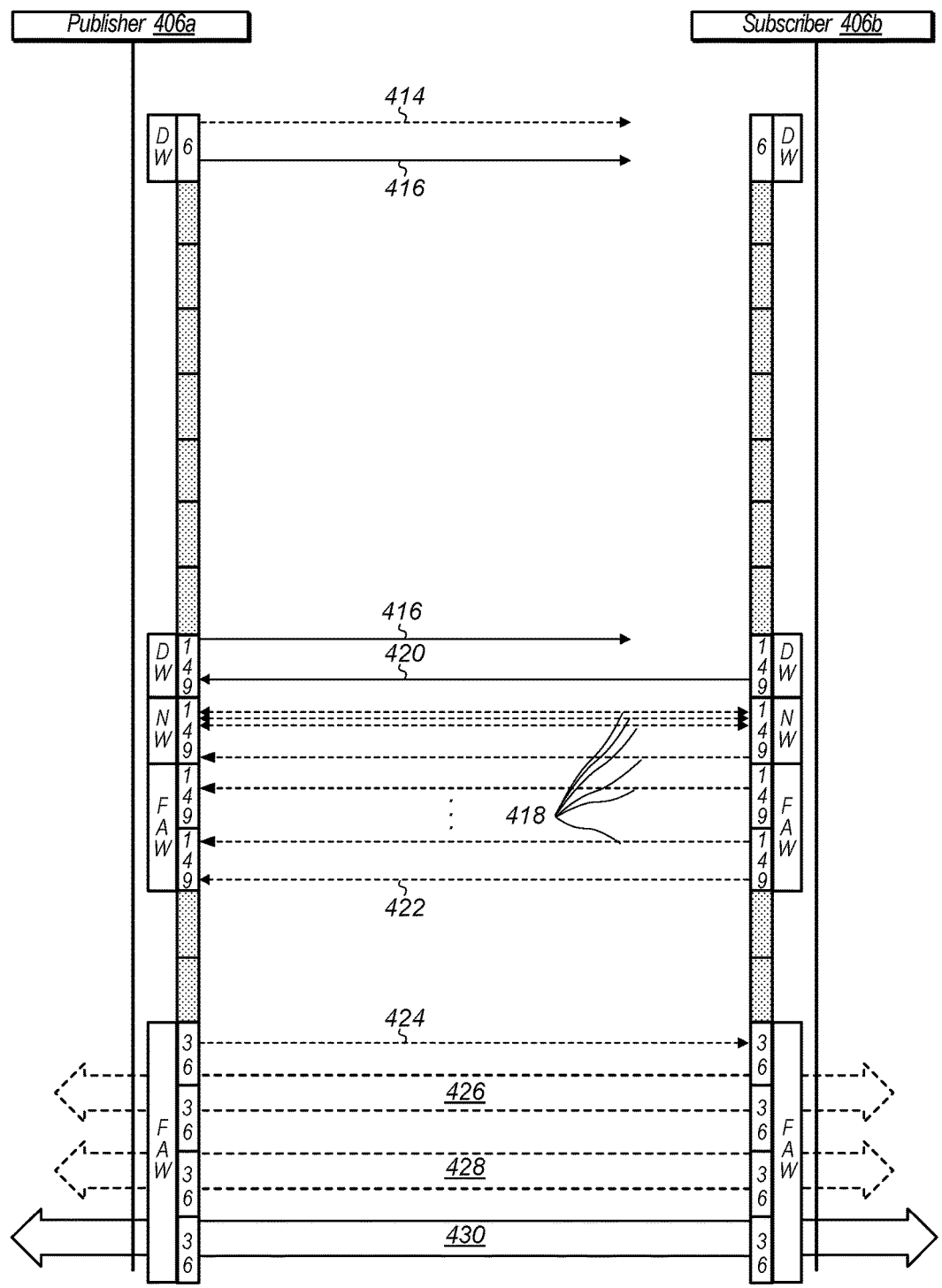
FIG. 6 illustrates signaling for a method for establishing a datapath between peer NAN client stations, according to some embodiments.

Wi-Fi NAN Datapath Setup (FIG. 6)

In some embodiments, after two wireless (or client) stations have discovered each other at least one respective wireless (or client) station may implement a procedure to setup a NAN datapath between the two wireless stations so that they can properly communicate.

NAN 1.0 defines periodic discovery windows (DWs) for NAN devices to meet, synchronize to the same clock source, and discover each other's services. Once each device in a device pair discovers each other's service, the devices use a mechanism for further service discovery and datapath establishment.

FIG. 6 illustrates signaling for a method for establishing a datapath between peer NAN client stations (e.g., such as client station 106), according to some embodiments. The signaling shown in FIG. 6 may be used in conjunction with any of the systems or devices shown in the above Figures, among other devices. Thus, each NAN client station (or NAN device) may include circuitry and components similar to client station 106 as described above in reference to FIG. 3. In various embodiments, some of the signals shown may be performed concurrently, in a different order than shown, or may be omitted. Additional signals may also be performed as desired. As shown, the signaling may operate as follows.

As shown, a first client station such as publisher 406a may send a beacon 414 for synchronization purposes. Beacon 414 may or may not be received by a second client station such as subscriber 406b. Beacon 414 may be a synchronization beacon and may include a service identification (service ID or SID) list. In addition, publisher 406a may also send service discovery frame (SDF) 416 which may include service information, capability information, and security information. More specifically, SDF 416 may comprise an SID, SInf (service information), FA, CaOp (capabilities and operations elements), security session information, and ChList. The ChList may contain preferred datapath channels. In some embodiments, beacon 414 and SDF 416 may be transmitted on channel 6 during a discovery window (DW) period, where channel 6 is one of a plurality of NAN channels. In addition, publisher 406a may periodically send SDF 416, e.g., publisher 406a may send the SDF in the next discovery window on channel 149.

Subscriber 406b may detect SDF 416 from publisher 406a sent on channel 149 and may responds with SDF 420 to subscribe to publisher 406a. The exchange of SDFs may operate to setup a datapath between subscriber 406b and publisher 406a. For example, the exchange may trigger publisher 406a to prepare for the establishment of a data path with subscriber 406b. In some embodiments, a negotiation window (NW) may be configured by the devices to occur immediately after the DW.

In addition, a further availability window (FAW) may be configured to occur immediately after the NW, as illustrated in FIG. 6. During one or both of the NW and/or the FAW, publisher 406a may send additional SDF frames to subscriber 406b, e.g., where the publisher has more information to transmit. Subscriber 406b may also send one or more SDF frames to publisher 406a. Thus as shown publisher 406a and subscriber 406b may exchange SDF frames 418 to exchange additional information to setup the datapath between them.

For example, assume one of the devices is a printer. This device may provide information on whether it is a black and white or color printer, certain status information, or other information, to the other device.

After the discovery and synchronization process, in a subsequent FAW subscriber 406b (the device seeking service) may initiate a connection setup using provisional discovery request frame 422 that may be sent to publisher 406a. Provisional discovery request frame 422 may be a connection request frame. After provisional discovery request frame 422 is sent, publisher 406a may respond with provisional discovery response frame 424. In addition, the two devices may transmit information to each other to coordinate security association 426, ASP coordination protocol 428, and data 430. The ASP coordination protocol may be used to determine appropriate TCP/IP ports for this bearer exchange, i.e., this communication between the devices, after which the socket is set up and the exchange of data can take place.

NAN Datapath Setup

According to embodiments described herein, a datapath may be set up (i.e., established) using various methods or techniques. Note that in some embodiments, the various methods and techniques may be combined. Note further that each device described below (e.g., publisher 406*a* and subscriber 406*b*) may include circuitry and components similar to client station 106 as described above in reference to FIG. 3.

In some embodiments, a two-way (unsolicited publish) or three-way (solicited publish) SDF-handshake may be implemented to exchange both brief service information and datapath setup information. Once brief service information and datapath setup information have been exchanged, a socket connection may be established and post-association service discovery (e.g. Bonjour) may use TCP/IP packets in order for the publisher (e.g., publisher 406*a*) to provide more information to the subscriber (e.g., subscriber 406*b*) about an advertised service. For example, post-association service discovery may use a combination of Bonjour over UDP and/or a TCP/IP connection. Finally, service data may be exchanged.

In some embodiments, a method may involve quickly setting up a TCP/IP connection to create an association and then using further discovery frames for transmitting SDF information after this initial connection has been established. For example, the Bonjour protocol may be used for post-association discovery. Bonjour is a protocol originally intended for use in small home networks, where enterprise services, such as a DHCP server for IP address assignments and a DNS server for name resolution, are not available. Bonjour makes use of multicast techniques to disseminate information in a network without the use of advanced network services.

In some embodiments, a three-way or more SDF-handshake may be implemented to exchange all service information. Note that such embodiments may need (or require) SDF service information segmentation support. For example, in some embodiments, NAN MAC (media access controller) level frames such as SDF action frames may be exchanged. However, a single MAC level frame may not be large enough to transmit all of the required and/or desired information for connection setup, and thus a scheme to segment the information between different SDF transmissions may be implemented. In some embodiments, the MAC level frames may be used to transmit each SDF, and the exchange may require several frames to complete the transmission.

Once service information has been exchanged, a provision exchange may be implemented to initiate session setup. In some embodiments, the provision exchange may use SDFs. Once the provision exchange has occurred, security association and ASP coordination may be completed in order to set up a session and then a socket connection may be established and service data may be exchanged.

In some embodiments, a two-way (unsolicited publish) or three-way (solicited publish) SDF-handshake may be implemented to exchange both brief service information and datapath setup information. Once brief service information and datapath setup information has been exchanged, generic advertisement service (GAS) may be used to exchange further service information. Note that GAS is defined in 802.11 and includes a procedure for fragmenting service information which cannot fit into a single 802.11 MAC level frame.

Once service information has been exchanged, a provision exchange may be implemented to initiate session setup. In some embodiments, the provision exchange may use SDFs. Once the provision exchange has occurred, security association and ASP coordination may be completed in or der to set up a session and then ac socket connection may be established and service data may be exchanged.

As described above, in some embodiments, session setup may include a two or three SDF-handshake (message exchange). In such embodiments, the SDFs may be MAC level frames. In addition, security for the message exchange may be non MAC-level.

In some embodiments, as described above, a publisher may broadcast an SDF or datapath beacon. The SDF (or datapath beacon) may advertise the publisher's capabilities. In addition, such embodiments may use a MAC level frame to transmit partial information, e.g., partial capabilities, and then uses a subsequent provisional message to confirm the capabilities. After the capabilities have been established, the devices can perform security setup as well as ASP coordination, e.g., configure the TCP/IP ports needed for communication. In addition, such embodiments may provide more security than the SDF-handshake exchange.

In some embodiments, a device may include a negotiation window (NW) request in an SDF transmitted in a discover window (DW) to request a peer device to be present in the NW. In some embodiments, the NW may occur 16 time units (TUs) after the DW. Additionally, the devices may exchange further information to setup the datapath in the NW.

In some embodiments, multiple MAC interfaces/addresses may be used. For example, a device can set up multiple datapaths with multiple other peer devices. In some embodiments, one MAC address is used by NAN discovery, where the MAC address can be changed more frequently for privacy protection. In some embodiments, one MAC address is shared by all unsecured sessions, and another MAC address is shared by secured sessions. A service session may request a dedicated MAC interface for highest level security NAN Fast Datapath Setup—Post-Session Further Service Discovery (FIGS. 7A-7B)

Figure 7A:
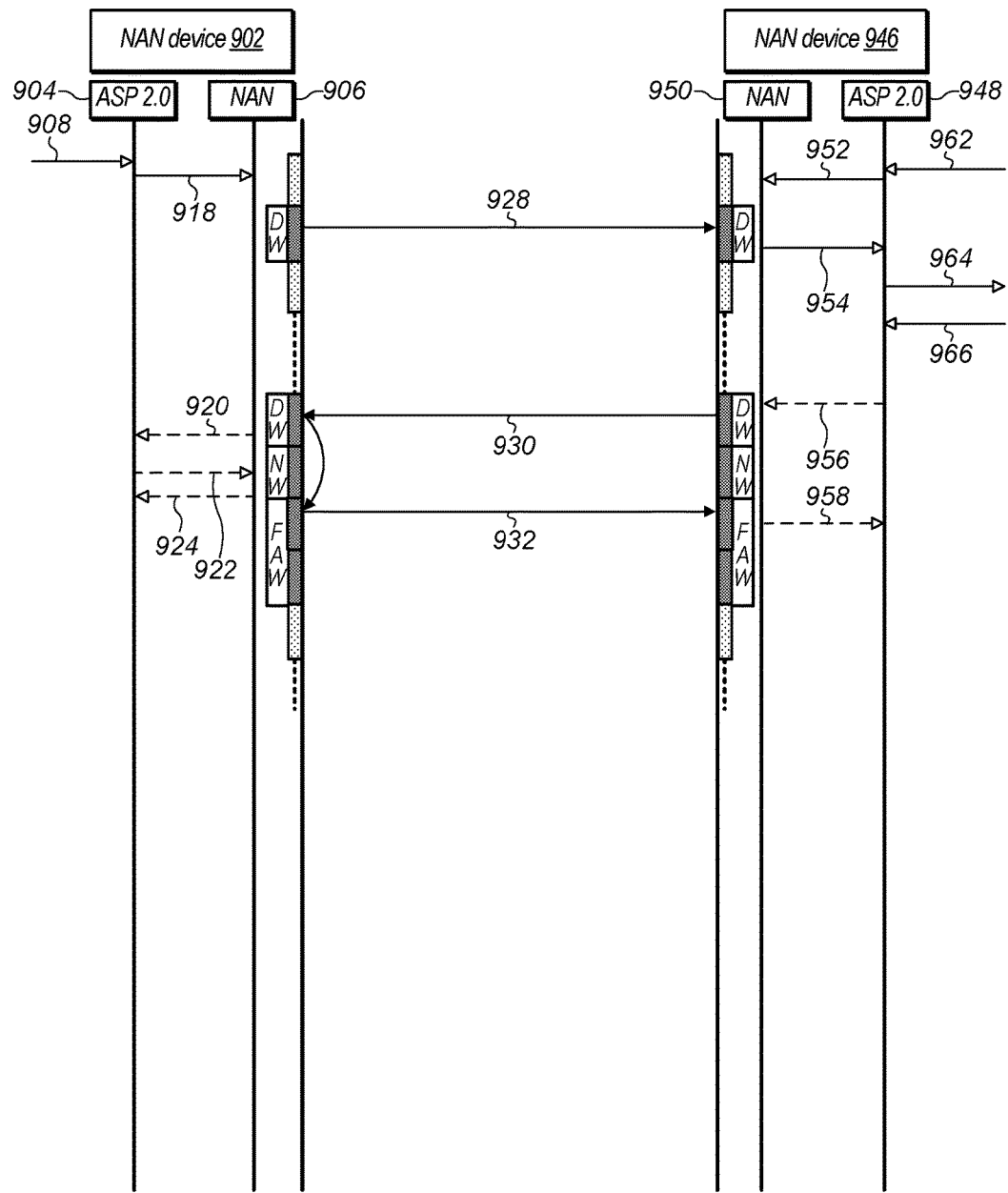
FIGS. 7A and 7B illustrate signaling for an unsecured fast datapath setup with post-session further service discovery, according to some embodiments.
Figure 7B:
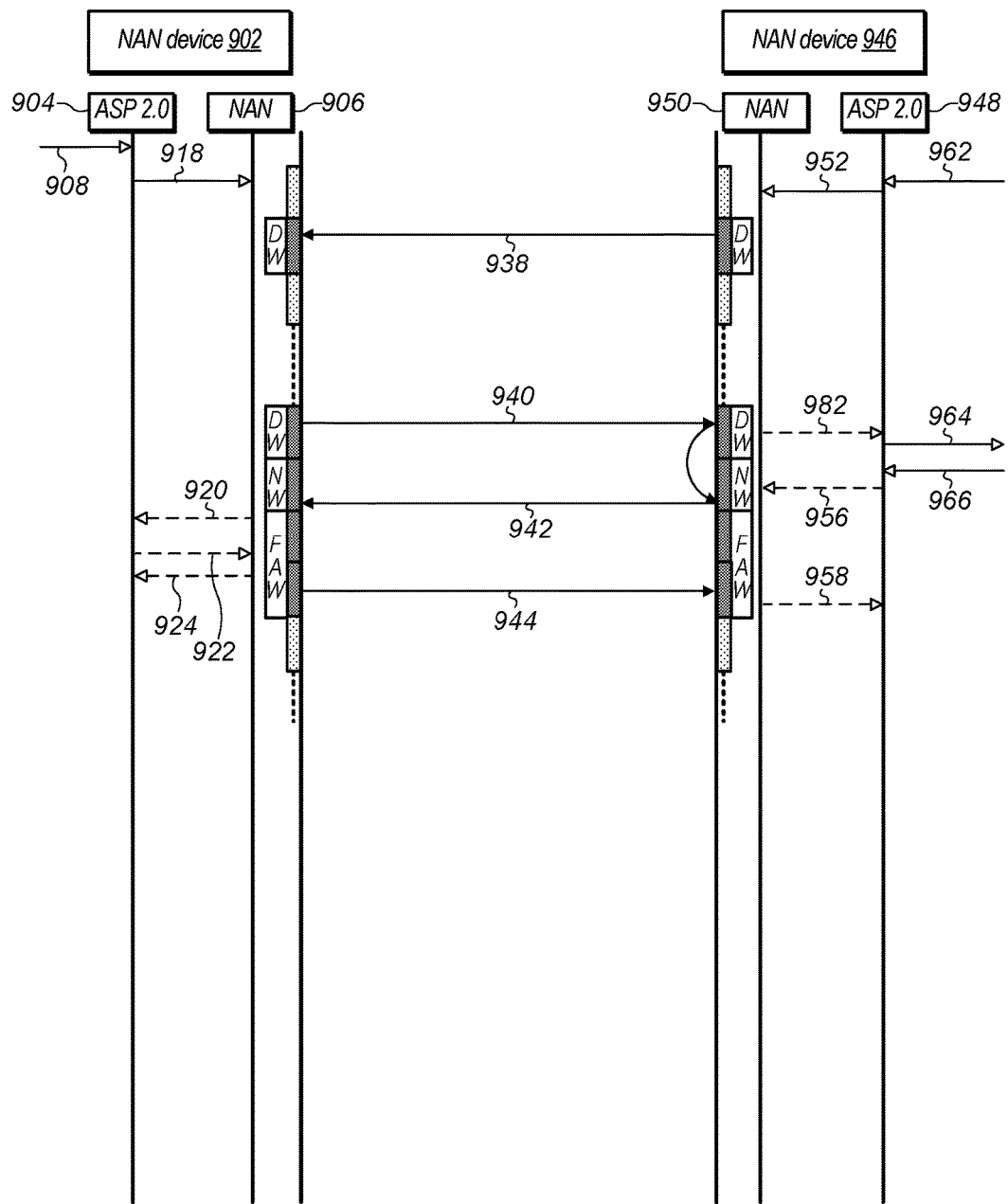

FIGS. 7A and 7B illustrate signaling for an unsecured fast datapath setup with post-session further service discovery, according to some embodiments. In particular, FIG. 7A illustrates signaling for an unsolicited service publish case and FIG. 7B illustrates signaling for a solicited service publish case. The signaling shown in FIGS. 7A and 7B may be used in conjunction with any of the systems or devices shown in the above Figures, among other devices. Thus, each NAN client station (or NAN device) may include circuitry and components similar to client station 106 as described above in reference to FIG. 3. In various embodiments, some of the signals shown may be performed concurrently, in a different order than shown, or may be omitted. Additional signaling may also be performed as desired.

Turning to FIG. 7A, when the service is published by a publishing NAN device (e.g., by NAN device 902) without being solicited (i.e., an unsolicited service publish), embodiments may require only three messages to setup (i.e., establish) a NAN datapath. A publishing NAN device, or publisher, (e.g., NAN device 902)) may keep a TCP/UDP port open and/or available during a discovery window (DW) via a message 908 received at an application service platform layer (ASP 2.0) 904 and conveyed to NAN layer 906 via message 918. The publisher may publish service information (e.g., notify via a message 928, e.g., a broadcast message) a subscriber(s) (i.e., a subscribing NAN device(s) such as NAN device 946) in a first frame transmitted in a DW. A first service discovery frame (SDF) (published in the first frame transmitted in the DW) may include one or more attributes that may include fields describing the published service. The first SDF may include SD (Service Descriptor) [FSE (Fast Session Enable parameters)], FA (further availability), preferredFA (preferred further availability), and/or capabilities attributes, among other attributes. The SD[FSE] (service descriptor with fast session enable parameters) attribute may include fields such as service_port and service_proto (service protocol, like TCP or UDP). Note that Table 1 includes a description of the fields for each of the attributes described herein.

An application on a subscribing NAN device, or subscriber, (e.g., NAN device 946) may seek a service and notify ASP 2.0 948 via message 962 and ASP 2.0 948 may notify NAN layer 950 via message 952. In addition, when NAN device 946 receives the first SDF (e.g. message 928) during (or in) the DW, NAN layer 950 may report the results (e.g., DiscResult_2.0) via message 954 to ASP 2.0 948 (e.g., a higher protocol layer) of NAN device 946. In some embodiments, the DiscResult2.0 attribute (or primitive) may include the service port (e.g., service_port), service protocol (e.g., service_proto) as well as additional service information. ASP 2.0 948 may report the results to higher layers (e.g., the application layer) via message 964. Then, if NAN device 946 decides to consume the service, it may notify ASP 2.0 948 via message 966 may create a new session and deliver the session ID and its MAC interface address (which can be used to derive its iPV6 address) and pass the new session information to NAN layer 950 via message 956. Then, NAN layer 950 may send message 930 to NAN device 902 including the new session to NAN device 902.

NAN layer 906 may receive message 930 and may send a connect session request (e.g., a connectsessions request) in message 920 to ASP 2.0 904. In response, ASP 2.0 904 may create a new session, and send a NAN session connect request (e.g., a NANSession connect request) to NAN layer 906 via message 922. The NAN session connect request may request that NAN layer 906 generate or select NAN device 946's MAC interface address for the session. Note that NAN device 946's MAC interface address can be used to derive the subscriber's IPv6 address for the session (datapath). In addition, NAN layer 906 may send connection information to ASP 2.0 904 via message 924. NAN layer 906 may also send message 932 to NAN layer 950 to confirm the new session and also deliver NAN device 902's MAC interface address (and its iPv6 address). NAN layer 950 may pass information received in message 932 to ASP 2.0 948 via message 958.

In some embodiments, after receipt of the first SDF (e.g., message 928), a subscribing NAN device, or subscriber, (e.g., NAN device 946) may, during subsequent DWs, send a second SDF (e.g., message 930) to a publishing NAN device, or publisher, (e.g., NAN device 902) which may include one or more attributes that may include fields describing or defining the NAN datapath session. Thus, the second SDF may include SD[FSR], FA, NW_Req, preferredFA, and capabilities attributes, among other attributes. The SD[FSR] (service descriptor with fast session request parameters) attribute may include fields session_id and subscriber_mac.

In response, the publishing NAN device, or publisher, may report a NANSessionReq to its ASP 2.0 layer (e.g., ASP 2.0 904). If a service accepts the NAN Session Request, it may issue a NANSessionConfirm to the NAN layer, which may trigger the NAN layer to generate or select the publishing NAN device's MAC interface address for the session. The publishing NAN device's MAC interface address can be used to derive the publishing NAN device's IPv6 address for the session (datapath). Additionally, the publishing NAN device may update its further availability.

In addition, during a next further availability window (FAW), the publishing NAN device may transmit a third SDF (e.g., message 932) to the subscriber to confirm the session setup. The third SDF may include one or more attributes confirming the datapath and the publishing NAN device's addresses. Thus, the third SDF may include SD[FSC] and FA attributes, among other attributes. The SD[FSC] (service descriptor with fast session confirm parameters) attribute may include fields session_id, subscriber_mac, service_mac (i.e. the publishing NAN device's MAC interface address), service_port, and service_proto. Note that the NAN datapath may be established (setup) upon confirmation (i.e., when the publishing NAN device sends, and the subscriber receives, the third SDF).

Once the NAN datapath has been setup, the NAN layer may pass control of the session (datapath) to an upper layer (e.g., the application layer) to complete the TCP/IP level datapath setup. Additionally, the NAN layer may rely on the upper layer to conduct TCP/IP based further service discovery as shown.

TABLE 1

Fast Datapath Setup Attributes

| Attribute | Fields |
|---|---|
| FastSessionIndication (FSI) | 1) 0: support, 1: do not support |
| FastSessionEabled (FSE) | 1) service_port |
|  | 2) service_proto |
| FastSessionConfirm (FSC) | 1) session_id |
|  | 2) subscriber_mac |
|  | 3) service_mac |
|  | 4) service_port |
|  | 5) service_proto |
| Subscribe_2.0 | 1) service_name |
| (returns subscribe_id) | 2) matching_filter_rx |
| fast_session_indication values: | 3) matching_filter_tx |
| 0: do not support fast session | 4) service_specific_info |
| setup | 5) configuration_parameters |
| 1: support fast session setup | 6) fast_session_indication |
| Publish_2.0 | 1) service_name |
| (returns publish_id) | 2) matching_filter_tx |
| fast_session_parameters | 3) matching_filter_rx |
| includes: | 4) service_specific_info |
| 1) service_port | 5) configuration_parameters |
| 2) service_proto | 6) fast_session_parameters |
| . . . |  |
| DiscoveryResult_2.0 | 1) subscribe_id |
| fast_session_info includes: | 2) service_specific_info |
| 1) service_port | 3) publish_id |
| 2) service_proto | 4) address |
|  | 5) fast_session_info |
| NANSessionConnect_transmit | 1) handle |
| (returns subscriber_mac) | 2) service_specific_info |
|  | 3) configuration_parameters |
|  | 4) service_mac |
|  | 5) session_id |
|  | . . . |
| NANSessionReq_receive | 1) id |
|  | 2) peer_instance_id |
|  | 3) service_specific_info |
|  | 4) subscriber_mac_address |
|  | 5) session_id |
|  | . . . |
| NANSessionConfirm_transmit | 1) handle |
| (returns (service_mac) | 2) service_specific_info |
| fast_session_parameters | 3) configuration_parameters |

TABLE 1-continued

Fast Datapath Setup Attributes

| Attribute | Fields |
|---|---|
| includes: | 4) session_id |
| 1) service_port | 4) subscriber_mac |
| 2) service_proto | 5) fast_session_parameters |
| . . . | 6) status |
| InterfaceStatus | 1) publish_id |
|  | 2) service_mac |
|  | 3) status |
| NANSessionStatus_receive | 1) id |
| fast_session_parameters | 2) peer_instance_id |
| includes: | 3) service_specific_info |
| 1) service_port | 4) service_mac_address |
| 2) service_proto | 5) session_id |
| . . . | 6) subscriber_mac |
|  | 7) fast_session_parameters |
|  | 8) status |
| CloseSession | 1) subscriber_mac |
|  | 2) session_id |

Turning to FIG. 7B, when a service is published (e.g., by a publishing NAN device such as NAN device 902) once it has been solicited (e.g., by a subscribing NAN device such as NAN device 946), embodiments may require only four messages to setup (i.e., establish) a NAN datapath. Similar to the embodiments described above in reference to FIG. 7A, A publishing NAN device, or publisher, (e.g., NAN device 902)) may keep a TCP/UDP port open and/or available during a discovery window (DW) via a message 908 received at an application service platform layer (ASP 2.0) 904 and conveyed to NAN layer 906 via message 918. However, in contrast to the unsolicited case illustrated in FIG. 7A, the publishing NAN device may deliver service information and service port information only upon receiving an active subscription request.

An application on a subscribing NAN device, or subscriber, (e.g., NAN device 946) may seek a service and notify ASP 2.0 948 via message 962 and ASP 2.0 948 may notify NAN layer 950 via message 952. As shown, the subscriber (e.g., NAN device 946) may broadcast a first SDF (e.g., message 938) to indicate that the subscriber requests a service. The first SDF may include one or more attributes indicating the subscriber's request. The attributes may include SD[FSI], FA, preferredFA, and capabilities attributes, among other attributes. The SD[FSI] (service descriptor with fast session indication parameter) attributes may include a fast session indicator parameter indicating whether the subscriber supports and/or desires fast session setup.

In response, in a next DW, the publishing NAN device, or publisher, (e.g., NAN device 902) may enable the fast session setup in a second SDF (e.g., message 940) sent to the subscriber. Thus, the second SDF may include one or more attributes to setup the session, including attributes indicating the publishing NAN device's further availability (FA) and preferred further availability for potential data paths. The attributes may include SD[FSE], FA, NW_Req, preferredFA, and capabilities, among other attributes.

The subscriber may receive the second SDF and update its further availability and respond to the second SDF in a subsequent negotiation window (NW) in a third SDF (e.g., message 942) sent to the publishing NAN device. In some embodiments, NAN layer 950 may send session information (e.g., via message 982) to ASP 2.0 948 which may pass the session information (e.g., via message 964) to an application and/or service. The application and/or service may respond to ASP 2.0 via message 966. ASP 2.0 948 may pass the response to NAN layer 950 via message 956. Note that the subscriber may update (derive) its current FA based on the publishing NAN device's current FA, the publishing NAN device's preferred FA, and the subscriber's preferred FA. The third SDF may include one or more attributes indicating the subscriber's current and preferred FA. Thus, the third SDF may include SD[FSR] and FA attributes.

In response to the third SDF, the publishing NAN device may update session information such as current FA based on the subscriber's current FA, the subscriber's preferred FA, and the publishing NAN device's preferred FA via communications between NAN layer 906 and ASP 2.0 904 via messages 920, 922, and 924. The updated session information may be included in a fourth SDF (e.g., message 944) sent to the publishing NAN device. The fourth SDF may include one or more attributes indicating the publishing NAN device's current FA and confirming the session (datapath) setup. Thus, the fourth SDF may include SD[FSC] attributes. NAN layer 950 may pass information received in message 944 to ASP 2.0 948 via message 958.

As with the unsolicited publish scheme, once the session is setup, the NAN layer may pass control of the session (datapath) to an upper layer (e.g., the application layer) to complete the TCP/IP level datapath setup. Additionally, the NAN layer may rely on the upper layer to conduct TCP/IP based further service discovery as shown. Note that once the upper layer closes a session, it may inform the NAN layer to release the resource assigned to the NAN datapath and update the device's (either publishing NAN device's or subscriber's) current FA.

NAN Fast Datapath Setup—Pre-Session Further Service Discovery

Figure 8A:
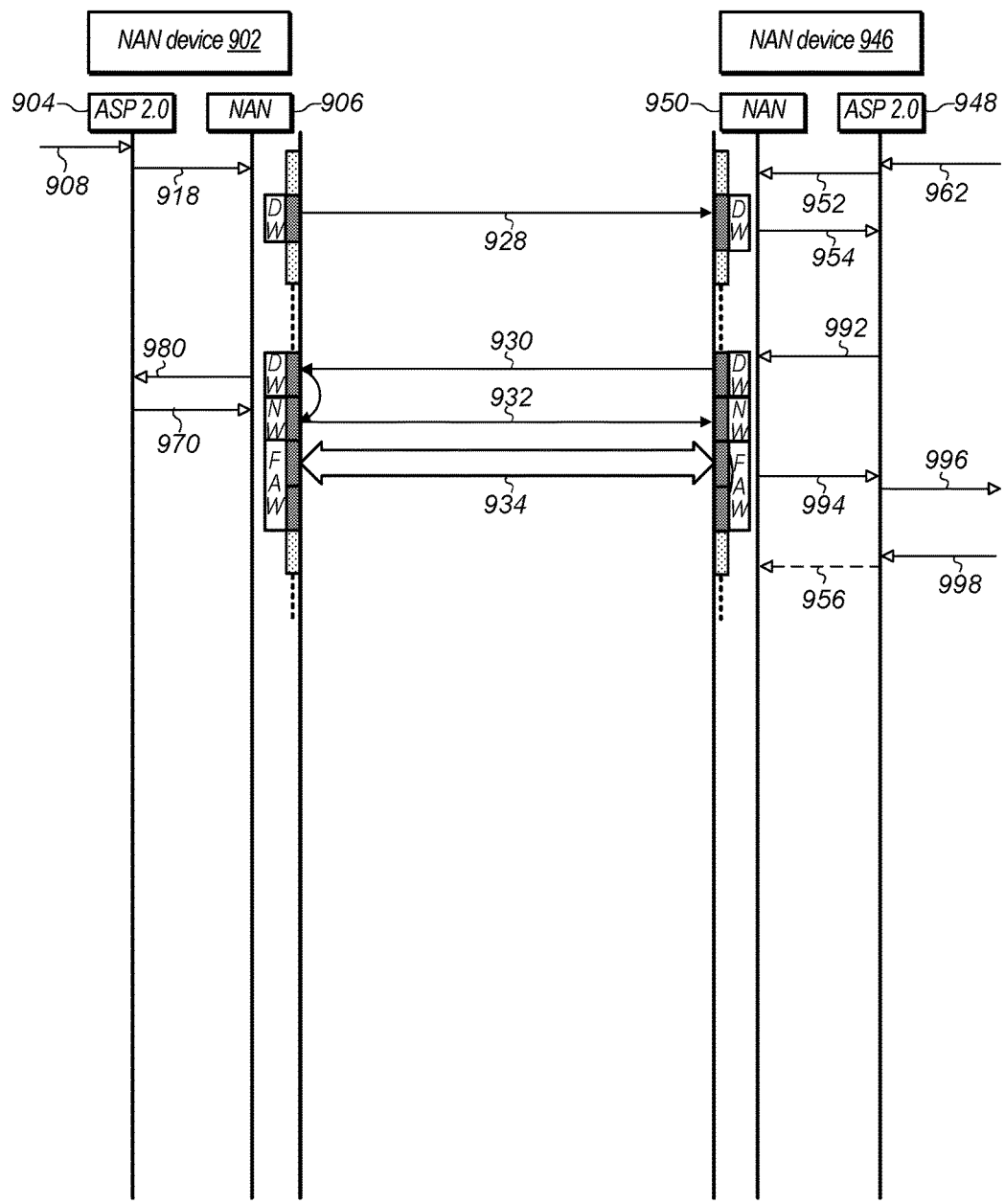
FIGS. 8A-8D illustrate signaling for an unsecured fast datapath setup with pre-session further service discovery, according to embodiments.
Figure 8B:
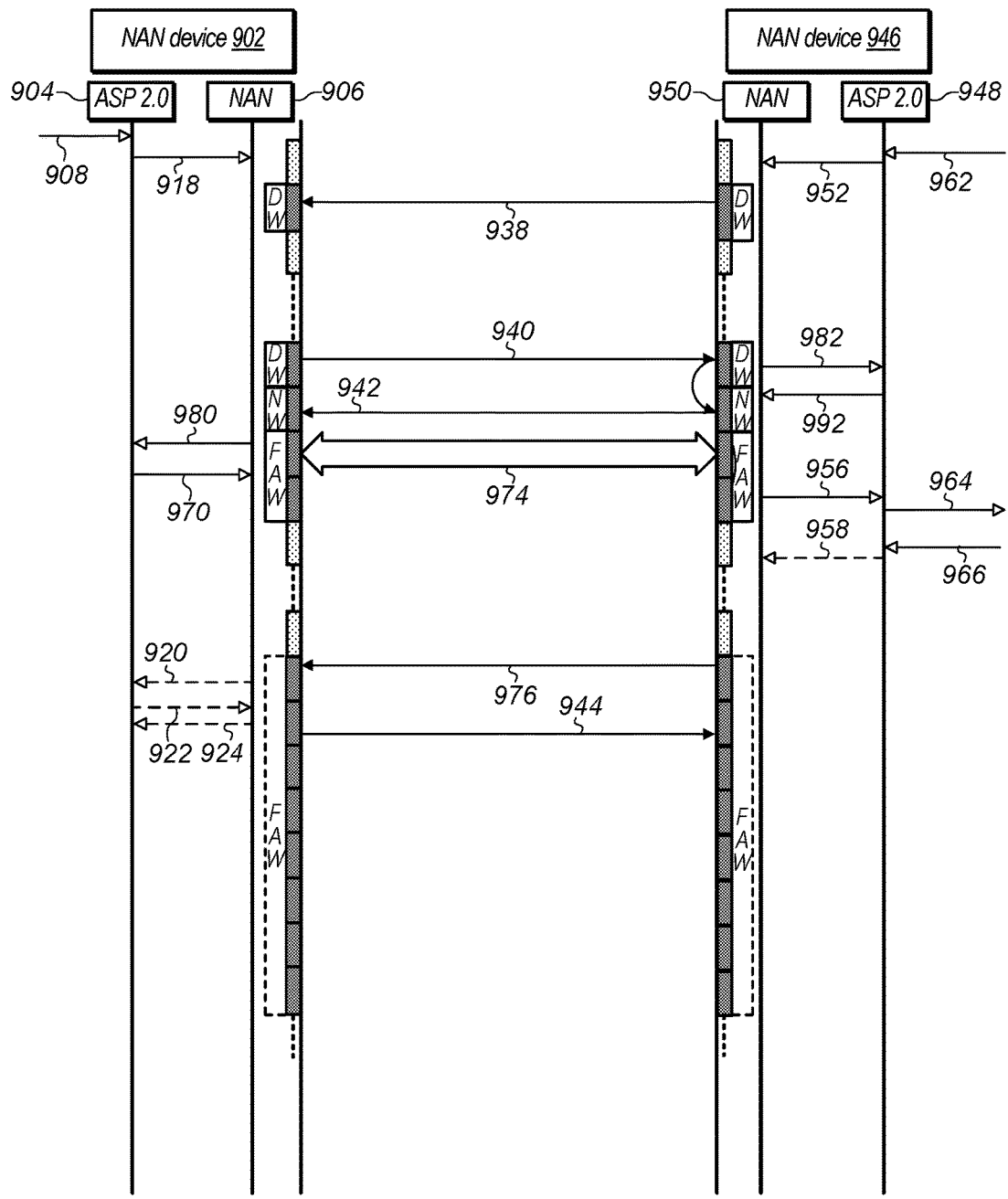
Figure 8C:
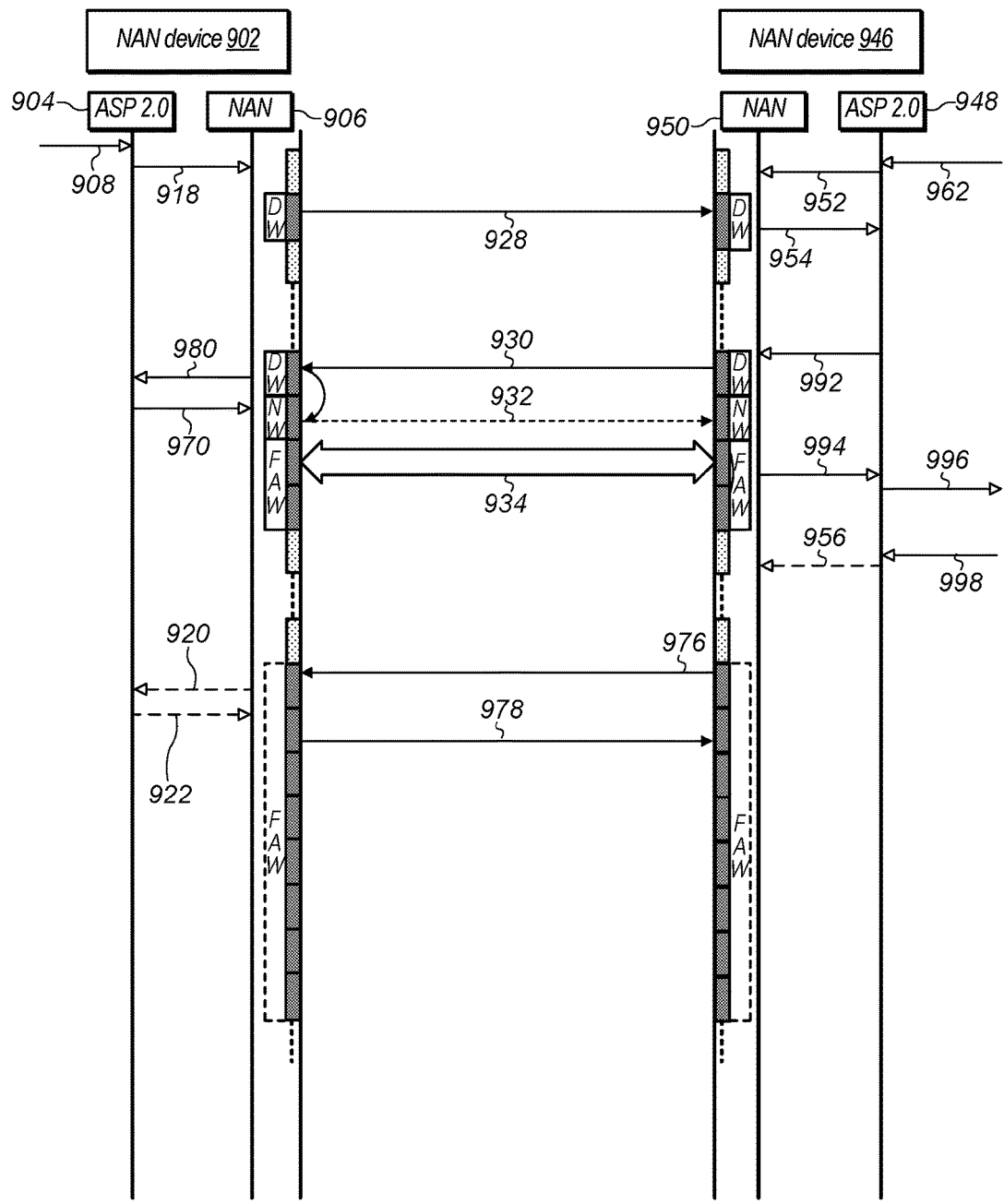
Figure 8D:
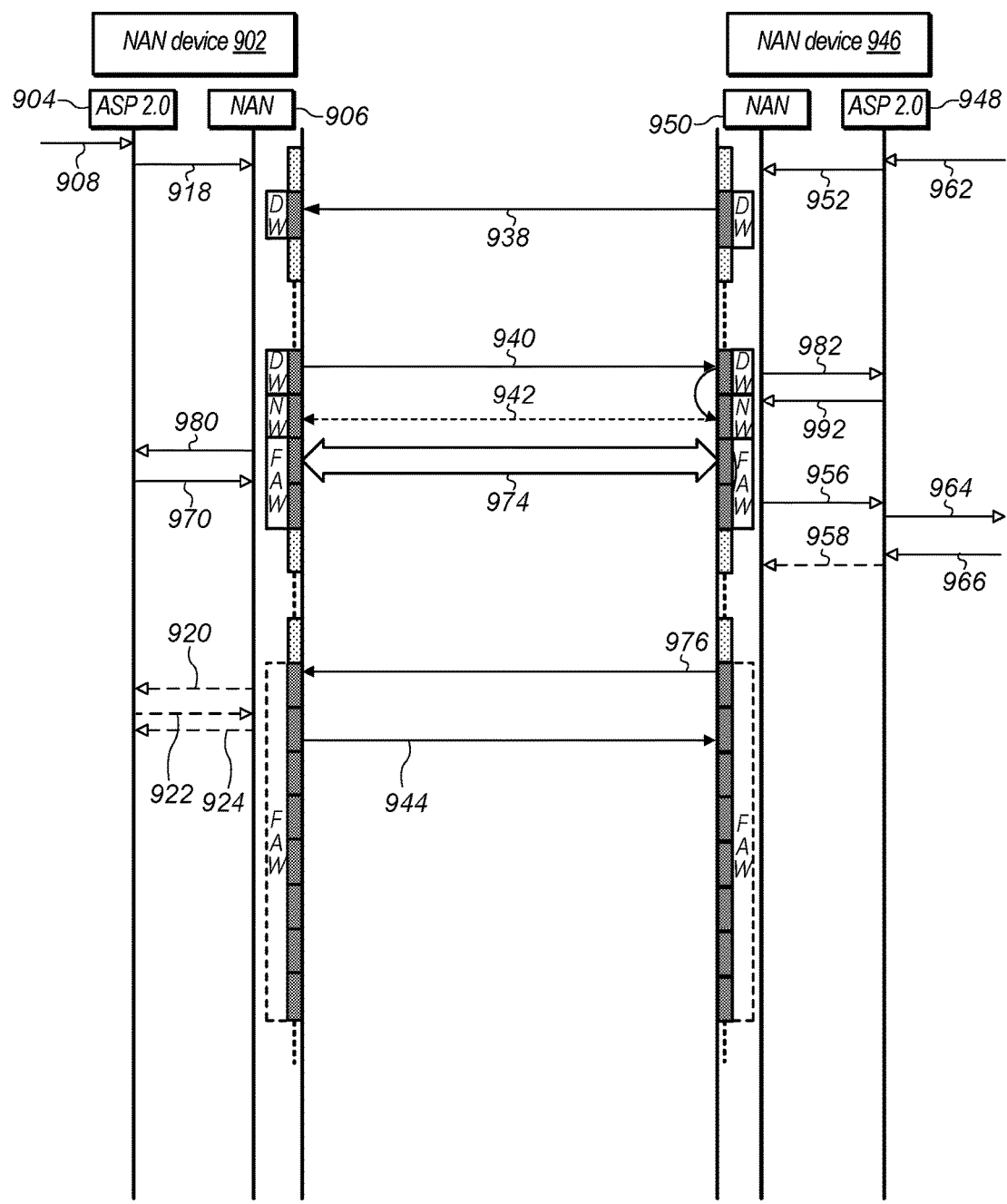

FIGS. 8A-8D illustrate signaling for an unsecured fast datapath setup with pre-session further service discovery, according to embodiments. FIGS. 8A and 8C illustrate signaling for an unsolicited publish and FIGS. 8B and 8D illustrate signaling schemes for a solicited publish. The signaling shown in FIGS. 8A-8D may be used in conjunction with any of the systems or devices shown in the above Figures, among other devices. Thus, each NAN client station (or NAN device) may include circuitry and components similar to client station 106 as described above in reference to FIG. 3. In various embodiments, some of the signals shown may be performed concurrently, in a different order than shown, or may be omitted. Additional signaling may also be performed as desired.

Turning to FIG. 8A, embodiments for an unsecured fast datapath setup when a service is published without being solicited may include a pre-session further service discovery message exchange prior to starting a new session. Thus, as described above in reference to FIG. 7A, a publishing NAN device, or publisher, (e.g., NAN device 902)) may keep a TCP/UDP port open and/or available during a discovery window (DW) via a message 908 received at an application service platform layer (ASP 2.0) 904 and conveyed to NAN layer 906 via message 918. NAN device 902 may publish a service in a first SDF via message 928. In addition, NAN device 946 may be seeking to subscribe to the service and may respond to the first SDF with a second SDF via message 930. Thus, an application on NAN device 946 may seek the service and notify ASP 2.0 948 via message 962 and ASP 2.0 948 may notify NAN layer 950 via message 952. In addition, when NAN device 946 receives the first SDF (e.g. message 928) during (or in) the DW, NAN layer 950 may report the results (e.g., DiscResult_2.0) via message 954 to ASP 2.0 948 (e.g., a higher protocol layer) of NAN device 946. Note that ASP 2.0 948 of NAN device 946 may indicate further service discovery to NAN layer 950 via message 992. In addition, NAN layer 906, after receipt of the second SDF (e.g., message 930), may indicate to ASP 2.0 904 NAN device 946's further service discovery request via message 980. ASP 2.0 904 may send further discovery information to NAN layer 906 via message 970. NAN device 902 may then send a third SDF via message 932 and, after the exchange of the third SDF, the NAN devices may exchange messages (e.g., message exchange 934) to accomplish further discovery. Further details regarding message exchange 934 are provided below in reference to FIGS. 9A and 9C. Note that after the subscriber receives sufficient service information, NAN layer 950 may notify ASP 2.0 948 of the further service information (e.g., send further service information) via message 994. ASP 2.0 may pass the further service information to the application or service on NAN device 946 via message 996 and receive instructions to start a new session via message 998. ASP 2.0 946 may create a new session and deliver the session ID and its MAC interface address (which can be used to derive its iPV6 address) and pass the new session information to NAN layer 950 via message 956.

In some embodiments, as illustrated in FIG. 8C, the publishing NAN device (e.g., NAN device 902) may not allocate a TCP/UPD port until receiving a session request. In other words, the publishing NAN device may not provide a TCP/UDP port to the subscriber (e.g., NAN device 946) until the subscriber sends a session request (e.g., message 976). Thus, message 908 may not specify an opening of a TCP/UDP port. In such embodiments, when the publishing NAN device receives such a session request from the subscriber, the publishing NAN device may send a connect session request (e.g., a connectsessions request) in message 920 to ASP 2.0 904. In response, ASP 2.0 904 may create a new session, and send a NAN session connect request (e.g., a NANSession connect request) to NAN layer 906 via message 922. In addition, the publishing NAN device may provide the MAC interface address (also the IPv6 address) and TCP/UDP port number to the subscriber in a session confirm message 978. Thus, in such embodiments, the FSC attribute may include fields such as session_id, subscriber_mac, service_mac, service_port, and service_proto.

Turning to FIG. 8B, embodiments for an unsecured fast datapath setup when the service is solicited may include a pre-session further service discovery message exchange prior to starting a new session. Thus, as described above in reference to FIG. 7B, the subscriber (e.g., NAN device 946) may broadcast a first SDF (e.g., message 938) to indicate that the subscriber requests a service. The first SDF may include one or more attributes indicating the subscriber's request. In response, in a next DW, the publishing NAN device, or publisher, (e.g., NAN device 902) may enable the fast session setup in a second SDF (e.g., message 940) sent to the subscriber. Thus, the second SDF may include one or more attributes to setup the session. The subscriber may receive the second SDF and update its further availability and respond to the second SDF in a subsequent negotiation window (NW) in a third SDF (e.g., message 942) sent to the publishing NAN device. In some embodiments, NAN layer 950 may send session information (e.g., via message 982) to ASP 2.0 948 which may respond with further service discovery request via message 992. NAN device 946 may then send a third SDF via message 942 and, after the exchange of the third SDF, the NAN devices may exchange messages (e.g., message exchange 974) to accomplish further service discovery. Further details regarding message exchange 974 are provided below in reference to FIGS. 9B and 9D. Note that after the subscriber receives sufficient service information, it may determine to start a new session and send another SDF frame via message 976. Once NAN device 902 receives the SDF via message 976, a new session may be established as described above in reference to FIG. 7B.

In some embodiments, as illustrated in FIG. 8D, the publishing NAN device (e.g., NAN device 902) may not provide (or allocate) a TCP/UDP port until receiving a session request. In other words, the publishing NAN device may not provide a TCP/UDP port to the subscriber (e.g., NAN device 946) until the subscriber sends a session request (e.g., message 976). Thus, message 908 may not specify an opening of a TCP/UDP port. In such embodiments, when the publishing NAN device receives such a session request from the subscriber, the publishing NAN device may send a connect session request (e.g., a connect-sessions request) in message 920 to ASP 2.0 904. In response, ASP 2.0 904 may create a new session, and send a NAN session connect request (e.g., a NANSession connect request) to NAN layer 906 via message 922. In addition, the publishing NAN device may provide the MAC interface address (also the IPv6 address) and TCP/UDP port number to the subscriber in a session confirm message 978. Thus, in such embodiments, the FSC attribute may include fields such as session_id, subscriber_mac, service_mac, service_port, and service_proto.

Figure 9A:
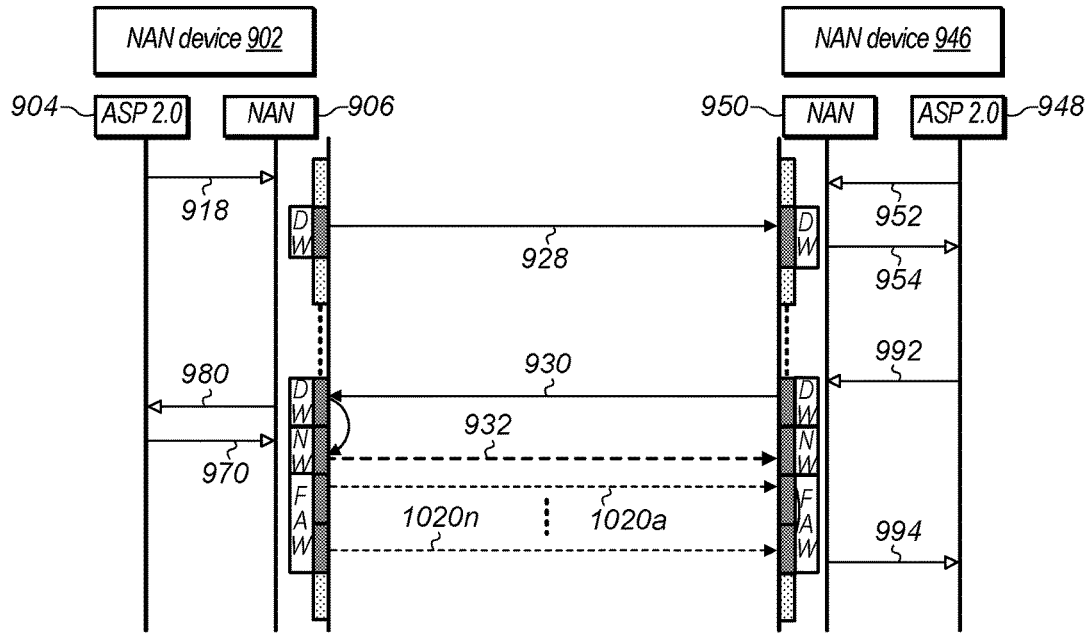
FIGS. 9A-9D illustrate pre-session further service discovery, according to embodiments.
Figure 9B:
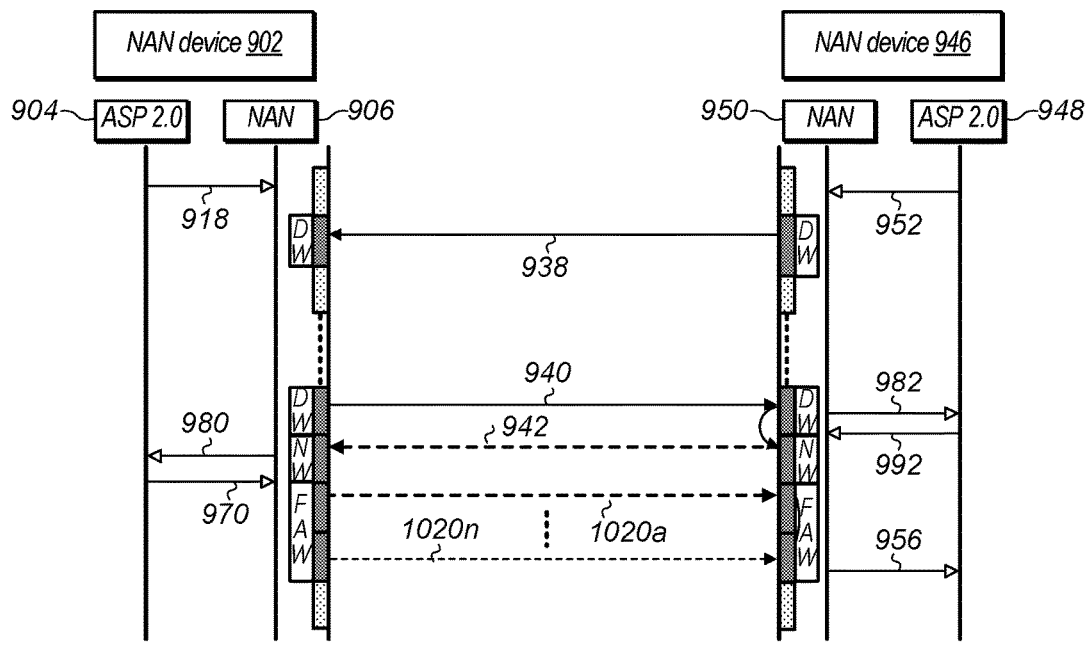
Figure 9C:
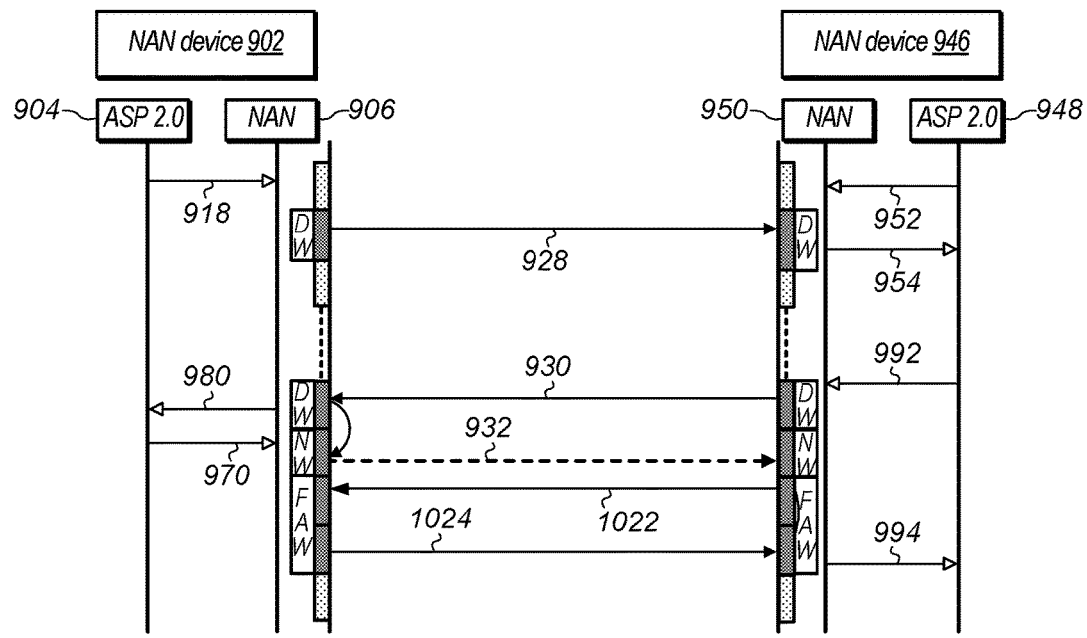
Figure 9D:
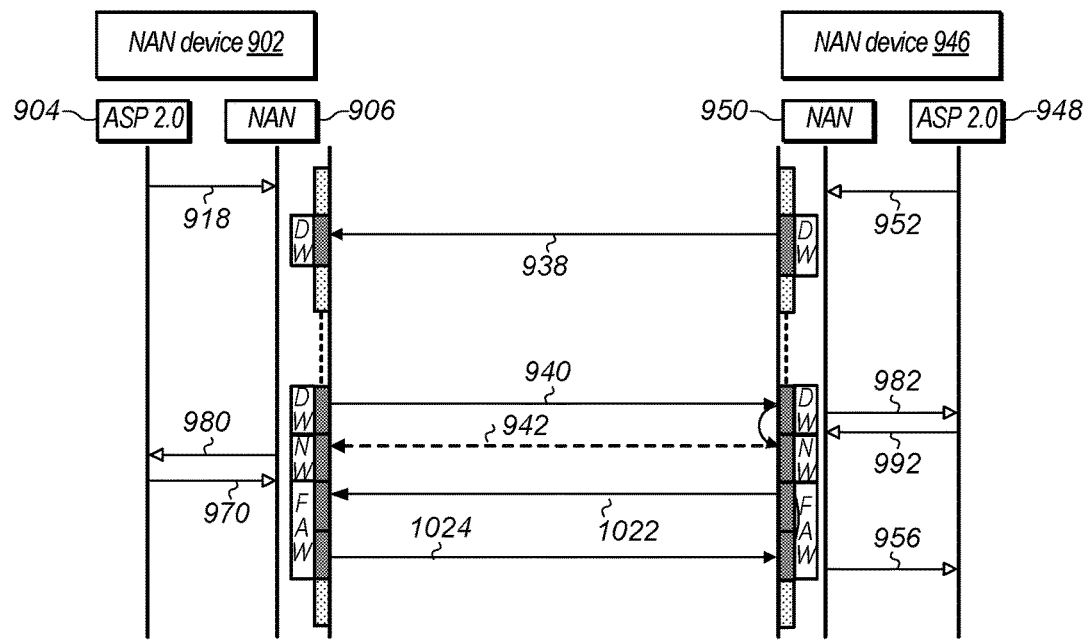

FIGS. 9A-9D illustrate pre-session further service discovery, according to embodiments. FIG. 9A illustrates further service discovery via NAN SDF for an unsolicited publish and the FIG. 9B illustrates further service discovery via NAN SDF for a solicited publish. FIG. 9C illustrates further service discovery via GAS (generic advertisement service) protocol (802.11u) for an unsolicited publish and FIG. 9D illustrates further service discovery via GAS protocol (802.11u) for a solicited publish. Thus, FIGS. 9A and 9C illustrate signaling that may be associated with message exchange 934 of FIGS. 8A and 8C and FIGS. 9B and 9D illustrate signaling that may be associated with message exchange 974 of FIGS. 8B and 8D.

Note that the signaling shown in FIGS. 9A-9D may be used in conjunction with any of the systems or devices shown in the above Figures, among other devices. Thus, each NAN client station (or NAN device) may include circuitry and components similar to client station 106 as described above in reference to FIG. 3. In various embodiments, some of the signals shown may be performed concurrently, in a different order than shown, or may be omitted. Additional signaling may also be performed as desired.

FIG. 9A illustrates further service discovery via a NAN SDF exchange for an unsolicited publish (e.g., as described above in reference to FIGS. 8A and 8C), according to embodiments. Thus, as shown, after NAN device 902 sends message 932, NAN device 902 may send one or more additional messages 1022a-1022n (e.g., message exchange 934 as illustrated in FIGS. 8A and 8C). Note that in some embodiments, message 932 may include an SDF that includes further availability information and a first segment of further discovery information. In addition, messages 1022a-1022n may each include an SDF that includes an additional segment of further discovery information. In other words, NAN device 902 may send one or more SDFs, each SDF including a segment of available services.

Similarly, FIG. 9B illustrates further service discovery via NAN SDF for a solicited publish (e.g., as described above in reference to FIGS. 8B and 8D). Thus, as shown, after NAN device 902 receives message 942, NAN device 902 may send one or more additional messages 1022a-1022n (e.g., message exchange 974 as illustrated in FIGS. 8B and 8D). Note that in some embodiments, message 942 may include an SDF that includes further availability information and messages 1022a-1022n may each include an SDF that includes a segment of further discovery information. In other words, NAN device 902 may send one or more SDFs, each SDF including a segment of available services.

FIG. 9C illustrates further service discovery via GAS (generic advertisement service) protocol (802.11u) for unsolicited publish (e.g., as described above in reference to FIGS. 8A and 8C), according to embodiments. Thus, as shown, after NAN device 902 sends message 932, NAN device 946 may send a service discovery request message 1022. In response, NAN device 902 may send a service discovery response message 0124. Thus, if the subscriber determines that the available services are desired, the subscriber may initiate the new session as described above in reference to FIGS. 8A and 8C.

FIG. 9D illustrates further service discovery via GAS protocol (802.11u) for solicited publish (e.g., as described above in reference to FIGS. 8B and 8D). Thus, as shown, after NAN device 902 receives message 942, NAN device 946 may send a service discovery request message 1022. In response, NAN device 902 may send a service discovery response message 1024. Thus, if the subscriber determines that the available services are desired, the subscriber may initiate the new session as described above in reference to FIGS. 8B and 8D.

Figure 10A:
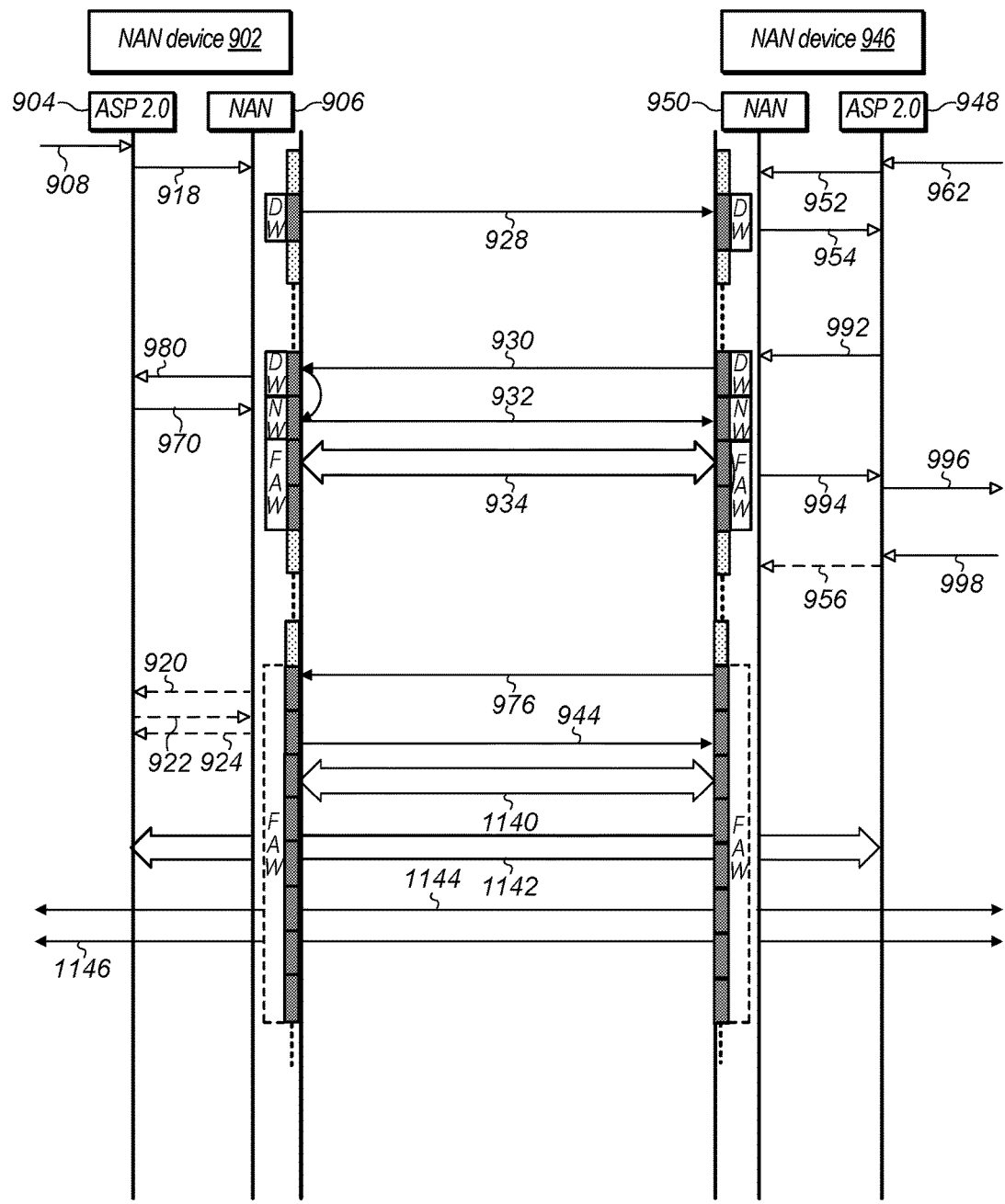
FIGS. 10A and 10B signaling for secured NAN datapath setup, according to embodiments.
Figure 10B:
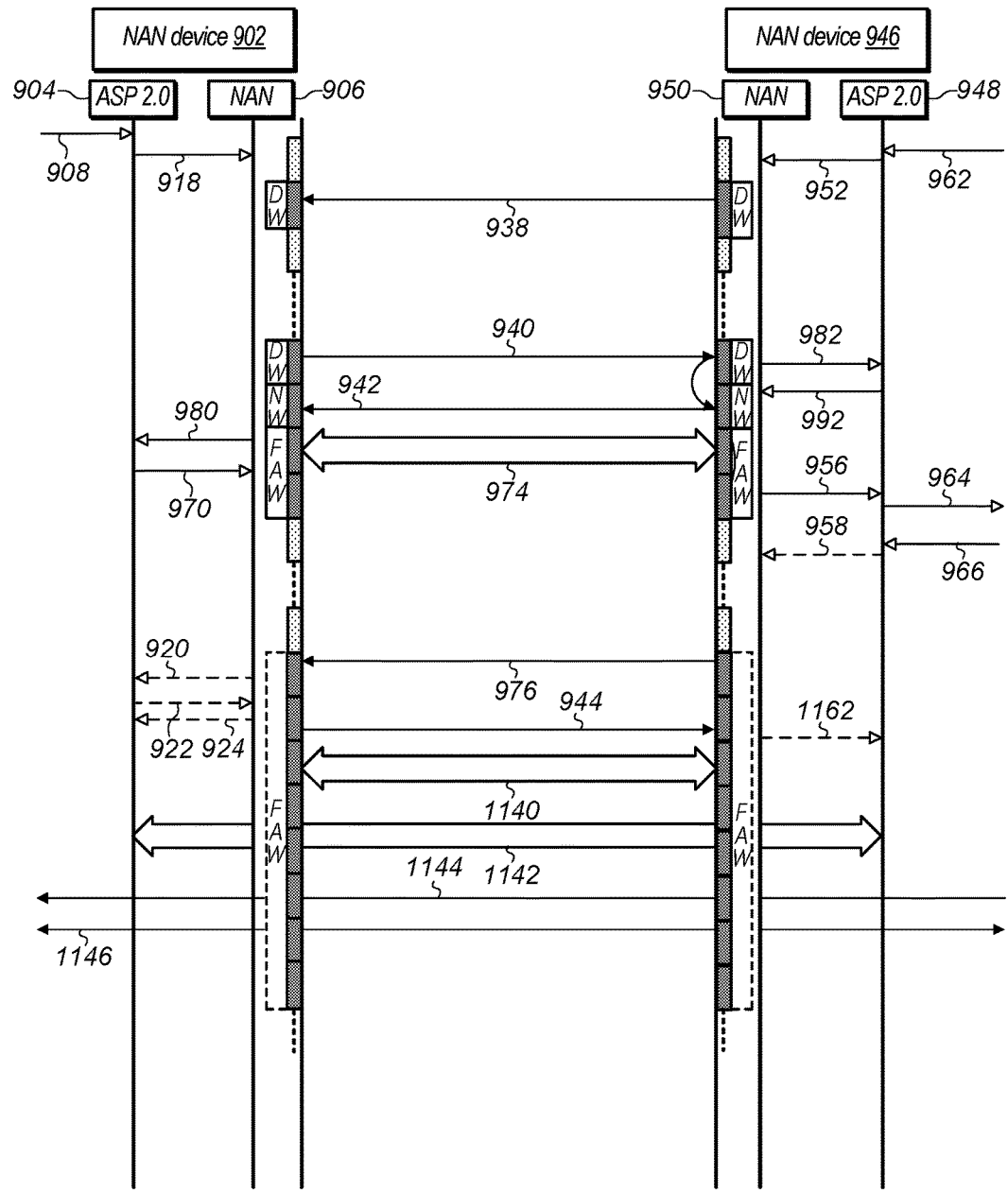

Secured NAN Datapath Setup (FIGS. 10A-10B)

FIGS. 10A and 10B signaling for secured NAN datapath setup, according to embodiments. FIG. 10A illustrates signaling for an unsolicited publish and FIG. 10B illustrates signaling for a solicited publish. The signaling shown in FIGS. 10A-10B may be used in conjunction with any of the systems or devices shown in the above Figures, among other devices. Thus, each NAN client station (or NAN device) may include circuitry and components similar to client station 106 as described above in reference to FIG. 3. In various embodiments, some of the signals shown may be performed concurrently, in a different order than shown, or may be omitted. Additional signaling may also be performed as desired.

In contrast to embodiments described above in reference to FIGS. 8A-8D and 9A-9D, as FIG. 10A illustrates, embodiments implementing a secured NAN datapath, publishing NAN device 902 may not provide TCP/UDP protocol and port information to subscribing NAN device 946 until a secured MAC communication channel can be established such that the protocol and port information may be encrypted by a MAC level security key. Thus, after an SDF confirming the NAN session or datapath (e.g., message 944), the devices may establish MAC layer security association via message exchange 1140 and then may use ASP coordination protocol 1142 as defined in ASP to establish TCP/IP level data path. At 1144 an application socket may be connected and service specific application data may be exchanged at 1146.

Turing to FIG. 10B, embodiments implementing a secured NAN datapath for a solicited service may be similar to embodiments described in reference to FIG. 10A. Note that for solicited services, publishing NAN device 902 may deliver the service upon receiving an active subscription request (e.g., message 938). Thus, after an SDF confirming the NAN session or datapath (e.g., message 944), the devices may establish MAC layer security association via message exchange 1140 and then may use ASP coordination protocol 1142 as defined in ASP to establish TCP/IP level data path. At 1144 an application socket may be connected and service specific application data may be exchanged at 1146.

Figure 12:
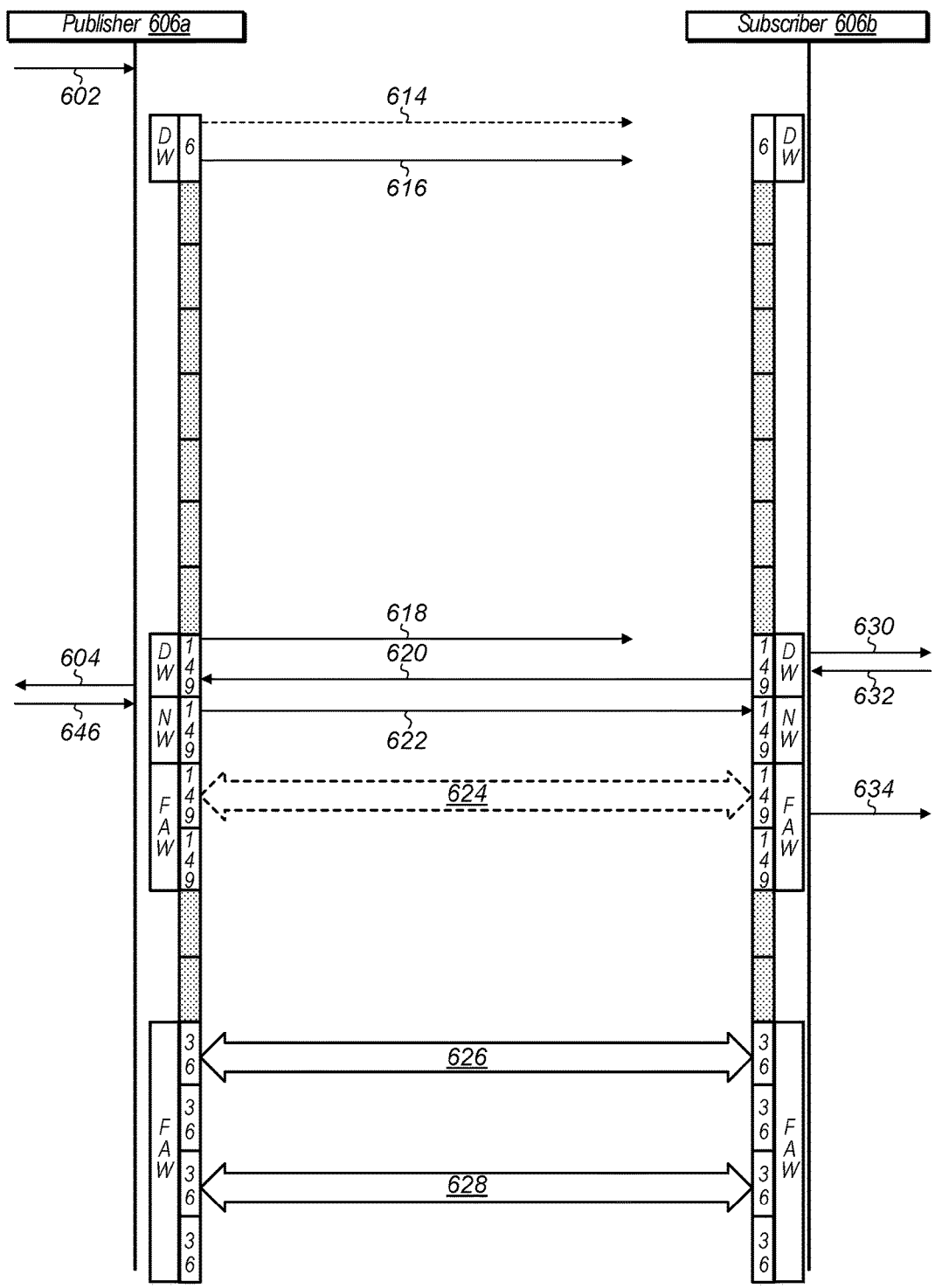
FIG. 12 illustrates signaling for scheduling a further availability window, according to embodiments.

Wi-Fi NAN Datapath Negotiation Window (FIG. 12)

Figure 11:
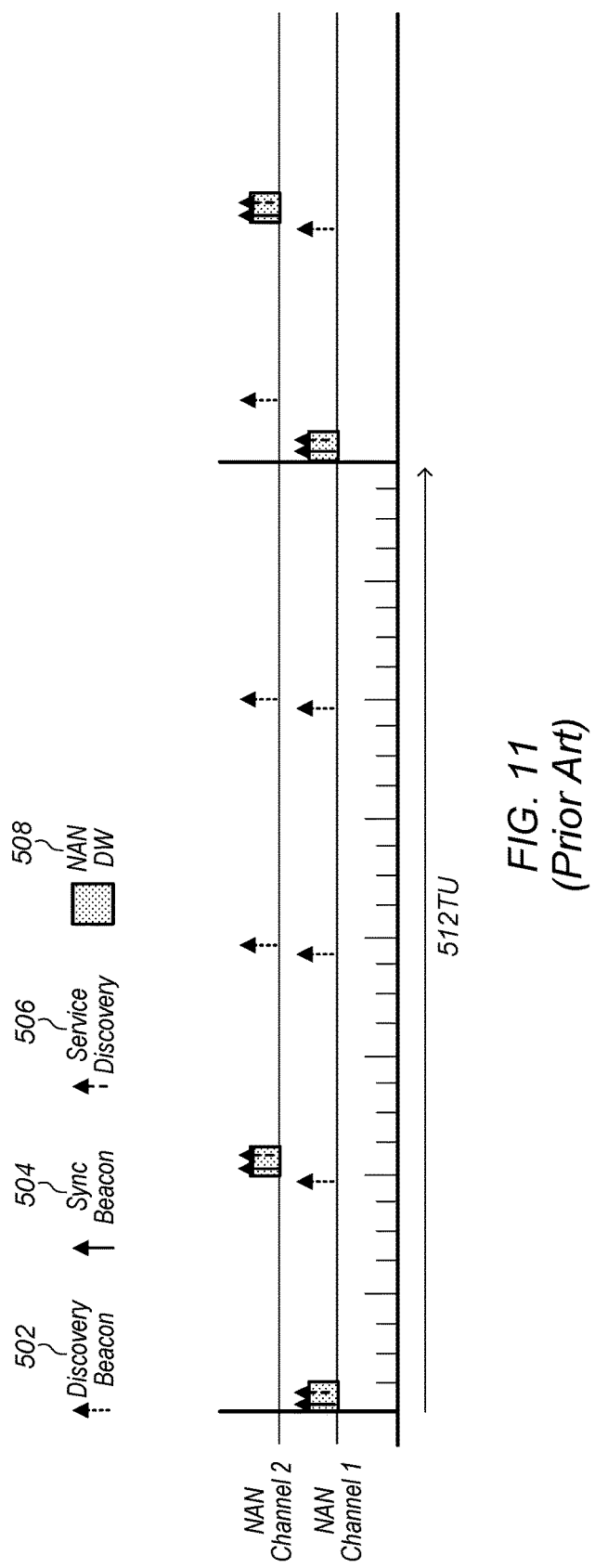
FIG. 11 illustrates various beacons and timing, according to prior art (e.g., as defined by NAN 1.0).

As noted above, NAN 1.0 defines periodic discovery windows (DWs) for NAN devices to meet, synchronize to the same clock source, and discover each other's services. FIG. 11 illustrates various beacons and timing, according to prior art (e.g., as defined by NAN 1.0). As shown, NAN channels, such as NAN channels 1 and 2 may carry discovery beacons 502, synchronization beacons 504, and service discovery beacons 506. The beacons may occur both within and outside of NAN discover windows (DWs) 508. Note that outside of the DWs, NAN devices may go to sleep (e.g., not transmit and/or receive) or perform other activities. Since a DW may be very short (e.g., 16TUs), the DW may therefore be filled, or nearly filled, with synchronization and service discovery frames (SDFs) of various NAN devices. Thus, if a NAN device wants to establish a NAN datapath with a peer device, it may need to request the peer device to be awake beyond DWs to provide additional time to exchange datapath negotiation messages. According to embodiments described herein, a NAN device and a peer NAN device may agree on a common negotiation window (NW) beyond the DWs, to initiate the negotiation and may negotiate a further availability window (FAW) for more message exchanges.

In some embodiments, NWs may have other uses, as well. For example, NAN devices (e.g., such as client station 106) that are involved in active NAN datapaths may be required to present in every NW, so as to provide all of the involved NAN devices with relevant information. Such information may include, for example, NAN datapath updates, such as capabilities, resource allocation, synchronizations, etc., of the NAN datapath, and group related communications, such as group management, data multicast, etc., among other information.

In some embodiments, a NW may immediately follow a DW on a same NAN channel, or may occur at some specified later time. In some embodiments, a NW may have the same duration as the DW (e.g., 16TUs) or a differing duration.

In some embodiments, some 802.11 devices may be capable of performing NAN communications utilizing only the 2.4 GHz band. If either the NAN device or the peer device is limited to the 2.4 GHz band, then the NW would utilize the 2.4 GHz NAN channel; i.e., the NAN device and the peer device would communicate within the 2.4 GHz NAN channel during the NW. Other 802.11 devices may be capable of performing NAN communications at utilizing both the 2.4 GHz and the 5 GHz bands. If both the NAN device and the peer device are capable of using both bands, then the devices may be configured according to various options. For example, the devices may be configured to utilize only a single specified NAN channel for the NW. Alternatively, the devices may be configured to utilize both the 2.4 GHZ and the 5 GHz NAN channels for the NWs. As yet another example, the device may be configured such that use of a first NAN channel (e.g., the 5 GHz NAN channel) is the mandatory channel for NWs, but use of a second NAN channel (e.g., the 2.4 GHz channel) is the optional channel for NWs.

In some embodiments, when a NAN device receives an unsolicited publish frame (or active subscribe), and would like to subscribe to the service (or publish the service), it can respond with a service discovery frame (SDF) as described above, which may include one or more of: a negotiation window request (NW_Req); a further availability attribute that indicates further availability (FA) slots/windows (possibly including NW) of the NAN device; and potential further available channel and/or time for subsequent communications. Both devices may be configured to remain awake during a defined number N of subsequent NWs following the SDF.

The peer device that receives the NW_Req may be awake during the subsequent NW, and may respond by transmitting a SDF (e.g., during DW or NW), which may include one or more of: a further availability attribute that indicates its further availability slots/windows (possibly including NW) of the peer device; and potential further available channel/time for subsequent communications.

The device pair can then determine at least one additional further availability window (FAW) based on each other's existing and potential further availabilities.

FIG. 12 illustrates signaling for scheduling a further availability window, according to embodiments. The signaling shown in FIG. 12 may be used in conjunction with any of the systems or devices shown in the above Figures, among other devices. Thus, each NAN client station (or NAN device) may include circuitry and components similar to client station 106 as described above in reference to FIG. 3. In various embodiments, some of the signals shown may be performed concurrently, in a different order than shown, or may be omitted. Additional signaling may also be performed as desired.

As illustrated, a publisher, such as publisher 606a may send, during a first DW, a beacon 614 and an SDF 616. In some embodiments beacon 614 may be a synchronization beacon. Beacon 614 and SDF 616 may be received by subscriber 606b as described above (e.g., in reference to FIG. 6 as well as FIGS. 7A-7B, 8A-8D, and 10A-10B). Then, during a second DW, publisher 606a may send SDF 618 (i.e., a second SDF), which may also be received by subscriber 606b. In addition, during the second DW, subscriber 606b may respond by transmitting SDF 620 to publisher 606a. Note that in response to receive SDF 618, subscriber 606b may transmit discovery results to higher layers of subscriber 606b via message 630 and may receive an instruction to subscribe to published service 602 via message 632. Additionally, SDF 620 may include (or comprise) an NW_Req and a FA of subscriber 606b. The DW may be followed by a NW, during which both devices remain awake. During the NW, publisher 606a may send SDF 622 which may include (or comprise) a FA of publisher 606a. Note that after receiving SDF 620, publisher 606a may send message 604 to higher layers of publisher 606a indicating receipt of a subscribe request and may receive an instruction to transmit SDF 622.

In some embodiments, once both devices are aware of the FA of subscriber 606b and the FA of publisher 606a, they may determine a FAW, during which the devices carry out further communications. For example, a first FAW may immediately following the NW, during which further service discovery message exchange 624 (which may be similar to message exchange 934 or message exchange 974, described above) may be performed. In addition, subsequent FAWs may be scheduled to perform message exchange 626 associated with datapath setup and message exchange 628 to communicate data.

Wi-Fi NAN Datapath Synchronization

As described above reference to FIG. 4, in Wi-Fi Direct (WFD), a P2P group may be created for two or more devices to exchange data with each other. One peer device may serve as the group owner (GO) to coordinate the timing of the group, and also provide communications between other peer devices. In some systems, multipoint to multipoint (MP2MP) communications in a WFD P2P group may rely heavily on the GO, which may be inefficient and also suffer from single point of failure.

NAN 1.0 defines a distributed and collaborative way for peer devices in a same neighborhood to: 1) rendezvous at same discovery windows (DWs); 2) synchronize their clocks; and 3) discover each other's services. NAN 2.0 may further define protocols that enable unicast and multicast data transmissions among NAN devices. When multiple NAN devices in a same neighborhood establish datapaths to provide and consume one or more services, it may be desirable to group them together and coordinate their operations in order to facilitate power efficient and low-latency MP2MP communications. According to embodiments described here, a NAN data synchronization group (NDSG), or NAN cluster, may provide synchronization at both group level and cluster level (e.g., to support concurrent service discovery and data communications) and robustness to avoid single point of failure.

Figure 13:
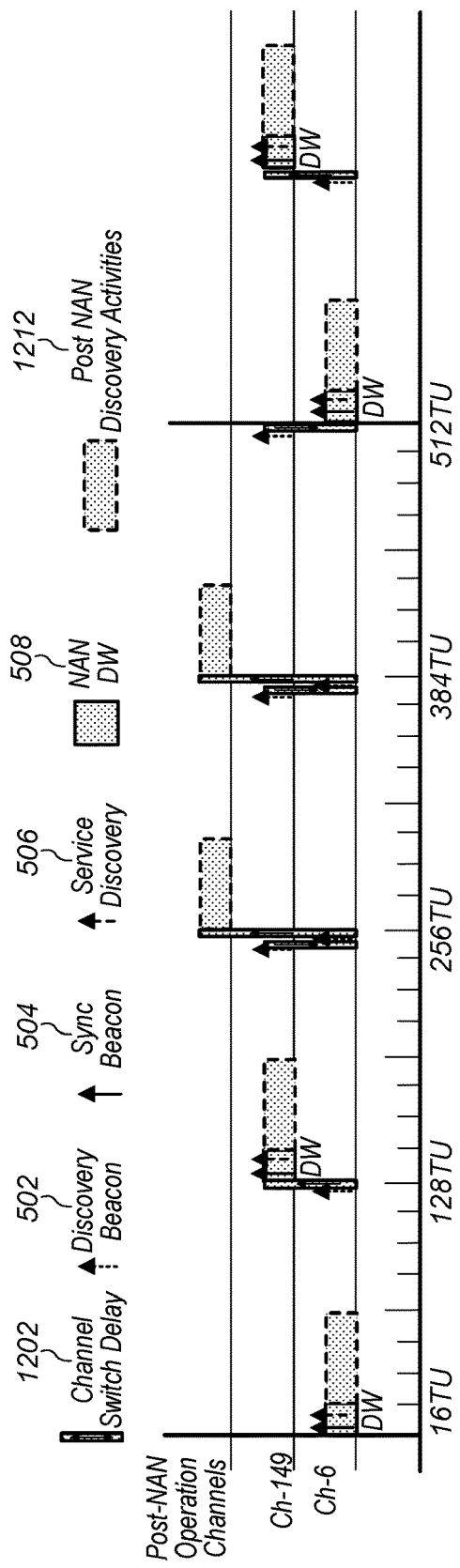
FIG. 13 illustrates a timing diagram for communications among nodes in a NDSG, according to embodiments.

FIG. 13 illustrates a timing diagram for communications among nodes in a NDSG, according to embodiments. As shown, NAN channels, such as NAN channel 6, channel 149, and post-NAN operation channels, may carry discovery beacons 502, synchronization beacons 504, and service discovery beacons 506. The beacons may occur both within and outside of NAN discover windows (DWs) 508. Note that outside of the DWs, NAN devices may go to sleep (e.g., not transmit and/or receive) or perform other activities, such as post NAN discovery activities 1212. In addition, note that there may be a delay, such as channel switch delay 1202, associated with a NAN device moving (or tuning) from one channel to another channel.

FIGS. 14A-14D illustrate various embodiments of NAN data synchronization groups. Note that the NAN devices may some or all features of client station 106 as described above in reference to FIG. 3.

Figure 14A:
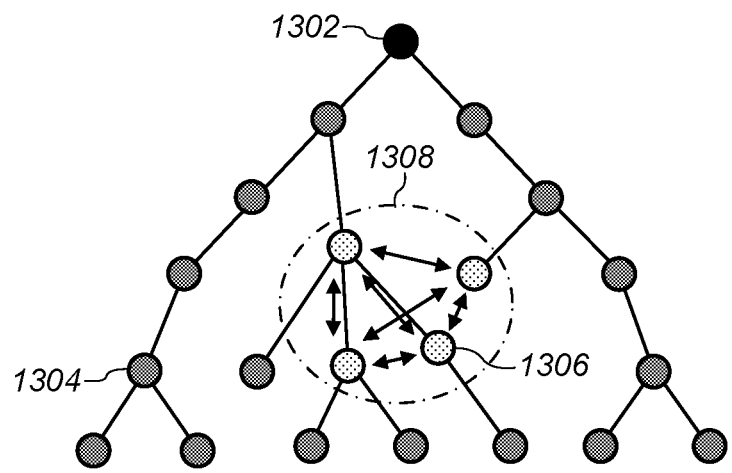
FIGS. 14A-14D illustrate various embodiments of NAN data synchronization groups.

Turning to FIG. 14A, illustrated is a NAN cluster in which a plurality of NAN device 1304 are in communication with one another. The NAN cluster includes data synchronization group (NDSG) 1308 in which a plurality NAN devices 1306 may have established on or more datapaths between themselves. Each device in the NAN cluster may follow (e.g., maintain clock synchronization with) an anchor master node such as NAN device 1302. In some embodiments, once two or more NAN devices establish datapaths between each other, the two or more NAN devices may rely on a NDSG within the NAN cluster to achieve initial synchronization. Additionally, it is assumed that the two or more NAN devices remain within range of their datapath peers.

In some embodiments, if all member devices in a NDSG follow a same cluster tree, which is rooted at a stable clock source (e.g., the anchor master or AM such as NAN device 1302), no additional time synchronization may be needed for the NDSG. However, there may be instances (or cases) in which devices belonging to a same NDSG may follow different clock sources and eventually their clocks may drift apart (become unsynchronized). Additionally, these issues may become worse when those devices that follow different clock sources are in non-master non-sync role and thus may not transmit beacons to warn each other.

Figure 14B:
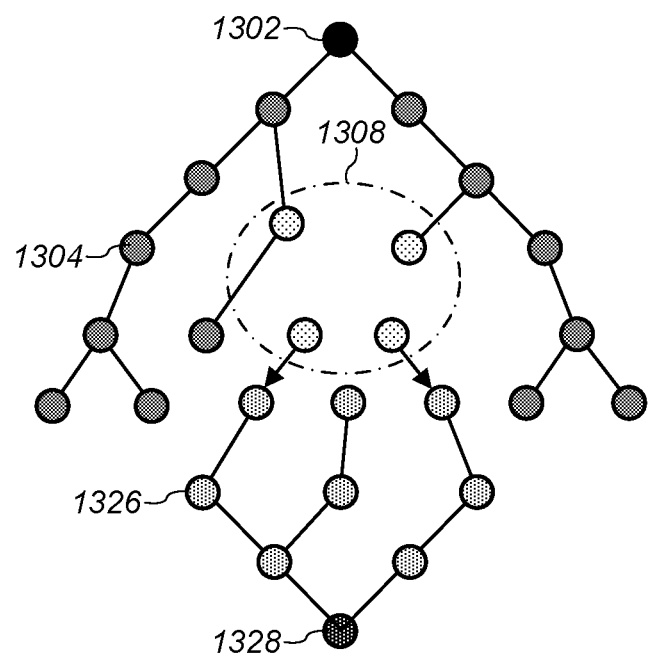

Turning to FIG. 14B, illustrated is an instance in which two different NAN clusters having two different anchor masters approach each other. As illustrated, NAN devices 1304 may synchronize to AM 1302 while NAN devices 1326 may synchronize to AM 1328. As the NAN clusters approach one another, a portion of the NAN devices of NDSG 1308 may come within close proximity of NAN devices 1326 and may begin to follow AM 1328. Thus, a portion of the NAN devices of NDSG 1308 may synchronize to AM 1328 while another portion of the NAN devices of NDSG 1308 may synchronize to AM 1302, leading to synchronization issues within NDSG 1308.

Figure 14C:
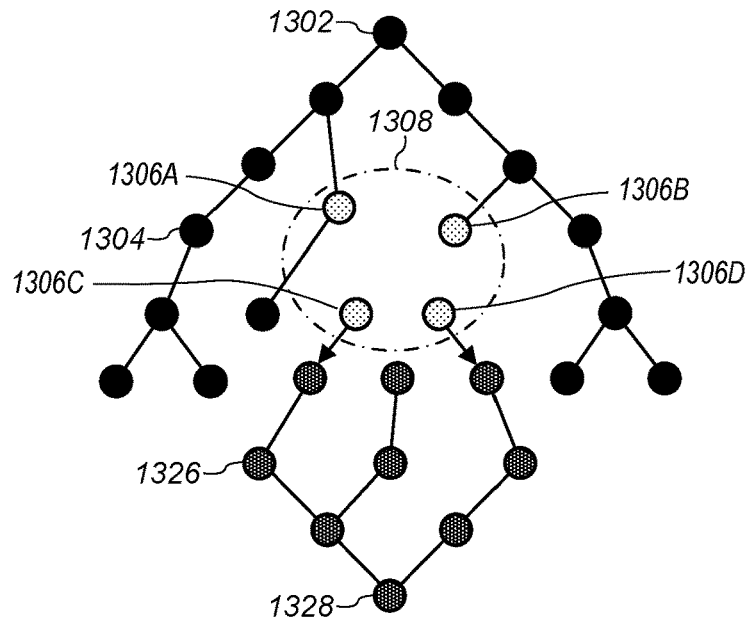

For example, turning to FIG. 14C, NAN devices 1306A-D of NDSG 1308 may initially join a NAN cluster associated with AM 1302 and including NAN devices 1304. In some embodiments, NAN devices 1306A-D may each have a hopcount threshold equal to 4. Accordingly, devices 1306A-D may initially rely on AM 1302 for clock synchronization. However, a new NAN cluster may be approaching with AM 1328 and NAN devices 1326. If AM 1328 has a higher master preference (MP) than AM 1302, NAN devices 1306C and 1306D discover the new NAN cluster and may determine to join the new NAN cluster with AM 1328, e.g., based on NAN cluster merging rules. However, NAN devices 1306A and 1306B may not be allowed to join the new NAN cluster based on hopcount threshold. Accordingly, NAN devices 1306A and 1306B may continue to synchronize with AM 1302 whereas NAN devices 1306C and 1306D may begin to synchronize with AM 1328 leading to the NAN devices within NDSG 1308 becoming unsynchronized, which may disrupt communication among NAN devices 1306A-D within NDSG 1308. Note that the un-synchronization may occur without respect to the NAN devices' respective roles and states.

Note that even if NAN devices 1306A-D have a hopcount threshold greater than 4, once NAN devices 1306C and 1306D join the new NAN cluster, they may start to follow a new timing and DW schedule based on AM 1328. However, it may take NAN devices 1306A and 1306B an extended period of time to discover the new NAN cluster and merge to the new NAN cluster. For example, NAN devices 1306A and 1306B may have to rely on infrequent passive scanning to discover new NAN clusters. As a result, any active data sessions between 1306A and 1306B, and 1306C and 1306D may be impacted by the delay for all NDSG members to discover and merge to the new NAN cluster. Note that the un-synchronization may occur without respect to the NAN devices' respective roles and states.

Figure 14D:
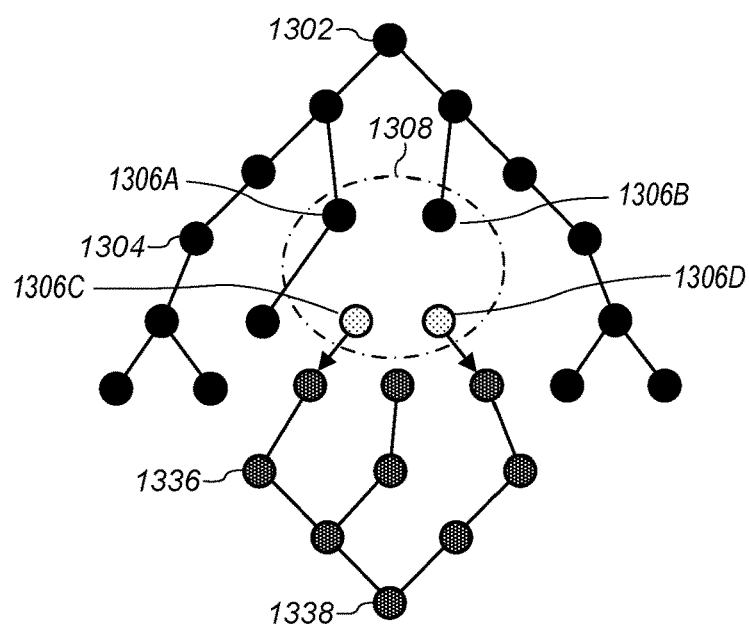

As another example, turning to FIG. 14D, NAN devices 1306A-D of NDSG 1308 may initially join an NAN cluster associated with AM 1302 and include NAN devices 1304. In some embodiments, NAN devices 1306A-D may each have a hopcount threshold equal to 4. Accordingly, devices 1306A-D may initially rely on AM 1302 for clock synchronization. However, AM 1302 may leave or otherwise no longer function as the AM and all devices in the NAN cluster may reset their AM record and attempt to find a new AM. As shown, 1306C and 1306D may begin to follow new AM 1338 along with NAN devices 1336, but may be in non-master, non-sync states (e.g., suppressed by their neighboring master devices) and may therefore not transmit any NAN beacons to neighboring NAN devices, such as 1306A and 1306B. As a result, 1306A and 1306B may not be able to connect with the new AM 1338 in a timely manner, and their clocks may drift away from the clocks of 1306C and 1306D. Note that even if 1306A and 1306B are in a master role during the transition stage, and 1306C and 1306D detect that they are drifting away (or becoming unsynchronized), 1306C and 1306D may not be able to help 1306A and 1306B resynchronize.

As yet another example, if AM 1302 no longer functions as the AM, during a transition stage to a new AM, 1306A and 1306B may continue updating to temporary AMs on one side of the original tree while 1306C and 1306D may continue updating to temporary AMs on the other side of the original tree. Thus, it may take an extended period of time (e.g., multiple DW intervals) before a new AM's timing propagates to 1306A-D's local area and datapaths between 1306A, 1306B, 1306C, and 1306D may not tolerate the resulting transition delay.

In the examples discussed above, NAN data group synchronization may be affected by any or all of hopcount threshold, merging to new cluster, non-master non-sync state, and/or transition delay, among other possibilities.

In some embodiments, as described herein, it may be desirable to allow NAN devices to either maintain existing datapaths, disregarding hopcount threshold and/or to adjust the hopcount threshold dynamically in order to maintain synchronization with one or more datapaths.

In some embodiments, as described herein, for new cluster merging, it may be desirable for a NAN cluster to attempt to switch to a new NDGS/timing simultaneously or approximately simultaneously or concurrently (although such switching may be challenging if the NAN cluster has many hops). Additionally, it may be desirable for nodes in non-master non-sync state to also transmit beacons to help the NAN cluster maintain tight synchronization, in some embodiments.

In some embodiments, a NAN datapath/data group may synchronize to the best NAN cluster in a neighborhood by following a NAN synchronization protocol. However, some changes may be desirable to cover incomplete coverage caused by non-master non-sync nodes.

In some embodiments, when a new/better cluster is discovered, the NAN datapath/data group may attempt to switch to the new cluster seamlessly. If a NAN device is involved in two or more datapaths, it may need to present in both old and new clusters' negotiation windows until all peer devices switch to the new cluster. Alternatively, or additionally, the NAN device may discontinue some datapaths while switching to the new cluster and attempt to resume the datapaths in the new cluster.

In some embodiments, if synchronization provided by the NAN cluster is not sufficient to create or maintain a datapath, the NAN devices involved in the datapath may start to synchronize with each other (e.g., one device with shorter hopcount or higher master rank may become the other device's synchronization master). A NAN device may occasionally transmit NAN beacons to help its peer devices to identify the clock difference if: the NAN device is in non-master non-sync role; the NAN device does not directly synchronize to a peer device with established datapath; and/or a NAN device can request a peer device to serve as its synchronization master, and transmit beacons every DW interval or even more frequently.

In some embodiments, NAN devices that have active NAN datapaths (called NAN data devices for simplicity) and are located in a same neighborhood or area may be grouped together to maintain tight synchronization based on the clock of the best NAN cluster in the neighborhood. This tight synchronization may be achieved by: requesting group members to meet and synchronize at additional channel/time windows (e.g., besides NAN discovery windows), such as negotiation windows (NWs); requesting group members that discover a better clock source (e.g., a new AM) to inform the group of their observation during discovery and/or negotiation windows; and/or enabling any group member to solicit synchronization beacons from other group members during negotiation windows, e.g., if the group member fails to synchronize during NAN discovery windows.

In some embodiments, a NAN data device may enter a calibration mode if one or more of the following conditions are met: 1) the NAN data device changes its AM record to follow a new AM within a same NAN cluster, e.g., and is in non-master and non-sync state; and/or 2) the NAN data device changes its AM record to follow a new AM in a new NAN cluster, e.g., disregarding its role/state. When a NAN data device is in calibration mode, it may schedule NAN beacon transmissions in subsequent negotiation windows (NWs). If the NAN data device merges to a new NAN cluster, it may schedule NAN beacon transmissions in old NWs (i.e., NWs that follow the old cluster's DWs). The NAN data device may also schedule transmissions of NAN datapath update frames in subsequent NWs, that carry a timing synchronization function (TSF) and the new AM/cluster information. A NAN data device in calibration mode may stay in the calibration mode for at least three contiguous DW intervals after its latest AM record update. When a NAN data device joins a new cluster, it may present at both old NW and new NW for at least three DW intervals and/or until all its peers with active datapath join the new cluster. The NAN data device may include a count down value in its NAN beacon or datapath update frames to indicate its own timing to deprecate the old cluster.

In some embodiments, a NAN data device may enter a calibration mode if it has one or more active datapaths, if it starts to follow a new anchor master in a same NAN cluster, and/or if it is in non-master non-sync state. In some embodiments, when a NAN device is in calibration mode, it may transmit NAN beacons in paging windows for a certain number of DW intervals (e.g., 8 DW intervals). Accordingly, when peer devices receive such NAN beacons in paging windows, the peer devices may update to the new anchor master if the new anchor master is better (e.g., has a higher rank) than the existing AM. Additionally, a NAN device may request a peer device that is in calibration mode to not exit calibration mode until the corresponding data session has ended. The NAN device may send such a request if it cannot synchronize to any device during discovery windows and it can synchronize to one or more calibration devices during paging windows.

In some embodiments, all NAN data devices may be present (e.g., be awake) during each NW. When a NAN data device receives a NAN beacon or NAN datapath update frame during a NW, it may adopt the frame's TSF if the AM rank (AMR) in the beacon is equal and/or the AM beacon transmission time (AMBTT) is fresher than its current AM record. The NAN data device may adopt both the beacon's TSF and AM record if the AMR in the frame is larger than that in its current AM record. In some embodiments, the NAN data device's role/state may not be changed during a NW.

In some embodiments, a NAN data device can transmit a synchronization request (sync request) message to all NAN data device neighbors during a NW to request the neighbors to transmit NAN synchronization beacons. When receiving such a sync request message, a NAN data device may schedule NAN beacon transmissions in subsequent NWs for a plurality of (e.g., 16 or more) DW intervals, e.g., if the data device is in non-master non-sync state. If a NAN data device needs continuous synchronization support after the plurality of DW intervals, it may transmit another sync request message in a NW before the end of the plurality of DW intervals. This embodiment may address the corner case when a NAN data device relies solely on one or more neighbors in non-master non-sync state for fresh AMBTT.

In some embodiments, a NAN data device may cancel its NAN beacon transmission in a NW if, before it completes the random backoff, it receives a NAN beacon from another NAN data device, which 1) carries a larger AMR value; 2) carries a same AMR value, but fresher AMBTT; and/or 3) carries a same AMR value, and same AMBTT, and same or lower hopcount.

In some embodiments, two or more devices that provide and/or consume a same service may form a NAN data service group (NDSG) and maintain tight synchronization within the group. A NDSG founder may select a group ID and/or group MAC address for the NDSG. A NDSG may use discovery window and negotiation window to maintain tight synchronization, and may also define new group windows for more frequent synchronization and group management, if desired. In some embodiments, frames transmitted during NWs and DWs for tight synchronization within the group may carry the group MAC address.

In some embodiments, each NDSG may maintain its own group window (GW) for group related communications. GW(s) can be scheduled between consecutive DWs and/or NWs on either NAN channels or non-NAN channels to avoid conflicts with NAN traffic. GW(s) can also be scheduled to overlap with NAN DW(s) and/or NW(s) on NAN channel(s) to avoid extra synchronization overhead. Multiple GWs can be scheduled between consecutive DWs/NWs and also overlap with DWs/NWs to provide more frequent synchronization for NDSG members. In some embodiments, all members in a NDSG may be presenting at the NDSG's GWs.

In some embodiments, if a NAN device is in non-master non-sync state and has established one or more active data paths, it may schedule to transmit NAN beacons in each paging window, periodically in non-consecutive paging windows (e.g., every 2, 4, 8, or 16 paging windows), or in randomly selected paging windows. Note that the transmission frequency may be related, e.g., inversely-proportional, to the peer device density. In some embodiments, the NAN device may conduct a random backoff from the beginning of a selected paging window before transmitting the NAN beacon. Additionally, if the NAN device receives a NAN beacon with an RSSI higher than a certain threshold before it completes a backoff, the NAN device may cancel its own NAN beacon transmission. Further, in some embodiments, a NAN device may request a peer device to transmit NAN beacons more frequently in paging windows if the NAN device cannot synchronize to any devices during discovery windows and the NAN device can synchronize to one or more devices during paging windows.

In other embodiments, a window (e.g., a time duration of 16 ms or 48 ms, for example) occurring directly after a discovery window may be defined as a discovery window extension (DWE). Thus, if a NAN device is in non-master non-sync state, it may schedule to transmit NAN beacons in each DWE, periodically in non-consecutive DWEs (e.g., every 2, 4, 8, or 16 DWEs), or in randomly selected DWEs. Note that the transmission frequency may be related, e.g., inversely-proportional, to the density of neighbor NAN devices. In some embodiments, the NAN device may conduct a random backoff from the beginning of a selected DWE before transmitting the NAN beacon. Additionally, if the NAN device receives a NAN beacon with an RSSI higher than a certain threshold before it completes the backoff, the NAN device may cancel its own NAN beacon transmission. Further, in some embodiments, if a NAN device discovers a NAN cluster during passive scanning, but cannot synchronize to any device during expected DWs, it may stay awake in one or more DWEs in an attempt to synchronize to a device. In addition, a NAN device may request another NAN device to transmit NAN beacons more frequently in DWEs or DWs if it cannot synchronize to any devices during DWs and it can synchronize to one or more devices during DWEs.

In some embodiments, if a NAN device has established one or more datapaths and the NAN device's AM is reset due to NAN cluster topology changes, it may enter a transition mode for a specified number of DW intervals (e.g., 32 DW intervals), or until its AM record may be stable for a specified number of DW intervals (e.g., AM record stable for 16 or 32 DW intervals). Note that when a NAN device is in transition mode, it may update its AM record based on a current NAN AM election protocol, but synchronize its TSF timer only to one of its datapath peer devices or one of the neighbor devices that have active datapaths and share the same scheduler rank. For example, the NAN device may synchronize to a peer/neighbor device with a fastest clock, or highest master rank, or highest anchor master rank, etc. Additionally, the NAN device may follow a current NAN synchronization protocol when it exits the transition mode.

Wi-Fi NAN Datapath Resource Allocation

In order for peer devices (i.e., peer client stations, such as client station 106) to synchronize with one another and exchange data via a datapath as described herein, the peer devices may exchange availability in terms of both time and channel. In other words, availability of a peer device may be two-dimensional. Thus, before a first peer device may communicate with a second peer device, the first peer device requires knowledge of the second peer device's availability, both in terms of time and channel. As discussed above, a discovery window (DW) may be used to discover other devices; however, the brevity of the DW may limit devices' ability for discovery of other devices. Thus, a further availability (FA) attribute is defined in NAN 1.0. The FA may be included in a service discovery frame (SDF) in the DW and may indicate a device's availability in terms of both channel and time slots beyond the DW. Therefore, based on received FA information, the first peer device may decide whether to utilize the FA channel/time slots to communicate with the second device.

Figures 15A, 15B:
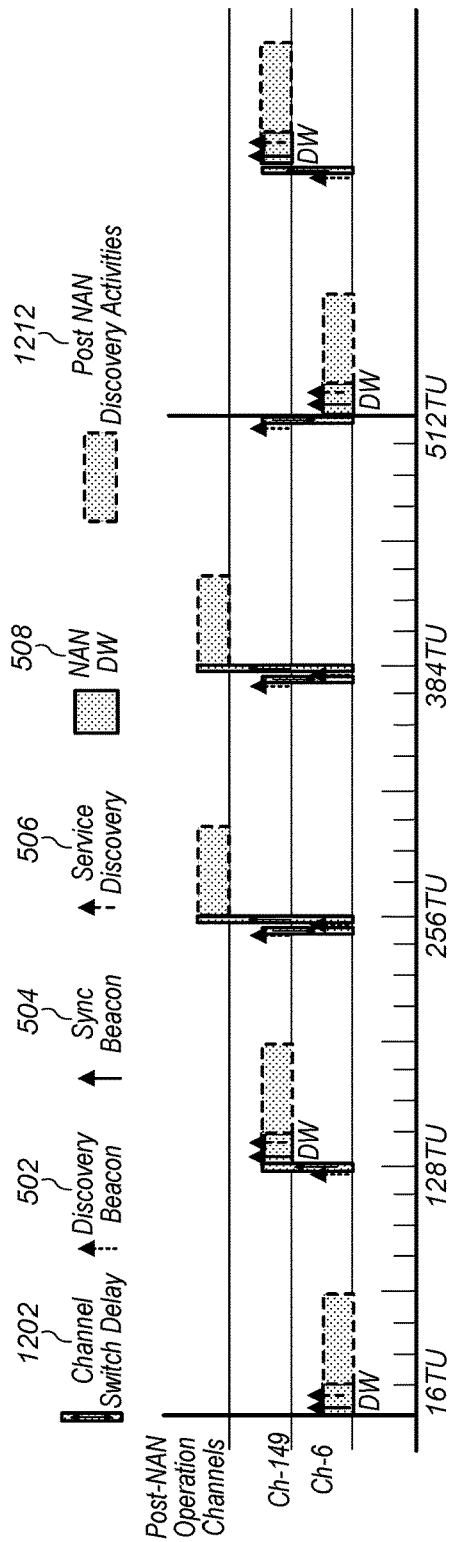
FIG. 15A illustrates a typical frame for a NAN device.
FIG. 15B illustrates a bitmap table indicating a device's current availability during a frame on each channel.

FIG. 15A illustrates a typical frame for a NAN device. The frame includes 512 time units (TU) and 16TU represents 1 bit. The post-NAN operations channels may be used to communicate with an access point (such as access point 112) and channels 6 and 149 may be used for peer to peer communications. Thus, as shown, a device may have a first DW (e.g., a first NAN DW 508) of 16 TUs on channel 6 followed by post NAN discovery activities (such as post NAN discovery activities 1212) that may include 64 TUs. As discussed above, the DW may include synchronization (sync) beacon 504 and service discovery beacon 506.

FIG. 15B illustrates a bitmap table indicating a device's current availability during a frame on each channel. The bitmap may include a further availability map attribute indicating a device's availability on channels 6, 149, x, and y. In addition, the bitmap may include a WLAN infrastructure attribute indicating availability for WLAN infrastructure signaling, a P2P operation attribute, and a further NAN service discovery attribute. However, communicating only current availability may limit a device's ability to establish a datapath for further communications.

According to embodiments described herein, a NAN device (such as client station 106) may indicate both its current availability and, in addition, its potential future availability for one or more discovery window (DW) intervals. In some embodiments, a NAN device may use periodically transmitted management frames such as NAN beacons or service discovery frames (SDFs). Additionally, or alternatively, the NAN device may use NAN datapath setup frames or negotiation frames as described above. Thus, when a NAN device peer pair attempts to establish a unicast datapath, each of the devices collects the peer device's current and potential future availability information. Then, the datapath's channel and time slot allocation may be determined based on both devices' availabilities.

In some embodiments, an algorithm to determine the datapath channel/time allocation may be a distributed algorithm that may be executed by each NAN device. The distributed algorithm may ensure that both devices determine a set of common channel/time slots in subsequent DW intervals in which the two devices may exchange data. In other words, the distributed algorithm may ensure that the devices determine a common channel/time slot to establish the datapath (e.g., a datapath schedule or datapath base schedule). Additionally, after the datapath has been established, the distributed algorithm may allow the device pair to continue to negotiate and update the datapath channel/time allocation as channel conditions change. In some embodiments, datapath update frames or information elements piggybacked in data frames may be used to negotiate and update the datapath channel/time allocation.

In another embodiment, existing channel/time availability may be advertised as part of a FA attribute. However, since a typical FA attribute only indicates an availability duration of one DW interval, in such embodiments, a typical FA attribute may be extended to indicate availability for a duration longer than one DW interval. For example, the FA attribute may indicate a FA pattern for 1/2/4/8/16 DW intervals. Thus, potential channel/time availability may be indicated by one or more of a preferred channel list, a soft switch channel/duration/period, a hard switch channel/duration/period, a clock accuracy or advance switch time, and/or a new availability effective time or count down to new availability timer. Note that for soft switches, the switch time points may not be critical so long as switch channel/duration/period are satisfied whereas for hard switches, the switch time point may be critical and the switch channel/duration/period should occur prior to the switch time point. Note further that for clock accuracy or advance switch times, an indication may be included in an extended FA attribute that the peer device may switch earlier than the switch time points in order to compensate for potential clock drifts. In such instances, the peer device may complete a transmission and its acknowledgement prior to switching away to another channel.

In some embodiments, a datapath update frame (DUF) may be defined for a peer device to update its potential changes to current availability. The DUF may include, among other information, capabilities and/or operation parameter changes, timestamp for maintaining the datapath synchronization, transmission frequency of the DUF, and/or change effective time or duration to new change. In such embodiments, the DUF may be transmitted in NWs and/or other extended FA attribute slots within the frame. Note that all devices involved in an active NAN datapath may present in NW for potential DUF from peer devices.

In some embodiments, to allow multiple devices to establish a datapath and allocate resources, a discovery window (DW) interval may be divided into multiple windows (or time intervals). FIG. 16 illustrates a discovery window divided into multiple windows, according to some embodiments. The windows may include discovery window (DW) 1808 (for either or both of the 2.4 GHz and 5 GHz channels), datapath negotiation window (NW) 1810, discovery offset window (DOW) 1812, after discovery window (ADW) 1814, DW interval ending window (IEW) 1816, and/or hard switch window (HSW) 1818.

Figures 16A, 16B:
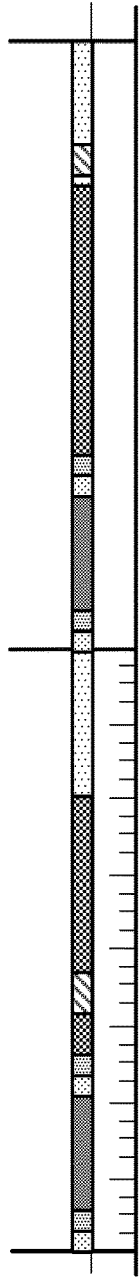
FIG. 16A illustrates a discovery window divided into multiple windows, according to some embodiments.
FIG. 16B illustrates an availability table for multiple windows, according to some embodiments.

FIG. 16B illustrates an availability table for multiple windows, according to some embodiments. As illustrated, each device may indicate its potential availability where {D1, . . . , Dk} may denote a preferred channel list for new a NAN datapath; {V, d, p}$_{1, \ldots, n}$ may be a list of {visiting channel, duration, period} for existing concurrent interfaces, datapaths, and other activities, which are flexible on channel switch time points (soft channel switch time points); {V, s, d, p}$_{1, \ldots, m}$ may be a list of {visiting channel, switch time, duration, period} for existing concurrent interfaces, datapaths, and other activities, which have hard channel switch time points; and "flexible" may indicate that the device does not have any channel/time allocation preference and can simply follow the peer device's preferences. Note that the channels may be sorted based on channel quality, from highest to lowest and ADW length may depend on IEW length. Additionally, note that if in instances where IEW already occupies an entire ADW and is not sufficient to support all {V, d, p}$_{1, \ldots, n}$, the device may also use DOW or skipped DW/NW to support {V, d, p}$_{1, \ldots, n}$.

FIGS. 17A-17D illustrate possible availability of a publisher and a subscriber during multiple windows of a discovery window, according to embodiments. Thus, as illustrated in FIG. 17A, a publisher device (STA1) and the subscriber device (STA2) may notify one another of each device's availability during the DW 1808/NW 1810 windows on the 2.4 GHz channel. FIG. 17B illustrates each device's availability during the DW 1808/NW 1810 on the 5 GHz channel. FIG. 17C illustrates each device's availability during DOW 1812 and ADW 1814 and FIG. 17D illustrates each device's availability during IEW 1816.

In some embodiments, if there is no commonality in availability (e.g., there are no instances of D1x=D2y), then the stations may select an allocation of 6/149. Alternatively, if there is more than one commonality in availability (e.g., one or more D1x=D2y), then the devices may determine allocation based on either the smallest sum of (x+y) or alternatively by selecting the smallest x. Note that in instances of multiple smallest sum of (x+y), then the smallest x may be chosen. Note further that x denotes the publisher.

In some embodiments, if IEW length is sufficient, it may be allocated to {V1, d, p}$_{1, \ldots, n}$ and {V2, d, p}$_{1, \ldots, m}$ without time overlapping. However, if IEW length is not sufficient to be shared by both {V1, d, p}$_{1, \ldots, n}$ and {V2, d, p}$_{1, \ldots, m}$, IEW may be allocated to {V1, d, p}$_{1, \ldots, n}$ and {V2, d, p}$_{1, \ldots, m}$ with minimum overlapped time duration. For example, STA1 may be allocated from the start of IEW forward, while STA2 may be allocated from the end of IEW backward. Additionally, note that if one or both devices have one or more HSWs, they may indicate those HSWs to the peer device and the peer device may determine whether or not to switch to the other device's HSWs.

Allocation Examples(FIGS. 18A-24B)

FIGS. 18A to 24B illustrate channel sequences for resource allocation according to embodiments. Note that resource allocations illustrated are exemplary only. In addition, the allocations illustrated may be implemented and/or combined with any of the techniques described herein. In addition, the resource allocations may be applied to (or implemented on) a client station such as client station 106.

FIG. 18A illustrates a channel sequence resource allocation in which a NAN social channel may be allocated as the datapath channel for single band, according to embodiments. Thus, as shown, DW 1808 may be 16TU, NAN NW 1810 may be 16TU, and the remainder of the resource allocation may be for NAN ADW 1816. The allocation may be for channel 6 and for single band 2.4 GHz only.

FIG. 18B illustrates a channel sequence resource allocation in which a NAN social channel may be allocated as the datapath channel for dual band, according to embodiments. Thus, as shown, DW 1808 may be 16TU, NAN NW 1810 may be 16TU on channel 6 followed by NAN ADW 1816 for 96TU on channel 149. After NAN ADW 1816 on channel 149, another DW 1808 and NAN NW 1810, each 16TU, may occur on channel 149 and the remainder of the resource allocation may be for NAN ADW 1816 on channel 1816. The allocation may be for dual band 2.4 GHz only.

FIG. 19A illustrates a channel sequence resource allocation including a single concurrent channel with soft switch for single band, according to embodiments. In such embodiments, one or both devices may visit one channel (not a NAN social channel) periodically, but without fixed visiting time points. Thus, the devices may switch back to default channel set when it is not necessary to stay at the concurrent channel or when the maximum visit period has been reached. Thus, as shown, DW 1808 may be 16TU and NAN NW 1810 may be 16TU. In addition, the final 128TU of the 512TU window may be reserved for channel visiting (e.g., device visiting channel 1914 and peer visiting channel 1916) and the remainder of the window may be allocated for NAN ADW 1816. The allocation may be for single band 2.4 GHz only.

FIG. 19B illustrates a channel sequence resource allocation including a single concurrent channel with soft switch for dual band, according to embodiments. In such embodiments, one or both devices may visit one channel (not a NAN social channel) periodically, but without fixed visiting time points. Thus, the devices may switch back to default channel set when it is not necessary to stay at the concurrent channel or when the maximum visit period has been reached. Thus, as shown, DW 1808 may be 16TU, NAN NW 1810 may be 16TU on channel 6 followed by NAN ADW 1816 for 96TU on channel 149. After NAN ADW 1816 on channel 149, another DW 1808 and NAN NW 1810, each 16TU, may occur on channel 149. In addition, the final 128TU of the 512TU window may be reserved for channel visiting (e.g., device visiting channel 1914 and peer visiting channel 1916) and the remainder of the window may be allocated for NAN ADW 1816 on channel 149. The allocation may be for dual band 2.4 GHz only.

FIG. 20A illustrates a channel sequence resource allocation including dual concurrent channels with soft switch for single band, according to embodiments. In such embodiments, two devices may visit two different channels (neither a NAN social channel) periodically, but without fixed visiting time points and time slots may be equally assigned to two concurrent channels. Thus, as shown, DW 1808 may be 16TU and NAN NW 1810 may be 16TU. In addition, the final 256TU of the 512TU window may be allocated for channel visiting on the device's visiting channel and the peer's visiting channel (e.g., device visiting channel 1914 and peer visiting channel 1916). The allocation may be for single band 2.4 GHz only.

FIG. 20B illustrates a channel sequence resource allocation including dual concurrent channels with soft switch for dual band, according to embodiments. In such embodiments, two devices may visit two different channels (neither a NAN social channel) periodically, but without fixed visiting time points and time slots may be equally assigned to two concurrent channels. Thus, as shown, DW 1808 may be 16TU, NAN NW 1810 may be 16TU on channel 6 followed by NAN ADW 1816 for 96TU on channel 149. After NAN ADW 1816 on channel 149, another DW 1808 and NAN NW 1810, each 16TU, may occur on channel 149, followed by NAN ADW 1816 for 96TU on channel 149. In addition, the final 256TU of the 512TU window may be allocated for channel visiting on the device's visiting channel and the peer's visiting channel (e.g., device visiting channel 1914 and peer visiting channel 1916). The allocation may be for dual band 2.4 GHz only.

FIG. 21A illustrates a channel sequence resource allocation allowing devices to visit multiple different channels without fixed visiting time points for single band, according to embodiments. In such embodiments, two devices may visit multiple different channels (none are NAN social channel) heavily, but without fixed visiting time points (soft channel switching). The time slots are assigned to two devices with minimum overlapping. Additionally, a device may also use DOW or even skipped DW/NW for visiting channel activities. Thus, as shown, DW 1808 may be 16TU and NAN NW 1810 may be 16TU. In addition, the remainder of the 512TU window may be allocated for channel visiting on the device's visiting channel and the peer's visiting channel (e.g., device visiting channel 1914 and peer visiting channel 1916). The allocation may be for single band 2.4 GHz only.

FIG. 21B illustrates a channel sequence resource allocation allowing devices to visit multiple different channels without fixed visiting time points for dual band, according to embodiments. In such embodiments, two devices may visit multiple different channels (none are NAN social channel) heavily, but without fixed visiting time points (soft channel switching). The time slots are assigned to two devices with minimum overlapping. Additionally, a device may also use DOW or even skipped DW/NW for visiting channel activities. Thus, as shown, DW 1808 may be 16TU and NAN NW 1810 may be 16TU on channel 6. The next 96TU may be allocated for channel visiting on the device's visiting channel and the peer's visiting channel (e.g., device visiting channel 1914 and peer visiting channel 1916). Another DW 1808 and NAN NW, each 16TU may occur starting at 128TU on channel 149. Additionally, the remainder of the 512TU window may be allocated for channel visiting on the device's visiting channel and the peer's visiting channel (e.g., device visiting channel 1914 and peer visiting channel 1916). The allocation may be for dual band 2.4 GHz only.

FIG. 22A illustrates another channel sequence resource allocation allowing for devices to visit multiple different channels at fixed time points for single band, according to embodiments. In such embodiments, two devices may visit multiple different channels (none are NAN social channel) periodically, but at fixed time points (hard channel switching). Thus, devices may need to inform each other the visiting time points and periods, and may return to default channel sequence when the visiting period ends. Thus, as shown, DW 1808 may be 16TU, NAN NW 1810 may be 16TU, and NAN ADW 1816 may be 32TU. The next 32TU may be allocated for visiting a peer's visiting channel. After the peer's visiting channel allocation, the next 64TU may be allocated for NAN ADW 1816 followed by a 32TU allocation for device's visiting channel. After the device's visiting channel allocation, the next 176TU may be allocated for ADW 1816 followed by another 32TU allocation for peer's visiting channel, a 64TU allocation for NAN ADW 1816, a 32 TU allocation for device's visiting channel, and a final 16TU allocation for NAN ADW 1816. The allocation may be for single band 2.4 GHz only.

FIG. 22B illustrates another channel sequence resource allocation allowing for devices to visit multiple different channels at fixed time points for dual band, according to embodiments. In such embodiments, two devices may visit multiple different channels (none are NAN social channel) periodically, but at fixed time points (hard channel switching). Thus, devices may need to inform each other the visiting time points and periods, and may return to default channel sequence when the visiting period ends. Thus, as shown, DW 1808 may be 16TU and NAN NW 1810 may be 16TU on channel 6 followed by a 32TU allocation for NAN ADW 1816 on channel 149. The next 32TU may be allocated for visiting a peer's visiting channel. After the peer's visiting channel allocation, the next 32TU may be allocated for NAN ADW 1816 on channel 149 followed by a 16TU allocation for DW 1808 and a 16TU allocation for NAN NW 1810, both on channel 149. Next, 32TUs may be allocated for device's visiting channel. After the device's visiting channel allocation, the next 176TU may be allocated for ADW 1816 on channel 149 followed by another 32TU allocation for peer's visiting channel, a 64TU allocation for NAN ADW 1816 on channel 149, a 32 TU allocation for device's visiting channel, and a final 16TU allocation for NAN ADW 1816 on channel 149. The allocation may be for dual band 2.4 GHz only.

FIG. 23A illustrates a channel sequence allocation allowing for devices to agree on a datapath channel for single band, according to embodiments. In such embodiments, both devices may agree on a default datapath channel that may be different from any NAN social channel. Thus, as shown, DW 1808 may be 16TU and NAN NW 1810 may be 16TU on channel 6. The remainder of the 512TU may be allocated to NAN ADW 1816 on a preferred datapath channel. The allocation may be for single band 2.4 GHz only.

FIG. 23B illustrates a channel sequence allocation allowing for devices to agree on a datapath channel for dual band, according to embodiments. In such embodiments, both devices may agree on a default datapath channel that may be different from any NAN social channel. Thus, as shown, DW 1808 may be 16TU and NAN NW 1810 may be 16TU on channel 6 followed by a 96TU allocation for NAN ADW 1816 on channel 149. The 96TU allocation for NAN ADW 1816 may be followed by 16TU allocations for DW 1808 and NAN NW 1810 on channel 149 and the remainder of the 512TU may be allocated to NAN ADW 1816 on a preferred datapath channel. The allocation may be for dual band 2.4 GHz only.

FIG. 24A illustrates a channel sequence resource allocation allowing devices to visit multiple different channels without fixed visiting time points and agree on a datapath channel for single band, according to embodiments. In such embodiments, two devices may visit multiple different channels (none are NAN social channel) heavily, but without fixed visiting time points (soft channel switching). The time slots are assigned to two devices with minimum overlapping. Additionally, a device may also use DOW or even skipped DW/NW for visiting channel activities. Further, both devices may agree on a default datapath channel that may be different from any NAN social channel. Thus, as shown, DW 1808 may be 16TU and NAN NW 1810 may be 16TU on channel 6. The next 224TU may be allocated to NAN ADW 1816 on a preferred datapath channel and the remainder of the 512TU may be allocated for channel visiting on the device's visiting channel and the peer's visiting channel (e.g., device visiting channel 1914 and peer visiting channel 1916). The allocation may be for single band 2.4 GHz only.

FIG. 24B illustrates a channel sequence resource allocation allowing devices to visit multiple different channels without fixed visiting time points and agree on a datapath channel for dual band, according to embodiments. In such embodiments, two devices may visit multiple different channels (none are NAN social channel) heavily, but without fixed visiting time points (soft channel switching). The time slots are assigned to two devices with minimum overlapping. Additionally, a device may also use DOW or even skipped DW/NW for visiting channel activities. Further, both devices may agree on a default datapath channel that may be different from any NAN social channel. Thus, as shown, DW 1808 may be 16TU and NAN NW 1810 may be 16TU on channel 6. The next 96TU may be allocated to NAN ADW 1816 on channel 149 followed by 16TU allocation for DW 1808 and NAN NW 1810 on channel 149. The next 96TU may be allocated for NAN ADW 1816 on a preferred datapath channel and the remainder of the 512TU may be allocated for channel visiting on the device's visiting channel and the peer's visiting channel (e.g., device visiting channel 1914 and peer visiting channel 1916). The allocation may be for dual band 2.4 GHz only.

FIG. 25A illustrates a channel sequence resource allocation allowing devices to visit multiple different channels with fixed visiting time points and agree on a datapath channel for single band, according to embodiments. In such embodiments, two devices may visit multiple different channels (none are NAN social channel) periodically, but at fixed time points (hard channel switching). Thus, devices may need to inform each other the visiting time points and periods, and may return to default channel sequence when the visiting period ends. Further, both devices may agree on a default datapath channel that may be different from any NAN social channel. Thus, as shown, DW 1808 may be 16TU, NAN NW 1810 may be 16TU on channel 6 followed by a 32TU allocation for NAN ADW 1816 on a preferred datapath channel. The next 32TU may be allocated for visiting a peer's visiting channel. After the peer's visiting channel allocation, the next 64TU may be allocated for NAN ADW 1816 on the preferred datapath channel followed by a 32TU allocation for device's visiting channel. After the device's visiting channel allocation, the next 176TU may be allocated for ADW 1816 on the preferred datapath channel followed by another 32TU allocation for peer's visiting channel, a 64TU allocation for NAN ADW 1816 on the preferred datapath channel, a 32 TU allocation for device's visiting channel, and a final 16TU allocation for NAN ADW 1816 on the preferred datapath channel. The allocation may be for single band 2.4 GHz only.

FIG. 25B illustrates a channel sequence resource allocation allowing devices to visit multiple different channels with fixed visiting time points and agree on a datapath channel for dual band, according to embodiments. In such embodiments, two devices may visit multiple different channels (none are NAN social channel) periodically, but at fixed time points (hard channel switching). Thus, devices may need to inform each other the visiting time points and periods, and may return to default channel sequence when the visiting period ends. Further, both devices may agree on a default datapath channel that may be different from any NAN social channel. Thus, as shown, DW 1808 may be 16TU and NAN NW 1810 may be 16TU on channel 6 followed by a 32TU allocation for NAN ADW 1816 on channel 149. The next 32TU may be allocated for visiting a peer's visiting channel. After the peer's visiting channel allocation, the next 32TU may be allocated for NAN ADW 1816 on channel 149 followed by a 16TU allocation for DW 1808 and a 16TU allocation for NAN NW 1810, both on channel 149. Next, 32TUs may be allocated for device's visiting channel. After the device's visiting channel allocation, the next 176TU may be allocated for ADW 1816 on a preferred datapath channel followed by another 32TU allocation for peer's visiting channel, a 64TU allocation for NAN ADW 1816 on the preferred datapath channel, a 32 TU allocation for device's visiting channel, and a final 16TU allocation for NAN ADW 1816 on the preferred datapath channel. The allocation may be for dual band 2.4 GHz only.

Further Embodiments

In some embodiments, a client station may comprise at least one antenna, at least one radio coupled to the at least one antenna and configured to perform Wi-Fi communication with a Wi-Fi access point, and at least one processor coupled to the at least one radio. The client station may be configured to perform voice and/or data communications.

In addition, in some embodiments, the client station may be configured to detect a first neighboring client station that is configured to perform Wi-Fi communication, establish, via negotiation, a first data link, a first data link schedule, and a first base schedule for a data cluster with the first neighboring client station, detect a second neighboring client station that is configured to perform Wi-Fi communication, and establish, via negotiation, a second data link, a second data link schedule, and a second base schedule for the data cluster with the second neighboring client station, wherein the second data link schedule is a superset of the second base schedule, and wherein the second base schedule is a subset of the first base schedule.

In some embodiments, the client station may be configured to detect a first neighboring client station that is configured to perform Wi-Fi communication, establish, via negotiation, a data link, wherein the data link comprises one of a synchronized data link and a paging data link, wherein a schedule for the data link includes a first time block, wherein if the data link is a paging data link, the first time block includes a paging window at a start of the time block and a data transmission window subsequent to the paging window, and wherein the client station is configured to send a paging message to the first neighboring client station prior to transmitting data in the data transmission window, and wherein if the data link is a synchronized data link, the client station is configured to transmit data at the start of the time block.

In some embodiments, the client station may be configured to detect a neighboring client station that is configured to perform Wi-Fi communication in a first discovery window, arrange a negotiation window with the neighboring client station, and perform setup with the neighboring client station using the negotiation window to configure direct Wi-Fi communications with the neighboring client station without involving a Wi-Fi access point.

In some embodiments, the client station may be further configured to implement synchronization between the client station and the neighboring client station to enable the direct Wi-Fi communications with the neighboring client station.

In some embodiments, the client station may be further configured to implement synchronization between the client station and a plurality of neighboring client stations to enable direct Wi-Fi communications with the plurality of neighboring client stations.

In some embodiments, the client station may be further configured to coordinate resource allocation between the client station and the neighboring client station.

In some embodiments, the negotiation window may be scheduled to occur adjacent to the first discovery window.

In some embodiments, the client station may be further configured to arrange a further availability window with the neighboring client station, wherein the further availability window is used to coordinate communication between the client station and the neighboring client station.

In some embodiments, the client station may be configured to receive a first message from a device indicating availability of one or more services, in response to receiving the first message, send a second message to the device requesting a connection to the device, and receive a third message confirming the connection request.

In some embodiments, the client station may be further configured to send a message prior receiving the first message requesting the one or more services.

In some embodiments, the message may comprise one or more attributes indicating the client station's request.

In some embodiments, the first message may comprise one or more attributes that described the one or more services.

In some embodiments, the one or more attributes may comprise a service discovery fast session enable (SD[FSE]) attribute.

In some embodiments, the SD[FSE] may comprise service port and service_proto fields.

In some embodiments, the second message may comprise one or more attributes that define a NAN datapath session.

In some embodiments, one or more attributes may comprise a service discovery fast session request (SD[FSR]) attribute.

In some embodiments, the SD[FSR] attribute may comprise a session_id and subscriber_mac field.

In some embodiments, the third message may comprise one or more attributes that confirm a NAN datapath session and the device's address.

In some embodiments, the one or more attributes may comprise a service discovery fast session confirm SD[FSC] attribute.

In some embodiments, the SD[FSC] attribute may comprise session_id, subscriber_mac, service_mac, service_port, and service_proto fields.

In some embodiments, the client station may be configured to detect a neighboring client station that is configured to perform Wi-Fi communication and implement synchronization between the client station and the neighboring client station to enable the direct Wi-Fi communications with the neighboring client station.

In some embodiments, the client station may be configured to detect a plurality of neighboring client stations that are configured to perform Wi-Fi communication and implement synchronization between the client station and the plurality of neighboring client stations to enable direct Wi-Fi communications with the plurality of neighboring client stations.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or client station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A client station, comprising:
at least one antenna;
at least one radio coupled to the at least one antenna and configured to perform Wi-Fi communication with a Wi-Fi access point;
at least one processor coupled to the at least one radio, wherein the client station is configured to perform voice and/or data communications;
wherein the at least one processor is configured to cause the client station to:
detect, during a first discovery window, a first neighboring client station that is configured to perform Wi-Fi communication;
establish, via first negotiation after the first discovery window, a first datapath and a first datapath schedule with the first neighboring client station, wherein the first negotiation includes exchange of first current availability and first potential future availability for one or more discovery window intervals, and wherein the first datapath schedule is determined based on the exchanged first current availability and first potential future availability;
detect, during a second discovery window, a second neighboring client station that is configured to perform Wi-Fi communication; and
establish, via second negotiation after the second discovery window, a second datapath and a second datapath schedule, wherein the second negotiation includes exchange of second current availability and second potential future availability for one or more discovery window intervals, and wherein the second datapath schedule is determined based on the exchanged second current availability and second potential future availability.

2. The client station of claim 1,
wherein the at least one processor is further configured to cause the client station to establish, via the first negotiation, a first base schedule for a data cluster with the first neighboring client station.

3. The client station of claim 2, wherein the at least one processor is further configured to cause the client station to establish, via the second negotiation, a second base schedule for the data cluster with the second neighboring client station, wherein the second data path schedule is a superset of the second base schedule, and wherein the second base schedule is a subset of the first base schedule.

4. The client station of claim 1, wherein to establish the first datapath, the at least one processor is further configured to cause the client station to:
exchange one or more service discovery frames with the first neighboring client station, wherein the one or more service discovery frames include the first current availability and first potential future availability.

5. The client station of claim 4, wherein a service discovery frame comprises one or more of:
service identification list;
service information;
further availability;
capabilities and operations;
security session information; or
a preferred datapath channel list.

6. The client station of claim 4, wherein the at least one processor is further configured to cause the client station to:
schedule a future time and channel with the first neighboring client station to exchange at least a portion of the one or more service discovery frames.

7. The client station of claim 1, wherein the first datapath schedule specifies both times and channels for the client station and the first neighboring client station to meet for peer to peer communications; and
wherein the second datapath schedule specifies both times and channels for the client station and the second neighboring client station to meet for peer to peer communications.

8. The client station of claim 7, wherein the first datapath schedule further specifies times for the client station and the first neighboring client station to visit one or more additional channels.

9. The client station of claim 1, wherein the first datapath schedule specifies times for the client station and the first neighboring client station to visit one or more additional channels not associated with the first datapath.

10. An apparatus, comprising:
a memory; and
at least one processor in communication with the memory, wherein the at least one processor is configured to:
detect, during a first discovery window, a first neighboring client station that is configured to perform peer-to-peer Wi-Fi communication via a Neighbor Awareness Networking (NAN) protocol;
establish, via first negotiation after the first discovery window, a first datapath and an associated first datapath schedule with the first neighboring client station, wherein the first negotiation includes exchange of first current availability and first potential future availability for one or more discovery window intervals, wherein the associated first datapath schedule is determined based on the exchanged first current availability and first potential future availability, and wherein the associated first datapath schedule specifies times for the apparatus and the first neighboring client station to visit one or more additional channels not associated with the first datapath;
detect, during a second discovery window, a second neighboring client station that is configured to perform peer-to-peer Wi-Fi communication via the NAN protocol; and
establish, via second negotiation after the second discovery window, a second datapath and an associated second datapath schedule, wherein the second negotiation includes exchange of second current availability and second potential future availability for one or more discovery window intervals, and wherein the associated second datapath schedule is determined based on the exchanged second current availability and second potential future availability.

11. The apparatus of claim 10, wherein the at least one processor is further configured to coordinate resource allocation with the first neighboring client station.

12. The apparatus of claim 10, wherein the at least one processor is further configured to coordinate resource allocation with the first neighboring client station and the second neighboring client station.

13. The apparatus of claim 10, wherein the at least one processor is further configured to arrange a negotiation window with the second neighboring client station, and wherein the negotiation window is scheduled to occur adjacent to the second discovery window.

14. The apparatus of claim 10, wherein the at least one processor is further configured to arrange a further availability window with the first neighboring client station, wherein the first current availability and the first potential future availability of the apparatus and the first neighboring client station for the one or more discovery window intervals are exchanged during the further availability window.

15. A non-transitory computer readable memory medium storing program instructions executable by a processor of a client station to:
detect, during a first discovery window, a first neighboring client station that is configured to perform peer-to-peer Wi-Fi communication via a Neighbor Awareness Networking (NAN) protocol;
establish, via first negotiation, a first datapath and a first datapath schedule with the first neighboring client station, wherein the first negotiation includes exchange of a further availability attribute indicating a first current availability and first potential future availability for one or more discovery window intervals, wherein the associated first datapath schedule is determined based on the exchanged first current availability and first potential future availability, and wherein the further availability attribute comprises at least a channel switch attribute indicating channel, duration, and periodicity of a channel switch and a channel switch time;
detect, during a second discovery window, a second neighboring client station that is configured to perform peer-to-peer Wi-Fi communication via the NAN protocol; and establish, via second negotiation after the second discovery window, a second datapath and an associated second datapath schedule, wherein the second negotiation includes exchange of second current availability and second potential future availability for one or more discovery window intervals, and wherein the associated second datapath schedule is determined based on the exchanged second current availability and second potential future availability.

16. The non-transitory computer readable memory medium of claim 15,
   wherein, to detect the first neighboring client station, the program instructions are further executable to:
      generate instructions to transmit, during the first discovery window, a first message to the neighboring client station requesting one or more services; and
      receive, during the first discovery window, a second message from the neighboring client station indicating availability of at least one service of the one or more services, wherein the first datapath supports consumption of the at least one service.

17. The non-transitory computer readable memory medium of claim 16,
   wherein the first message comprises one or more attributes indicating the request for the one or more services.

18. The non-transitory computer readable memory medium of claim 16,
   wherein the second message comprises one or more attributes that describe the one or more services.

19. The non-transitory computer readable memory medium of claim 15,
   wherein the channel switch time is negotiable.

20. The non-transitory computer readable memory medium of claim 15,
   wherein when the further availability attribute comprises the channel switch time, the further availability attribute further comprises an indication that the channel switch will occur earlier than the channel switch time to compensate for potential clock drifts.

* * * * *